(12) United States Patent
Macaluso

(10) Patent No.: US 11,955,875 B1
(45) Date of Patent: Apr. 9, 2024

(54) VEHICLE ENERGY GENERATION SYSTEM

(71) Applicant: Anthony Macaluso, San Diego, CA (US)

(72) Inventor: Anthony Macaluso, San Diego, CA (US)

( * ) Notice: Subject to any disclaimer, the term of this patent is extended or adjusted under 35 U.S.C. 154(b) by 0 days.

(21) Appl. No.: 18/243,524

(22) Filed: Sep. 7, 2023

Related U.S. Application Data

(60) Provisional application No. 63/487,515, filed on Feb. 28, 2023.

(51) Int. Cl.
| | |
|---|---|
| *H02K 7/18* | (2006.01) |
| *B60K 25/08* | (2006.01) |
| *B60L 50/60* | (2019.01) |
| *H02J 7/14* | (2006.01) |

(52) U.S. Cl.
CPC .............. *H02K 7/1846* (2013.01); *H02J 7/14* (2013.01); *H02J 2207/50* (2020.01)

(58) Field of Classification Search
CPC ...... H02K 7/1846; H02K 49/10; H02K 7/003; H02K 47/14; B60L 50/608; B60L 11/18; B60K 25/08
USPC ........................ 310/40 R, 67 A, 75 C, 156.11
See application file for complete search history.

(56) References Cited

U.S. PATENT DOCUMENTS

| | | | |
|---|---|---|---|
| 1,751,577 A | * | 3/1930 | Cole ...................... B61D 43/00 105/109 |
| 2,451,965 A | | 10/1948 | Longenecker |
| 2,660,443 A | | 11/1953 | Miller |
| 3,859,589 A | | 1/1975 | Rush |
| 3,891,044 A | | 6/1975 | Tiede |
| 3,943,370 A | | 3/1976 | Watanabe |
| 3,961,678 A | | 6/1976 | Hirano et al. |
| 3,978,936 A | | 9/1976 | Schwartz |
| 4,214,160 A | | 7/1980 | Fies et al. |
| 4,314,160 A | | 2/1982 | Boodman et al. |
| 4,364,448 A | | 12/1982 | Ikuma |
| 4,404,513 A | | 9/1983 | Campen |
| 4,476,947 A | | 10/1984 | Rynbrandt |
| 4,539,496 A | | 9/1985 | Thomas et al. |
| 4,579,188 A | | 4/1986 | Facer |
| 5,045,646 A | | 9/1991 | Musachio |
| 5,078,227 A | | 1/1992 | Becker |

(Continued)

FOREIGN PATENT DOCUMENTS

| | | | | |
|---|---|---|---|---|
| CA | 2019025 A | * | 12/1990 | ............. A61G 5/045 |
| CH | 202100372 | | 4/2022 | |

(Continued)

*Primary Examiner* — Jose A Gonzalez Quinones
(74) *Attorney, Agent, or Firm* — Knobbe Martens Olson & Bear, LLP

(57) ABSTRACT

A system may generate energy in response to a movement of a vehicle. The system may include an energy recovery mechanism, a generator, an energy storage, and a motor. The energy recovery mechanism may include one or more rollers configured to rotate in response to a rotation of a drive shaft of the vehicle. The generator may be rotatably coupled to the roller and may be configured to generate an electrical output in response to a rotation of the roller. The energy storage may be electrically coupled with the generator and may be configured to receive a portion of the electrical output to store as energy. The motor may be electrically coupled with the energy storage and may be configured to receive a portion of the energy.

20 Claims, 39 Drawing Sheets

(56) References Cited

U.S. PATENT DOCUMENTS

| | | |
|---|---|---|
| 5,086,857 A | 2/1992 | Dale |
| 5,105,776 A | 4/1992 | Tsuchiya |
| 5,316,101 A | 5/1994 | Gannon |
| 5,412,293 A | 5/1995 | Minezawa et al. |
| 5,491,390 A | 2/1996 | McGreen |
| 5,671,821 A | 9/1997 | McGreen |
| 5,680,907 A | 10/1997 | Weihe |
| 5,710,504 A | 1/1998 | Pascual et al. |
| 5,735,363 A | 4/1998 | Horovitz et al. |
| 5,767,663 A | 6/1998 | Lu |
| 5,921,334 A | 7/1999 | Al-Dokhi |
| 5,992,553 A | 11/1999 | Morrison |
| 6,064,178 A | 5/2000 | Miller |
| 6,065,557 A | 5/2000 | von Keyserling |
| 6,220,381 B1 | 4/2001 | Damron et al. |
| 6,390,215 B1 | 5/2002 | Kodama |
| 6,502,842 B2 | 1/2003 | Ko |
| 6,531,838 B2 | 3/2003 | Parks |
| 6,703,716 B2 | 3/2004 | Chiu |
| 6,717,280 B1 | 4/2004 | Bienville |
| 6,987,327 B1 | 1/2006 | Lucatero |
| 7,183,746 B1 | 2/2007 | Carter |
| 7,279,799 B1 | 10/2007 | McCauley |
| 7,514,803 B2 | 4/2009 | Wilks |
| 7,547,980 B2 | 6/2009 | Harrison |
| 7,628,236 B1 | 12/2009 | Brown |
| 7,753,010 B2 | 7/2010 | Rutledge |
| 7,913,783 B2 | 3/2011 | Elmaleh |
| 8,063,609 B2 | 11/2011 | Salasoo et al. |
| 8,089,168 B2 | 1/2012 | Chevrette |
| 8,206,263 B2 | 6/2012 | Tsuchikawa |
| 8,347,999 B2 | 1/2013 | Koelsch et al. |
| 8,573,346 B2 | 11/2013 | Duignan |
| 8,643,201 B2 | 2/2014 | Scott |
| 8,712,620 B2 | 4/2014 | Jackson |
| 8,723,344 B1 | 5/2014 | Dierickx |
| 8,796,987 B2 | 8/2014 | Scheucher |
| 8,872,368 B1 | 10/2014 | Kim et al. |
| 8,907,631 B1 | 12/2014 | Gurries |
| 8,928,281 B2 | 1/2015 | Murase et al. |
| 9,236,761 B2 | 1/2016 | Strothmann |
| 9,242,698 B2 | 1/2016 | Frieden |
| 9,321,357 B2 | 4/2016 | Caldeira et al. |
| 9,376,971 B2 | 6/2016 | Luther et al. |
| 9,415,660 B2 | 8/2016 | Koelsch |
| 9,457,666 B2 | 10/2016 | Caldeira et al. |
| 9,981,553 B2 | 5/2018 | Schafer et al. |
| 10,077,056 B1 | 9/2018 | Fields et al. |
| 10,077,752 B1 | 9/2018 | Lee et al. |
| 10,157,050 B2 | 12/2018 | Kotani et al. |
| 10,293,702 B2 | 5/2019 | Tu et al. |
| 10,513,180 B2 | 12/2019 | Quill |
| 10,664,917 B1 | 5/2020 | Wasserman |
| 10,787,089 B1 | 9/2020 | Macaluso |
| 10,797,564 B1 | 10/2020 | Griggs |
| 10,850,713 B2 | 12/2020 | O'Hara |
| 10,889,186 B2 | 1/2021 | Schutt |
| 10,903,679 B2 | 1/2021 | Schmalzrieth et al. |
| 11,007,878 B2 | 5/2021 | Kamino et al. |
| 11,072,254 B1 | 7/2021 | Macaluso |
| 11,117,481 B2 | 9/2021 | Macaluso |
| 11,130,415 B2 | 9/2021 | Macaluso |
| 11,133,729 B2 | 9/2021 | Macaluso |
| 11,222,750 B1 | 1/2022 | Macaluso |
| 11,289,974 B2 | 3/2022 | Macaluso |
| 11,299,054 B2 | 4/2022 | Macaluso |
| 11,318,856 B2 | 5/2022 | Macaluso |
| 11,322,311 B2 | 5/2022 | Macaluso |
| 11,431,225 B2 | 8/2022 | Macaluso |
| 11,432,123 B2 | 8/2022 | Macaluso |
| 11,458,853 B2 | 10/2022 | Macaluso |
| 11,472,306 B1 | 10/2022 | Macaluso |
| 11,548,399 B1 | 1/2023 | Macaluso |
| 11,551,486 B1 | 1/2023 | Everett et al. |
| 11,577,606 B1 * | 2/2023 | Macaluso ............... F03G 7/08 |
| 11,587,740 B2 | 2/2023 | Macaluso |
| 11,618,332 B1 | 4/2023 | Macaluso |
| 11,626,775 B2 | 4/2023 | Macaluso |
| 11,627,449 B2 | 4/2023 | Macaluso |
| 11,628,724 B1 | 4/2023 | Macaluso |
| 11,641,572 B2 | 5/2023 | Macaluso |
| 11,685,276 B2 | 6/2023 | Macaluso |
| 11,722,869 B2 | 8/2023 | Macaluso |
| 11,738,641 B1 | 8/2023 | Macaluso |
| 11,757,332 B2 | 9/2023 | Macaluso |
| 11,785,433 B2 | 10/2023 | Macaluso |
| 11,837,411 B2 | 12/2023 | Macaluso |
| 11,850,963 B2 | 12/2023 | Macaluso |
| 11,919,387 | 3/2024 | Macaluso |
| 2003/0071464 A1 | 4/2003 | Chiu |
| 2003/0139859 A1 | 7/2003 | Hanada |
| 2003/0184258 A1 | 10/2003 | VonderHaar |
| 2004/0012205 A1 | 1/2004 | Sua-An |
| 2004/0262062 A1 | 12/2004 | Berbari et al. |
| 2005/0093370 A1 | 5/2005 | Amano et al. |
| 2005/0224263 A1 | 10/2005 | Vasilantone |
| 2006/0238258 A1 | 10/2006 | D'Amore |
| 2007/0013244 A1 | 1/2007 | Kinkaid |
| 2007/0075677 A1 | 4/2007 | Alvarez-Troncoso |
| 2007/0090702 A1 | 4/2007 | Schiller |
| 2007/0187957 A1 | 8/2007 | Harrison |
| 2007/0208468 A1 | 9/2007 | Sankaran et al. |
| 2008/0066979 A1 | 3/2008 | Carter |
| 2008/0215700 A1 | 9/2008 | Pillar et al. |
| 2008/0223637 A1 | 9/2008 | Bartilson |
| 2008/0289890 A1 | 11/2008 | Stoltzfus |
| 2008/0297109 A1 | 12/2008 | Sandberg et al. |
| 2009/0033254 A1 | 2/2009 | Nagashima et al. |
| 2009/0079417 A1 | 3/2009 | Mort et al. |
| 2009/0145674 A1 | 6/2009 | Lee |
| 2009/0168305 A1 | 7/2009 | Fleig et al. |
| 2009/0194998 A1 | 8/2009 | Lin |
| 2009/0230766 A1 | 9/2009 | Miyama |
| 2009/0250276 A1 | 10/2009 | Goodwin et al. |
| 2009/0256450 A1 | 10/2009 | Chevrette |
| 2010/0019718 A1 | 1/2010 | Salasoo et al. |
| 2010/0116574 A1 | 5/2010 | Gilmore |
| 2010/0117600 A1 | 5/2010 | Fazakas |
| 2010/0270810 A1 | 10/2010 | Liebermann et al. |
| 2010/0327600 A1 | 12/2010 | Koelsch |
| 2011/0014501 A1 | 1/2011 | Scheucher |
| 2011/0025068 A1 | 2/2011 | Campbell |
| 2011/0089760 A1 | 4/2011 | Castelaz et al. |
| 2011/0100735 A1 | 5/2011 | Flett |
| 2011/0106329 A1 | 5/2011 | Donnelly et al. |
| 2011/0140518 A1 | 6/2011 | Hattori |
| 2011/0163717 A1 | 7/2011 | Gale |
| 2011/0189507 A1 | 8/2011 | Reis |
| 2011/0200193 A1 | 8/2011 | Blitz et al. |
| 2011/0302078 A1 | 12/2011 | Failing |
| 2011/0320074 A1 | 12/2011 | Erlston et al. |
| 2012/0012406 A1 | 1/2012 | Stoicoviciu |
| 2012/0054095 A1 | 3/2012 | Lesandro et al. |
| 2012/0068537 A1 | 3/2012 | Hintz et al. |
| 2012/0237799 A1 | 9/2012 | Jiang |
| 2012/0309455 A1 | 12/2012 | Klose et al. |
| 2013/0015668 A1 | 1/2013 | Chang et al. |
| 2013/0067253 A1 | 3/2013 | Tsuda |
| 2013/0081886 A1 | 4/2013 | Jaberian |
| 2013/0096759 A1 | 4/2013 | Breton et al. |
| 2013/0119665 A1 | 5/2013 | Berbari |
| 2013/0257144 A1 | 10/2013 | Caldeira et al. |
| 2013/0257145 A1 | 10/2013 | Caldeira et al. |
| 2013/0266826 A1 | 10/2013 | Cowperthwaite |
| 2013/0332014 A1 | 12/2013 | Jackson |
| 2014/0001905 A1 * | 1/2014 | Schawitsch ............ H02K 7/006 310/113 |
| 2014/0091573 A1 | 4/2014 | Berbari |
| 2014/0132155 A1 | 5/2014 | Strothmann |
| 2014/0197780 A1 | 7/2014 | Imamura |
| 2014/0210398 A1 | 7/2014 | Powell |
| 2014/0244082 A1 | 8/2014 | Caron |
| 2014/0266004 A1 | 9/2014 | Andrews, Jr. |
| 2014/0266070 A1 | 9/2014 | Kurtzman |

(56) References Cited

U.S. PATENT DOCUMENTS

| | | |
|---|---|---|
| 2014/0283092 A1 | 9/2014 | Mowatt et al. |
| 2014/0285209 A1 | 9/2014 | Stichowski et al. |
| 2014/0350764 A1 | 11/2014 | Arai et al. |
| 2014/0368041 A1 | 12/2014 | Tu et al. |
| 2015/0008867 A1 | 1/2015 | Smychkovich |
| 2015/0014991 A1 | 1/2015 | Al Jaeedi et al. |
| 2015/0089981 A1 | 4/2015 | Renfro |
| 2015/0210287 A1 | 7/2015 | Penilla et al. |
| 2015/0222553 A1 | 8/2015 | Macdonald et al. |
| 2015/0249362 A1 | 9/2015 | Bridgelall et al. |
| 2015/0260835 A1 | 9/2015 | Widmer et al. |
| 2015/0262154 A1 | 9/2015 | Wolfson |
| 2015/0343909 A1 | 12/2015 | Hikiri |
| 2015/0347121 A1 | 12/2015 | Harumoto |
| 2015/0363855 A1 | 12/2015 | Wu et al. |
| 2016/0034952 A1 | 2/2016 | Parkin et al. |
| 2016/0071338 A1 | 3/2016 | McQuade et al. |
| 2016/0089981 A1 | 3/2016 | Kodawara |
| 2016/0111907 A1 | 4/2016 | Lynds |
| 2016/0164373 A1 | 6/2016 | Liao et al. |
| 2016/0189311 A1 | 6/2016 | Erickson et al. |
| 2016/0236578 A1 | 8/2016 | Liao |
| 2016/0243960 A1 | 8/2016 | Wood |
| 2016/0297317 A1 | 10/2016 | Huang et al. |
| 2016/0298589 A1 | 10/2016 | Setterberg |
| 2016/0348788 A1 | 12/2016 | Lemmers |
| 2017/0036551 A1 | 2/2017 | Wu |
| 2017/0063124 A1 | 3/2017 | Yu et al. |
| 2017/0077534 A1 | 3/2017 | Guidry et al. |
| 2017/0117720 A1 | 4/2017 | Yung |
| 2017/0131999 A1 | 5/2017 | Dolby et al. |
| 2017/0142766 A1 | 5/2017 | Kim |
| 2017/0176540 A1 | 6/2017 | Omi |
| 2017/0191459 A1 | 7/2017 | Zhang |
| 2017/0363433 A1 | 12/2017 | Tennent et al. |
| 2017/0366017 A1 | 12/2017 | Clay et al. |
| 2018/0009329 A1 | 1/2018 | Tellez |
| 2018/0083469 A1 | 3/2018 | Bauer et al. |
| 2018/0154779 A1 | 6/2018 | Chol |
| 2018/0156144 A1 | 6/2018 | Inoue |
| 2018/0166750 A1 | 6/2018 | Chang |
| 2018/0204173 A1 | 7/2018 | Painter et al. |
| 2018/0204253 A1 | 7/2018 | Painter et al. |
| 2018/0204281 A1 | 7/2018 | Painter et al. |
| 2018/0205242 A1 | 7/2018 | Kelly-Morgan et al. |
| 2018/0215272 A1 | 8/2018 | Vitullo et al. |
| 2018/0254732 A1 | 9/2018 | Smolenaers |
| 2018/0312159 A1 | 11/2018 | Jent, II |
| 2018/0328745 A1 | 11/2018 | Nagy et al. |
| 2018/0351397 A1 | 12/2018 | Aharoni |
| 2018/0370537 A1 | 12/2018 | Wu |
| 2019/0001804 A1 | 1/2019 | Wilhide |
| 2019/0004580 A1 | 1/2019 | Wilhide |
| 2019/0044359 A1 | 2/2019 | Gordon et al. |
| 2019/0077254 A1 | 3/2019 | Stanley |
| 2019/0103639 A1 | 4/2019 | Guglielmo et al. |
| 2019/0140245 A1 | 5/2019 | Mensch |
| 2019/0184843 A1 | 6/2019 | Jung et al. |
| 2019/0199104 A1 | 6/2019 | Shim |
| 2019/0212997 A1 | 7/2019 | Sangameswaran et al. |
| 2019/0217720 A1 | 7/2019 | Treharne et al. |
| 2019/0245375 A1 | 8/2019 | Schmalzrieth et al. |
| 2019/0292973 A1 | 9/2019 | Jiang et al. |
| 2019/0329650 A1 | 10/2019 | Quill |
| 2019/0351895 A1 | 11/2019 | Ben-Ari |
| 2019/0351899 A1 | 11/2019 | Adam |
| 2019/0351948 A1 | 11/2019 | Derissaint |
| 2019/0359080 A1 | 11/2019 | Hellgren |
| 2019/0362922 A1 | 11/2019 | Bae et al. |
| 2019/0383627 A1 | 12/2019 | Nangeroni et al. |
| 2020/0006716 A1 | 1/2020 | Wagoner |
| 2020/0184591 A1 | 1/2020 | Balu et al. |
| 2020/0039379 A1 | 2/2020 | Schlosser |
| 2020/0094695 A1 | 3/2020 | Bowman |
| 2020/0136414 A1 | 4/2020 | Patsos |
| 2020/0186620 A1 | 6/2020 | Golgiri et al. |
| 2020/0203986 A1 | 6/2020 | Barreau |
| 2020/0207209 A1 | 7/2020 | Engel |
| 2020/0238929 A1 | 7/2020 | Wippler |
| 2020/0241555 A1 | 7/2020 | Dogishi |
| 2020/0244088 A1 | 7/2020 | Will et al. |
| 2020/0258325 A1 | 8/2020 | Maria |
| 2020/0295412 A1 | 9/2020 | Chen |
| 2020/0324763 A1 | 10/2020 | Switkes et al. |
| 2020/0353839 A1 | 11/2020 | Tarchinski et al. |
| 2020/0381784 A1 | 12/2020 | Yamamoto |
| 2020/0384879 A1 | 12/2020 | Ebisu et al. |
| 2021/0001737 A1 | 1/2021 | Hoess et al. |
| 2021/0046833 A1 | 2/2021 | Macaluso |
| 2021/0065073 A1 | 3/2021 | Maeda et al. |
| 2021/0080943 A1 | 3/2021 | Iwamoto et al. |
| 2021/0110323 A1 | 4/2021 | Munoz et al. |
| 2021/0167988 A1 | 6/2021 | Harata et al. |
| 2021/0173411 A1 | 6/2021 | Rao et al. |
| 2021/0183175 A1 | 6/2021 | Dunger |
| 2021/0188101 A1 | 6/2021 | Abu Qahouq et al. |
| 2021/0188115 A1 | 6/2021 | Kazuno |
| 2021/0197687 A1 | 7/2021 | Searcy |
| 2021/0229687 A1 | 7/2021 | Hashimoto et al. |
| 2021/0284043 A1 | 9/2021 | Wang et al. |
| 2021/0312544 A1 | 10/2021 | Inoue et al. |
| 2021/0313121 A1 | 10/2021 | Macaluso |
| 2021/0334913 A1 | 10/2021 | Klein |
| 2021/0405996 A1 | 12/2021 | Takatsuna et al. |
| 2022/0016941 A1 | 1/2022 | Sams |
| 2022/0028625 A1 | 1/2022 | Macaluso |
| 2022/0028627 A1 | 1/2022 | Macaluso |
| 2022/0050143 A1 | 2/2022 | Maeda et al. |
| 2022/0052582 A1 | 2/2022 | Giannotta |
| 2022/0109314 A1 | 4/2022 | Pena |
| 2022/0111758 A1 | 4/2022 | Ijaz et al. |
| 2022/0179641 A1 | 6/2022 | Harata et al. |
| 2022/0179644 A1 | 6/2022 | Harata et al. |
| 2022/0253301 A1 | 8/2022 | Harata et al. |
| 2022/0261836 A1 | 8/2022 | Kimomura et al. |
| 2022/0301775 A1 | 9/2022 | Macaluso |
| 2022/0314837 A1 | 10/2022 | Gupta |
| 2022/0334818 A1 | 10/2022 | McFarland |
| 2022/0334822 A1 | 10/2022 | Sakakibara et al. |
| 2022/0340035 A1 | 10/2022 | Kim et al. |
| 2022/0374027 A1 | 11/2022 | Watts et al. |
| 2022/0399581 A1 | 12/2022 | Wood |
| 2023/0001792 A1 | 1/2023 | Fisker et al. |
| 2023/0005305 A1 | 1/2023 | Sakurai et al. |
| 2023/0038222 A1 | 2/2023 | Howell |
| 2023/0068432 A1 | 3/2023 | Upadhyay et al. |
| 2023/0123166 A1 | 4/2023 | Deighton |
| 2023/0125192 A1 | 4/2023 | Macaluso |
| 2023/0142500 A1 | 5/2023 | Marzoughi et al. |
| 2023/0143096 A1 | 5/2023 | Macaluso |
| 2023/0150380 A1 | 5/2023 | Macaluso |
| 2023/0154692 A1 | 5/2023 | Macaluso |
| 2023/0155401 A1 | 5/2023 | Kuranuki et al. |
| 2023/0171574 A1 | 6/2023 | Macaluso |
| 2023/0187145 A1 | 6/2023 | Macaluso |
| 2023/0187757 A1 | 6/2023 | Pouyadou |
| 2023/0261509 A1 | 8/2023 | Dalal et al. |
| 2023/0302962 A1 | 9/2023 | Couture et al. |
| 2023/0336055 A1 | 10/2023 | Macaluso |

FOREIGN PATENT DOCUMENTS

| | | | |
|---|---|---|---|
| CN | 202294336 U | | 7/2012 |
| CN | 102963263 A | * | 3/2013 |
| CN | 108473063 | | 8/2013 |
| CN | 106846153 | | 6/2017 |
| CN | 107117038 | | 9/2017 |
| CN | 110549902 | | 12/2019 |
| CN | 110633815 | | 12/2019 |
| CN | 107804326 | | 1/2020 |
| CN | 110889601 | | 3/2020 |
| CN | 112977043 | | 6/2021 |
| CN | 113479111 | | 10/2021 |
| CN | 215398141 U | * | 1/2022 |

(56) References Cited

FOREIGN PATENT DOCUMENTS

| | | | |
|---|---|---|---|
| DE | 102017008723 | 5/2018 | |
| DE | 102011018457 | 1/2022 | |
| EP | 1 253 698 | 10/2002 | |
| GB | 2325201 A * | 11/1998 | ............ B60K 25/08 |
| JP | 2002-257026 | 9/2002 | |
| JP | 2003-278633 | 10/2003 | |
| JP | 2011-132873 | 7/2011 | |
| JP | 2015-027164 | 2/2015 | |
| JP | 2016-170600 | 9/2016 | |
| JP | 6687274 | 4/2020 | |
| KR | 102266609 | 6/2021 | |
| WO | WO 09/149769 | 12/2009 | |
| WO | WO 10/133863 | 11/2010 | |
| WO | WO 11/148531 | 12/2011 | |
| WO | WO 17/030354 | 2/2017 | |
| WO | WO 17/213079 | 12/2017 | |
| WO | WO 18/046979 | 3/2018 | |
| WO | WO 18/083279 | 5/2018 | |
| WO | WO 19/117894 | 6/2019 | |
| WO | WO 19/145777 | 8/2019 | |
| WO | WO 19/219997 | 11/2019 | |
| WO | WO 19/240783 | 12/2019 | |
| WO | WO 20/191367 | 9/2020 | |
| WO | WO 21/187071 | 9/2021 | |
| WO | WO 22/015017 | 1/2022 | |
| WO | WO 22/219510 | 10/2022 | |

* cited by examiner

VEHICLE ENERGY GENERATION SYSTEM

FIELD OF THE DISCLOSURE

The present disclosure relates generally to generating and providing energy for a vehicle powered, at least in part, by electricity, and more specifically, to generating and conveying the energy to the vehicle while the vehicle is mobile.

BACKGROUND

Electric vehicles derive locomotion power from electricity often received from an energy storage device within the electric vehicle. Battery electric vehicles (BEVs) are often proposed to have an energy storage/containment device, such as a battery, charged through some type of wired or wireless connection at one or more stationary locations, for example household or commercial supply sources. The wired charging connections require cables or other similar connectors physically connected to a stationary power supply. The wireless charging connections require one or more antennas or other similar structures wirelessly connected to a power supply that generates a wireless field via its own antenna(s). However, such wired and wireless stationary charging systems may be inconvenient or cumbersome and have other drawbacks, such as degradation during energy transference, inefficiencies or losses, requiring a specific location for charging, and so forth. As such, alternatives for stationary wired or wireless charging systems and methods that efficiently and safely transfer energy for charging electric vehicles are desirable.

SUMMARY

Various embodiments of systems, methods and devices within the scope of the appended claims each have several aspects, no single one of which is solely responsible for the desirable attributes described herein. Without limiting the scope of the appended claims, the description below describes some prominent features.

Details of one or more embodiments of the subject matter described in this specification are set forth in the accompanying drawings and the description below. Other features, aspects, and advantages will become apparent from the description, the drawings, and the claims. Note that relative dimensions of the following figures may not be drawn to scale.

The present disclosure provides a system and apparatus for generating energy in response to a rotating component of a vehicle. In a first aspect, a system for generating energy in response to a movement of a vehicle includes an energy recovery mechanism configured to receive rotational energy from a drive shaft of the vehicle where the energy recovery mechanism is secured to a feature of the vehicle. The system further includes an energy storage electrically coupled with the energy recovery mechanism and configured to receive a portion of an electrical output to store as energy, and a motor electrically coupled with the energy storage and configured to receive a portion of the energy.

In some embodiments, the energy storage includes a battery and/or a capacitor. In some embodiments, the feature of the vehicle is one of a vehicle frame, capacitor, generator, gearbox, or battery. In some embodiments, the system includes a flexible arm coupling the energy recovery mechanism to the feature of the vehicle. In some embodiments, the energy recovery mechanism is immovably fixed to the drive shaft. In some embodiments, the system includes a second energy recovery mechanism.

In another aspect, a system for generating energy in response to a movement of a vehicle includes an energy recovery mechanism configured to receive rotational energy from a drive shaft of the vehicle, where the energy recovery mechanism includes a housing with one or more rollers positioned tangentially adjacent the drive shaft and configured to rotate in response to a rotation of the drive shaft of the vehicle. The system further includes a generator rotatably coupled to the energy recovery mechanism and configured to generate an electrical output in response to the rotation of the roller, a capacitor electrically coupled with the generator and configured to receive a portion of the electrical output to store as capacitor energy, and a motor electrically coupled with the capacitor and configured to receive a portion of the capacitor energy.

In some embodiments, the system includes a flexible arm mechanically connected to the housing and a feature of the vehicle, where the flexible arm is configured to apply a force to the one or more rollers to cause the one or more rollers to contact the drive shaft. In some embodiments, the flexible arm is configured to bend. In some embodiments, the flexible arm is configured to pivot about one or more joints. In some embodiments, the flexible arm is configured to adjust a magnitude of the force. In some embodiments, the flexible arm is configured to adjust a magnitude of the force based on at least a braking of the vehicle. In some embodiments, the flexible arm is configured to adjust a magnitude of the force based on at least an acceleration of the vehicle. In some embodiments, the system further includes a battery electrically coupled with the capacitor and configured to receive a portion of the capacitor energy to store as a battery energy. In some embodiments, the motor is configured to receive a portion of the battery energy. In some embodiments, the drive shaft includes one or more grooves for accommodating the one or more rollers. In some embodiments, the one or more rollers fit substantially within the one or more grooves. In some embodiments, a material on a surface of the one or more grooves is different than a material of the drive shaft. In some embodiments, a surface of the one or more grooves is textured to increase friction with the one or more rollers. In some embodiments, the one or more rollers are positioned circumferentially around the drive shaft. In some embodiments, the one or more rollers are positioned longitudinally along the drive shaft. In some embodiments, the housing partially encompasses the drive shaft. In some embodiments, the housing fully encompasses the drive shaft.

In another aspect, a system for generating energy in response to a movement of a vehicle includes an energy recovery mechanism configured to receive rotational energy from a magnetic drive shaft of the vehicle, the energy recovery mechanism including one or more wires positioned adjacent the magnetic drive shaft of the vehicle, where a current is induced in the one or more wires as the magnetic drive shaft rotates. The system further includes a capacitor electrically coupled with the energy recovery mechanism and configured to receive a portion of the electrical output to store as capacitor energy, and a motor electrically coupled with the capacitor and configured to receive a portion of the capacitor energy.

In some embodiments, the system includes a battery electrically coupled with the capacitor and configured to receive a portion of the capacitor energy to store as battery energy. In some embodiments, the motor is configured to receive a portion of the battery energy. In some embodiments, the energy recovery mechanism is coupled to a feature of the vehicle via a flexible arm. In some embodiments, the flexible arm is configured to move from an engaged to a disengaged position. In some embodiments, the feature of the vehicle is one of a vehicle frame, capacitor, or battery. In some embodiments, the magnetic drive shaft includes a permanent magnet. In some embodiments, the magnetic drive shaft partially includes a permanent magnet. In some embodiments, the magnetic drive shaft includes a permanent electromagnet positioned between two semicylinders of metal.

In another aspect, a method for generating energy in response to rotational movement of a moving vehicle includes rotating a shaft, the shaft including a textured surface spanning an outer circumference, rotating a roller in response to the rotation of the shaft, where the roller contacts the textured surface of the shaft, applying a force to the roller to cause the roller to maintain contact with the textured surface, generating, via a generator, an electrical output based on the rotation of the roller, and conveying the electrical output to an energy storage device or motor.

In some embodiments, the shaft is a drive shaft. In some embodiments, the textured surface is positioned within a groove of the drive shaft. In some embodiments, the textured surface is positioned on a shoulder of the drive shaft. In some embodiments, the energy storage device is a one or more capacitors. In some embodiments, the method further includes notifying a driver that the one or more capacitors is fully charged. In some embodiments, the force is applied to the roller based on a received signal from the driver. In some embodiments, method further includes transferring the energy from the capacitor to the motor based on a signal from the driver. In some embodiments, the force is reduced or eliminated while the energy is transferred from the capacitor to the motor.

DETAILED DESCRIPTION

Overview

Example embodiments and implementations of an apparatus for generating energy (for example, in response to the rotation of a component of a vehicle) are described herein. The apparatus can be implemented in conjunction with a vehicle, such as an electric vehicle. The vehicle can include a car, a truck, a semi-truck, a tractor-trailer, a tractor, farm equipment, construction equipment, carts, scooters, motorcycles, bicycles, trains, trams, and the like, for example. The apparatus can comprise one or more rollers configured to be rotatably couplable (for example, removably coupled either through direct physical contact or through indirect operable coupling) to one or more components of a vehicle (for example, wheel, drive shaft, axel etc.) such that rotation of the component of the vehicle causes rotation of the one or more rollers. The one or more rollers can be rotatably coupled (either through direct physical contact or through indirect operable coupling) to one or more generators. The generators can be configured to generate energy (for example, an electrical output), in response to rotation of the one or more rollers. In some embodiments, the one or more rollers can be rotatably coupled to the one or more generators via one or more flexible arms configured to rotate in response to a rotation of the one or more rollers. In some embodiments, the one or more rollers can be rotatably coupled to the one or more generators via one or more other mechanical coupling devices such as a chain, belt, gearing, pulley, sprocket and the like. In some embodiments, the one or more generators can provide generated energy (for example, electrical output) to the vehicle. The electrical output that is provided to the vehicle from the generator may be used to power the vehicle. For example, the electrical output may be conveyed to a motor of the vehicle and/or to an energy storage device of the vehicle for later use and/or consumption by the vehicle. In some embodiments, the energy of the rotating component is captured by inducing a current in one or more wires positioned adjacent the rotating component.

Example Apparatus Embodiments and Implementations

Various example embodiments of an apparatus for generating energy are described herein, for example, with reference to the figures. The various embodiments and their implementations are given as examples and are not meant to be limiting of the present disclosure.

Furthermore, the structural and/or operational features described with reference to any of the example embodiments and/or figures are not meant to be limited to that embodiment and/or figure. Rather the structural and/or operation features of the various embodiments and figures may be implemented or otherwise combined in each of the various other embodiments.

In some embodiments, the term "shaft" may refer to a "flexible arm" as described in U.S. Pat. No. 11,577,606 which is hereby incorporated by reference in its entirety.

Figure 1A:
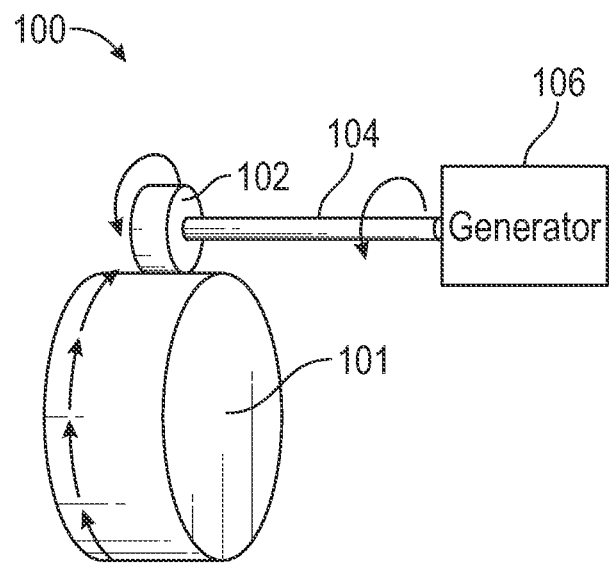
FIG. 1A is a schematic diagram illustrating an example embodiment of an apparatus for generating energy in response to rotation of a wheel of vehicle.

FIG. 1A is a diagram illustrating an example embodiment of an apparatus 100 comprising a roller rotatably couplable to a wheel of a vehicle. As shown in FIG. 1A, the apparatus 100 may comprise a roller 102, a shaft 104 and a generator 106. The roller 102 may comprise a substantially cylindrical shape comprising a length, a diameter, a curved surface and a center axis as described in greater detail with reference to FIG. 2. A curved surface of the roller 102 may be in substantial physical contact with a curved surface of the wheel 101. The center axis of the roller 102 may be substantially parallel to a center axis of the wheel 101. The roller 102 may be configured to rotate about its center axis. The roller 102 may be rotatably couplable to a wheel 101 of the vehicle such that rotation of the wheel 101 causes rotation of the roller 102. The roller 102 may rotate in an opposite direction than the wheel 101, for example as shown in FIG. 1A. The roller 102 may rotate at a greater rotational velocity than the wheel 101.

With continued reference to FIG. 1A, the roller 102 may be rotatably coupled to a shaft 104 such that rotation of the roller 102 can cause rotation of the shaft 104. The shaft 104 may rotate about an axis that is substantially parallel to the axis of the roller 102 and may rotate in a same direction as the roller 102, for example as shown in FIG. 1A. In some embodiments, the shaft 104 may be fixedly rotatably coupled to the roller 102 such that the shaft 104 can only rotate when the roller 102 rotates. In some embodiments, the shaft 104 may be configured to rotate when the roller 102 is not rotating. For example, after a roller 102 discontinues rotating, the shaft 104 may continue to rotate, for example due to rotational inertia. For example, the roller 102 and/or shaft 104 may comprise a one-way ratchet device that causes the shaft 104 to rotate when the roller 102 rotates and allows the shaft 104 to continue to rotate for a period of time even after the roller 102 stops rotating. In some embodiments, the shaft 104 may be configured to not rotate when the roller 102 is rotating. For example, in a disengaged state, as discussed in greater detail herein, the roller 102 may rotate in response to rotation of a vehicle wheel but may not cause rotation of the shaft 104 to generate energy at the generator 106.

The shaft 104 may be operably coupled to a generator 106. The generator 106 may be configured to generate energy (for example, an electrical output) in response to mechanical movement such as the rotation of the shaft 104. The generator 106 may be electrically coupled to the vehicle and may provide generated energy to the vehicle, for example to a motor of the vehicle and/or to an energy storage device of the vehicle that includes one or more batteries and/or capacitors (for example, ultracapacitors) or one or more hypercapacitors.

Figure 1B:
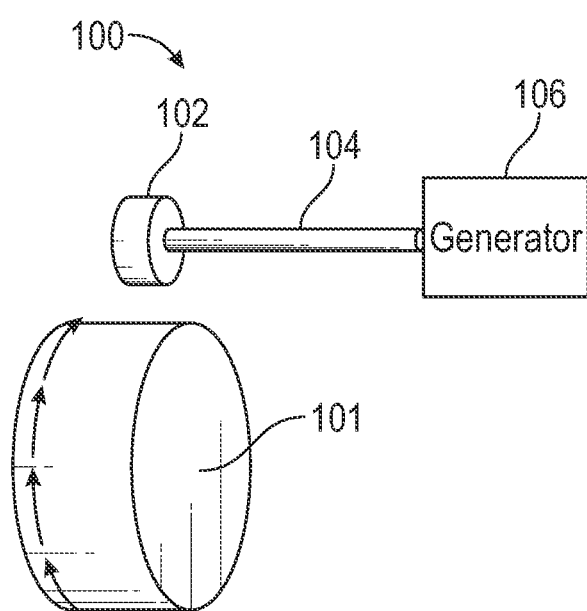
FIG. 1B is a schematic diagram illustrating an example embodiment of the apparatus of FIG. 1A in a disengaged state.

FIG. 1B is a diagram illustrating an example embodiment of the apparatus 100 comprising a roller that is removably coupled to a wheel of a vehicle. The apparatus 100 may exist in one of (1) an engaged state or (2) a disengaged state. In the engaged state, the roller 102 may be in physical contact with the wheel 101 (for example, rotatably coupled to the wheel 101) in which the rotation of the wheel 101 causes the roller 102 to rotate. In some embodiments, in the disengaged state, the roller 102 may not be in physical contact with the wheel 101 such that rotation of the wheel 101 does not cause the roller 102 to rotate. In some embodiments, in the disengaged state, the roller 102 may be in physical contact with the wheel 101 such that rotation of the wheel 101 causes the roller 102 to rotate but the roller 102 may not be rotatably coupled to the shaft 104 such that rotation of the roller 102 does not cause the shaft 104 (or other similar component) to rotate to cause generation of energy at the generator 106.

FIG. 1B shows a roller 102 in an example disengaged state such that the roller 102 is not in physical contact with the wheel 101 and will not rotate in response to a rotation of the wheel 101. The roller 102 may transition between the engaged and the disengaged states. In some embodiments, the roller 102 may transition between the engaged and the disengaged states automatically, for example, based at least in part on an energy demand of the vehicle (for example, an energy demand of a motor of the vehicle) and/or a rotational velocity of the wheel 101. In some embodiments, the roller 102 may transition between the engaged and the disengaged states in response to a user input, such as a driver of the vehicle activating a user input device, such as a button, lever, or switch.

Figure 2:
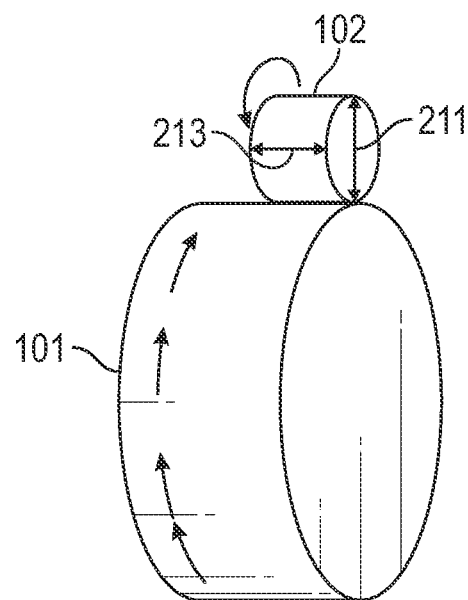
FIG. 2 is a schematic diagram illustrating that a roller of the apparatus can have various dimensions.

FIG. 2 is a diagram illustrating an example embodiment of a roller 102. As shown in FIG. 2, the roller 102 may comprise a length 213 and a diameter 211. The roller 102 may have any length 213 such as is required or desired. The roller 102 may have any diameter 211 such as is required or desired. The diameter 211 of the roller 102 may be less than the diameter of the wheel 101 such that the roller 102 rotates at a greater rotational velocity than the wheel 101 in response to a rotation of the wheel 101. In some embodiments comprising multiple rollers, one, some or each of the multiple rollers may have a length and/or diameter that is different than the length and/or diameters of the other rollers.

In some embodiments, the roller 102 may be configured to change a size of diameter 211. In response to changing size of diameter 211, the roller 102 may rotate at various rotational velocities in response to rotation of the wheel 101 at a single rotational velocity. In some embodiments, the roller 102 may be configured to change size of diameter 211 automatically, for example, based at least in part on an energy demand of the vehicle (for example, an energy demand of a motor of the vehicle) and/or a rotational velocity of the wheel 101.

Figure 3A:
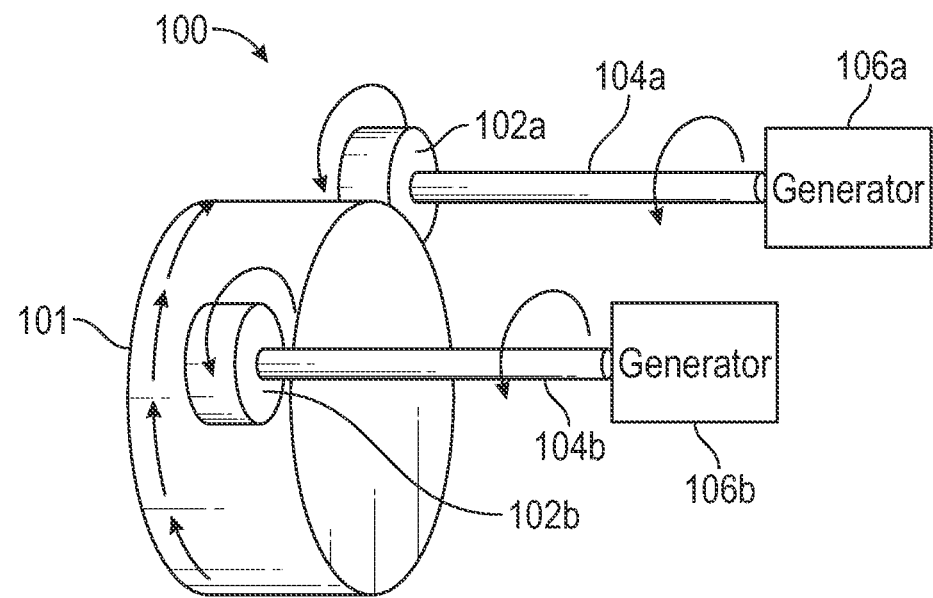
FIGS. 3A-3B are schematic diagrams illustrating example embodiments of the apparatus comprising multiple rollers.

FIG. 3A is a diagram illustrating an example embodiment of the apparatus 100 comprising two rollers and two generators. As shown in FIG. 3A, the apparatus 100 may comprise a first roller 102a, a first shaft 104a, a first generator 106a, a second roller 102b, a second shaft 104b and a second generator 106b. The components of the example embodiment shown in FIG. 3A may comprise similar structural and/or operational features as described with reference to other embodiments described herein, for example, the example embodiment of FIG. 1A. For example, the rotation of the wheel 101 may cause the rollers 102a/102b to rotate thereby causing shafts 104a/104b to rotate thereby causing the generators 106a/106b to generator energy. FIG. 3A is not meant to be limiting of the present disclosure. The apparatus 100 may comprise any number of rollers, shafts and/or generators as required and/or desired.

Figure 3B:
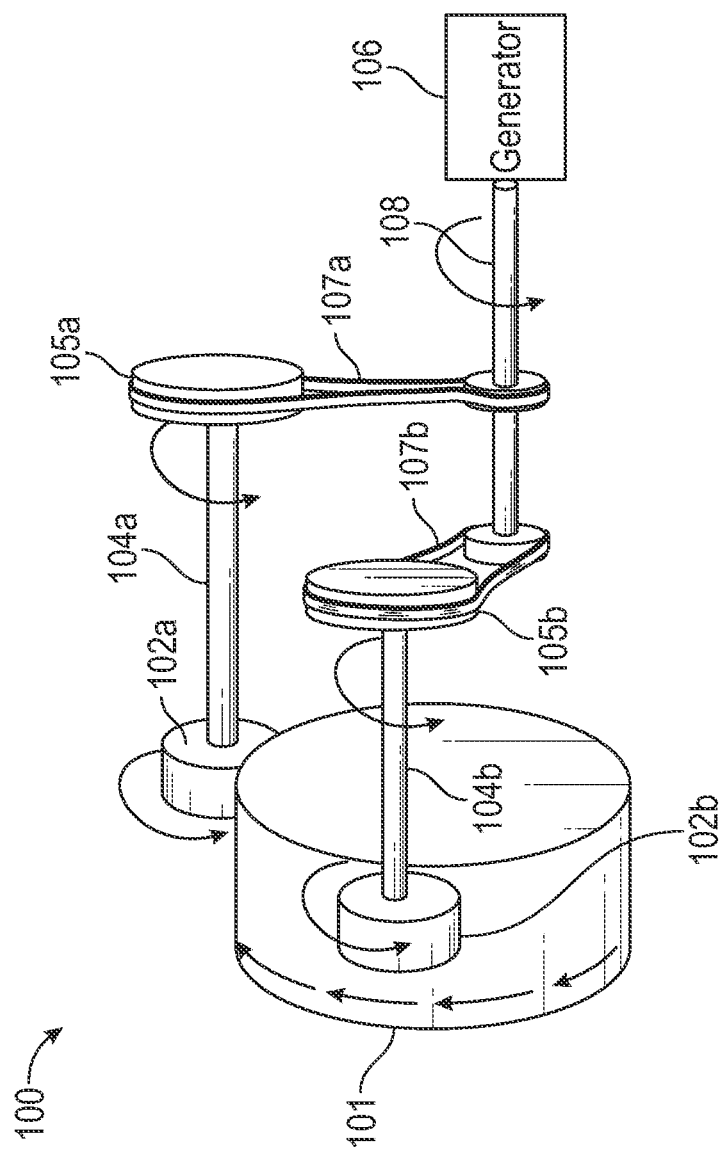

FIG. 3B is a diagram illustrating an example embodiment of the apparatus 100 comprising two rollers and a generator. As shown in FIG. 3B, the apparatus 100 may comprise a first roller 102a, a first shaft 104a, a first sprocket 105a, a first coupling device 107a, a second roller 102b, a second shaft 104b, a second sprocket 105b, a second coupling device 107b, a third shaft 108 and generator 106. The components of the example embodiment shown in FIG. 3B may comprise similar structural and/or operational features as described with reference to other embodiments described herein, for example FIG. 1A. The sprockets 105a/105b may be rotatably coupled to the shafts 104a/104b and may rotate in response to rotation of the shafts 104a/104b. The sprockets 105a/105b may be rotatably coupled to a third shaft 108, for example via coupling devices 107a/107b as shown in FIG. 3B. The coupling devices 107a/107b may comprise one or more of a chain, belt, gearing, pulley or the like. The third shaft 108 may be operably coupled to the generator 106 such that rotation of the third shaft 108 causes the generator to generate energy. Thus, the generator 106 may generate energy in response to a rotation of the first and/or second rollers 102a/102b.

In some embodiments, the third shaft 108 may rotate in response to simultaneous rotations of the first and second rollers 102a/102b. In some embodiments, the third shaft 108 may rotate in response to rotation of either the first or second rollers 102a/102b.

In some embodiments, the shafts 104a/104b may be fixedly rotatably coupled to the sprockets 105a/105b such that the sprockets 105a/105b can only rotate when the shafts 104a/104b rotate. In some embodiments, the sprockets 105a/105b may be configured to rotate when the shafts 104a/104b are not rotating, for example, after the shafts 104a/104b discontinue rotating, the sprockets 105a/105b may continue to rotate, for example due to rotational inertia. For example, the shafts 104a/104b and/or sprockets 105a/105b may comprise a one-way ratchet device that causes the sprockets 105a/105b to rotate when the shafts 104a/104b rotate and allows the sprockets 105a/105b to continue to rotate when the shafts 104a/104b are not rotating. The sprockets 105a/105b and the third shaft 108 may comprise similar operational and/or structural features to allow the third shaft 108 to rotate when one or more of the sprockets 105a/105b are not rotating in some embodiments or to cause the third shaft 108 to rotate only when the sprockets 105a/105b are rotating in other embodiments.

Figure 4A:
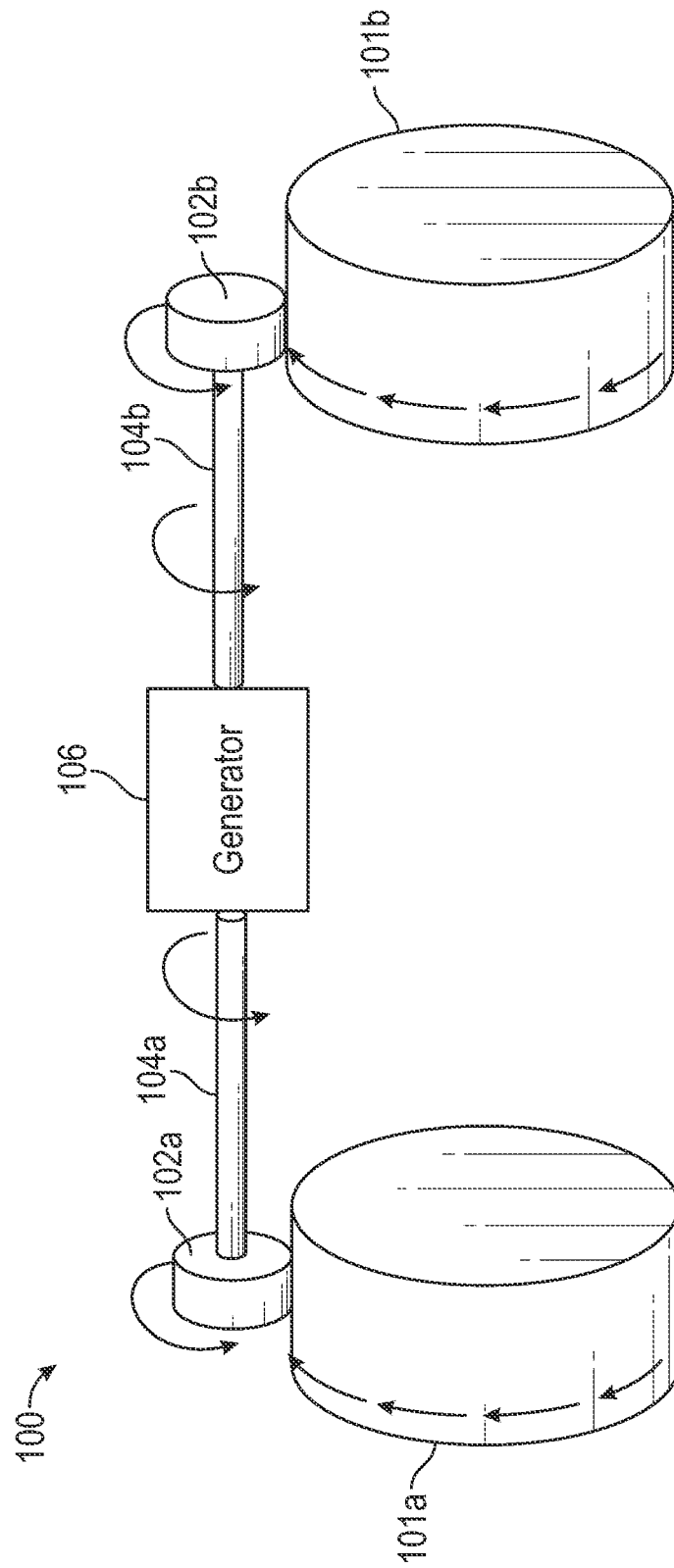
FIGS. 4A-4B are schematic diagrams illustrating example embodiments of the apparatus implemented on multiple wheels of a vehicle.

FIG. 4A is a diagram illustrating an example embodiment of the apparatus 100 implemented with multiple wheels of a vehicle. As shown in FIG. 4A, the apparatus 100 may comprise a first roller 102a rotatably couplable to a first wheel 101a of a vehicle, a second roller 102b rotatably couplable to a second wheel 101b of a vehicle. The components of the example embodiment shown in FIG. 4A may comprise similar structural and/or operational features as described with reference to other embodiments described herein, for example, the example embodiment of FIG. 1A. For example, rotation of the first and/or second rollers 102a/102b may cause the generator 106 to generate energy.

FIG. 4A is not meant to be limiting of the present disclosure. The apparatus 100 may comprise any number of rollers, shafts and/or generators as required and/or desired and may be implemented on any number of wheels of a vehicle as required or desired, for example on one, two, three or four wheels (for example, with reference to implementation with a car) or 18 wheels (for example, with reference to implementation with a semi-truck).

Figure 4B:
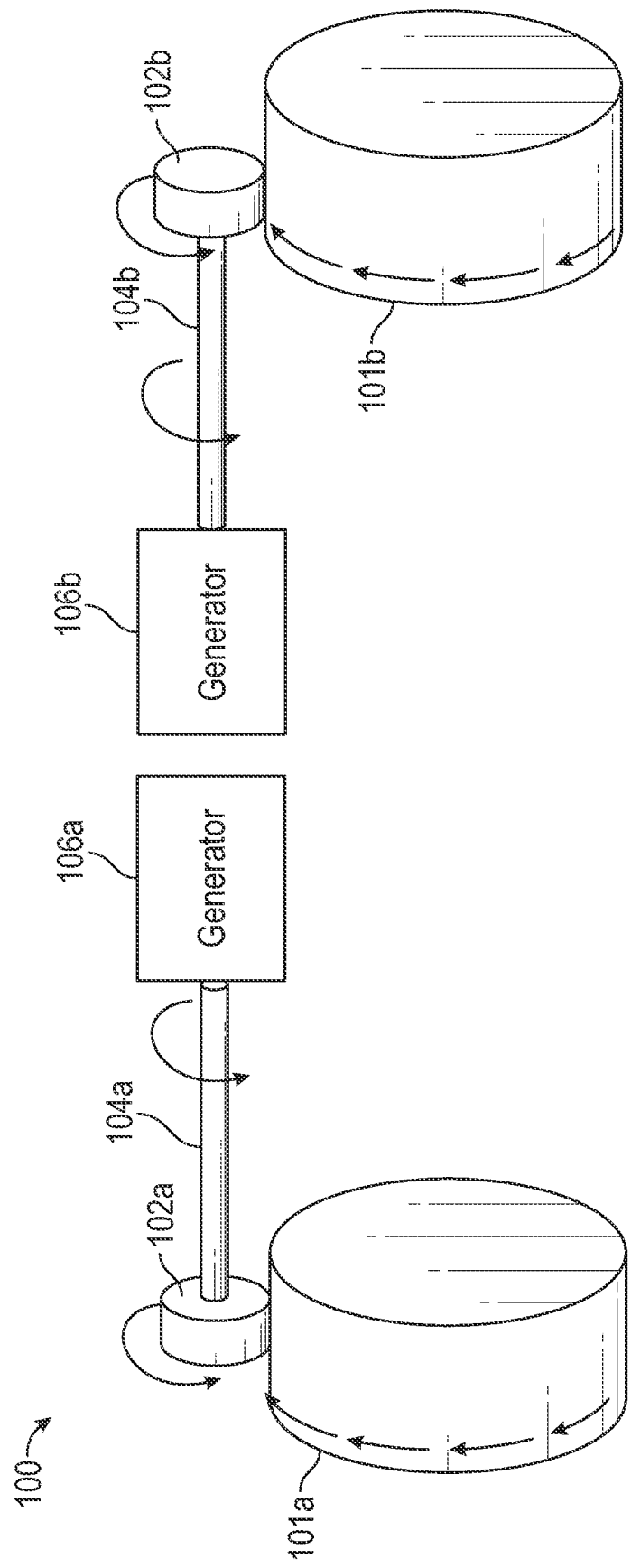

FIG. 4B is a diagram illustrating an example embodiment of the apparatus 100 implemented with multiple wheels of a vehicle and comprising multiple generators. As shown in FIG. 4B, the apparatus 100 may comprise a first and second generator 106a/106b. The components of the example embodiment shown in FIG. 4B may comprise similar structural and/or operational features as described with reference to other embodiments described herein, for example, the example embodiment of FIG. 1A. For example, rotation of the first roller 102a may cause the first generator 106a to generate energy and rotation of the second roller 102b may cause the generator 106b to generate energy. The generators 106a/106b may be in electrical communication with the vehicle and/or each other.

Figure 5A:
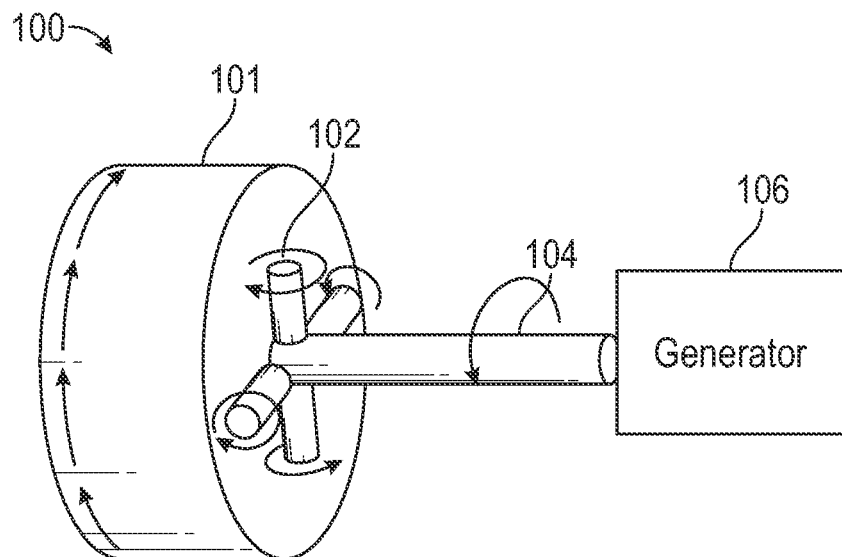
FIG. 5A is a schematic diagram illustrating an example embodiment of the apparatus comprising rollers implemented on a sidewall of a wheel of a vehicle.

FIG. 5A is a diagram illustrating an example embodiment of the apparatus 100 comprising one or more rollers rotatably couplable to a sidewall of a wheel of a vehicle. As shown in FIG. 5A, the apparatus 100 may comprise one or more rollers 102, a shaft 104 and a generator 106. Each of the one or more rollers 102 may comprise a substantially cylindrical shape and may further comprise a length, a diameter, a curved surface and a center axis as described in greater detail with reference to FIG. 2 and/or FIGS. 7A-7B. A curved surface of each of the one more rollers 102 may be in substantial physical contact with a sidewall surface of the wheel 101. The center axis of each of the one or more rollers 102 may be substantially orthogonal to a center axis of the wheel 101. Each of the one or more rollers 102 may be configured to rotate about its center axis. Each of the one or more rollers 102 may be rotatably couplable to the wheel 101 of the vehicle such that rotation of the wheel 101 causes rotation of each of the one or more rollers 102. Each of the one or more rollers 102 may rotate at a greater rotational velocity than the wheel 101.

The roller(s) 102 may be configured to be in physical contact with a sidewall of the wheel 101 at any distance away from a center axis of the wheel. For example, the roller(s) 102 may be in physical contact with a sidewall of the wheel 101 close to the center axis of the wheel or far from a center axis of the wheel. The roller(s) 102 may rotate at a greater rotational velocity when in physical contact with the sidewall of the wheel 101 far from a center axis of the wheel 101 than when in physical contact with the sidewall of the wheel 101 near a center axis of the wheel 101.

With continued reference to FIG. 5A, the roller(s) 102 may be rotatably coupled to a shaft 104 such that rotation of the roller(s) 102 causes rotation of the shaft 104. The roller 102 may be coupled (for example, rotatably coupled) to the shaft 104 for example via one or more coupling devices as required or desired such as gears, sprockets, chains, belts, pulleys and the like. The shaft 104 may rotate about an axis that is substantially orthogonal to the axes of the roller(s) 102. In some embodiments, the shaft 104 may be fixedly rotatably coupled to the roller(s) 102 such that the shaft 104 can only rotate when the roller(s) 102 rotate. In some embodiments, the shaft 104 may be configured to rotate when one or more of the roller(s) 102 is not rotating, for example, after a roller 102 discontinues rotating, the shaft 104 may continue to rotate, for example due to rotational inertia. For example, the roller(s) 102 and/or shaft 104 may comprise a one-way ratchet device that causes the shaft 104 to rotate when the roller(s) 102 rotate and allows the shaft 104 to continue to rotate even when one of the roller(s) 102 is not rotating (for example, has stopped rotating). In some embodiments, the shaft 104 may be configured to not rotate when one or more of the roller(s) 102 are rotating. For example, in a disengaged state, as discussed in greater detail herein, the roller(s) 102 may rotate in response to rotation of a vehicle wheel but may not cause rotation of the shaft 104 to generate energy at the generator 106.

The shaft 104 may be operably coupled to a generator 106. The generator 106 may be configured to generate energy (for example, an electrical output) in response to mechanical movement such as the rotation of the shaft 104. The generator 106 may be electrically coupled to the vehicle and may provide generated energy to the vehicle, for example to a motor of the vehicle and/or to an energy storage device of the vehicle that includes one or more batteries and/or capacitors (for example, ultracapacitors) or one or more hypercapacitors.

Figure 5B:
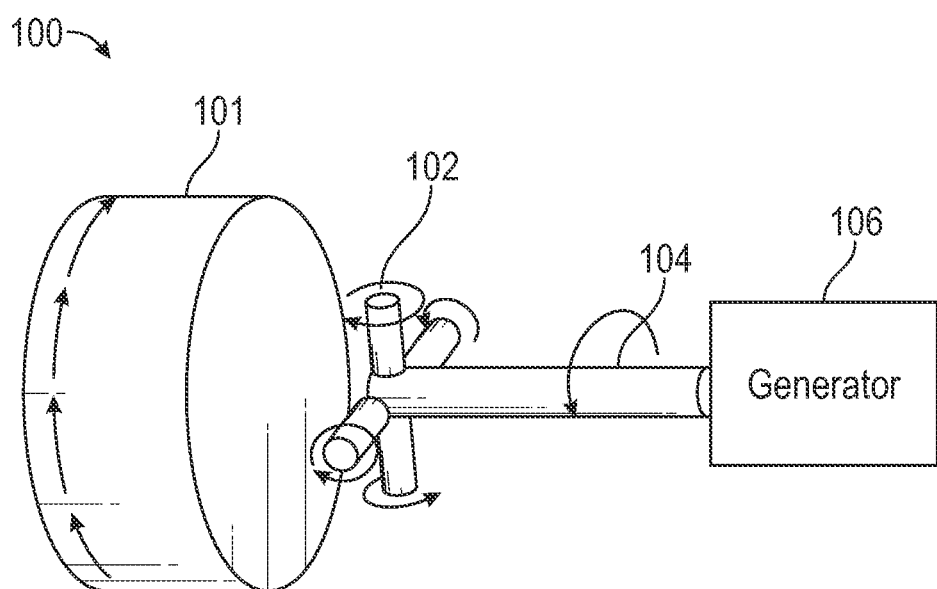
FIG. 5B is a schematic diagram illustrating an example embodiment of the apparatus of FIG. 5A in a disengaged state.

FIG. 5B is a diagram illustrating an example embodiment of the apparatus 100 comprising one or more rollers that are removably coupled to a sidewall of a wheel of a vehicle. The apparatus 100 may exist in one of (1) an engaged state or (2) a disengaged state. In the engaged state, the roller(s) 102 may be in physical contact with the wheel 101 (for example, rotatably coupled to a sidewall of the wheel 101) in which the rotation of the wheel 101 causes the roller(s) 102 to rotate. In some embodiments, in the disengaged state, the roller(s) 102 may not be in physical contact with the wheel 101 such that rotation of the wheel 101 does not cause the roller(s) 102 to rotate. In some embodiments, in the disengaged state, the roller(s) 102 may be in physical contact with the wheel 101 such that rotation of the wheel 101 causes the roller(s) 102 to rotate but the roller(s) 102 may not be rotatably coupled to the shaft 104 such that rotation of the roller(s) 102 does not cause the shaft 104 (or other similar component) to rotate to cause generation of energy at the generator 106.

FIG. 5B shows roller(s) 102 in an example disengaged state such that the roller(s) 102 are not in physical contact with the wheel 101 and will not rotate in response to a rotation of the wheel 101. The roller(s) 102 may transition between the engaged and the disengaged states. In some embodiments, the roller(s) 102 may transition between the engaged and the disengaged states automatically, for example, based at least in part on an energy demand of the vehicle (for example, an energy demand of a motor of the vehicle) and/or a rotational velocity of the wheel 101. In some embodiments, the roller(s) 102 may transition between the engaged and the disengaged states in response to a user input, such as a driver of the vehicle toggling a user input device such as a button, switch or lever.

Figure 6A:
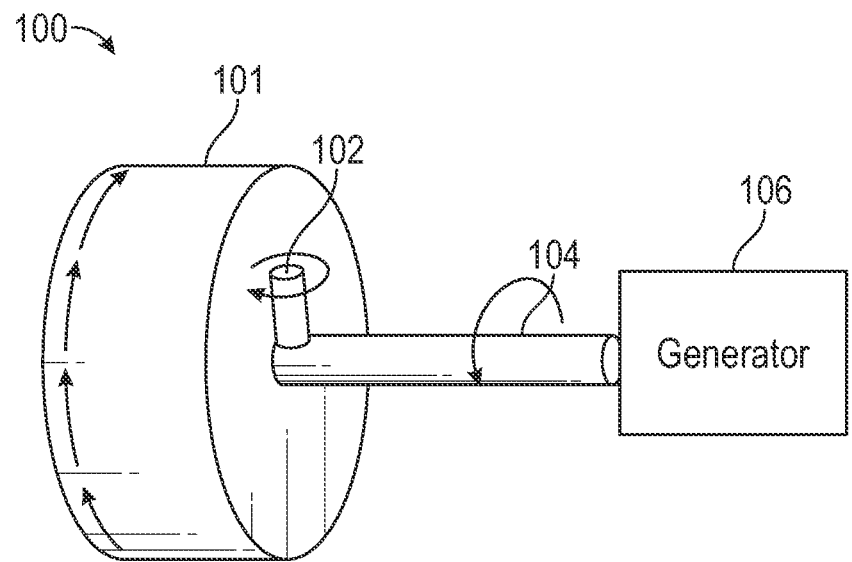
FIGS. 6A-6B are schematic diagrams illustrating example embodiments of the apparatus comprising a shaft coupled to various portions of a roller.

FIG. 6A is a diagram illustrating an example embodiment of the apparatus 100 comprising a roller rotatably couplable to a sidewall of a wheel of a vehicle. As shown in FIG. 6A, the apparatus 100 may comprise a single roller 102 which may comprise similar structural and/or operational features as described with reference to other embodiments described herein, for example, the example embodiments of FIG. 1 and/or FIG. 5A.

Figure 6B:
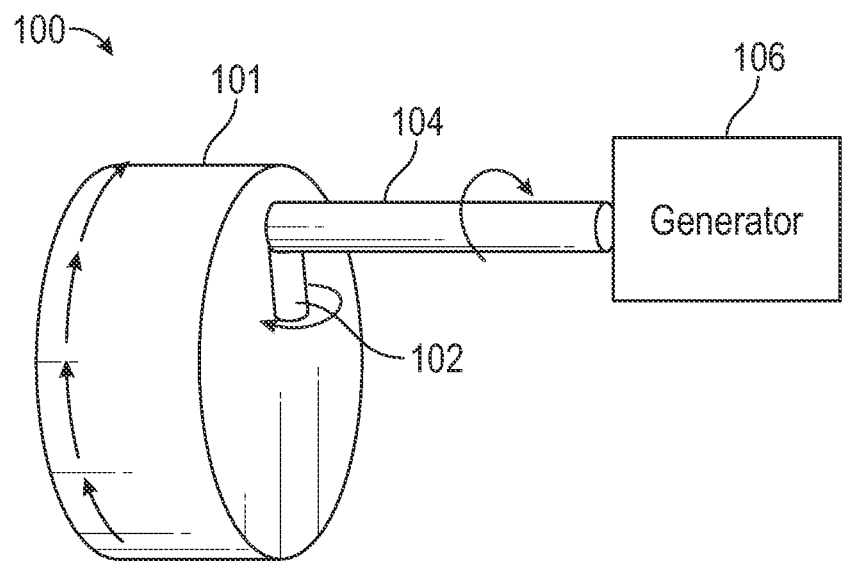

FIG. 6B is a diagram illustrating an example embodiment of the apparatus 100 comprising a roller. As shown in FIG. 6B, the apparatus 100 may comprise a single roller 102 which may comprise similar structural and/or operational features as described with reference to other embodiments described herein, for example, the example embodiments of FIG. 1 and/or FIG. 5A. As shown in FIG. 6B, the shaft 104 may be rotatably coupled to either end of the roller 102. In some embodiments, a shaft may be rotatably coupled at both ends of a roller 102.

Figure 6C:
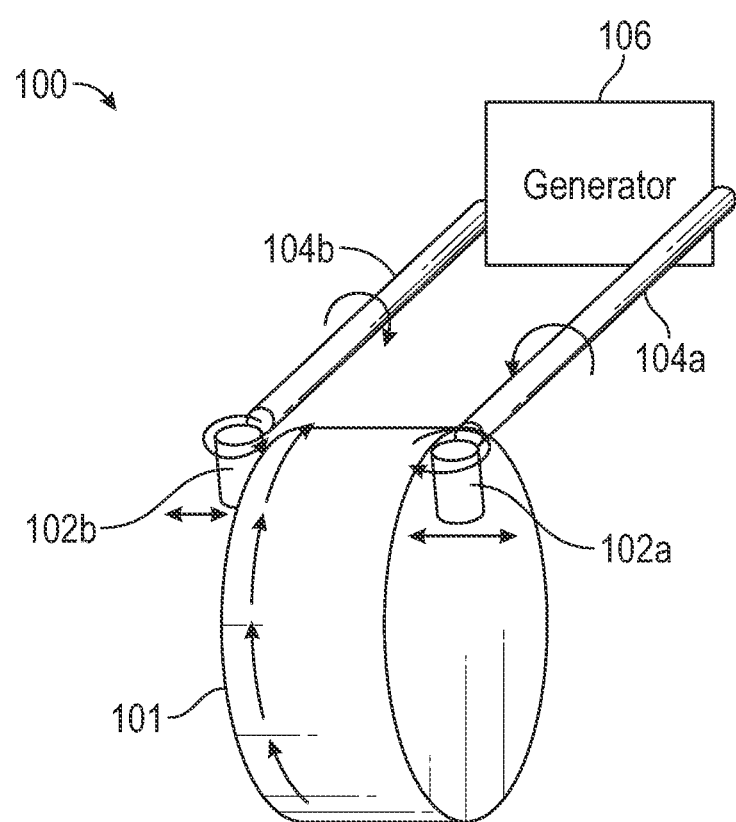
FIG. 6C is a schematic diagram illustrating an example embodiment of the apparatus on both sides of a wheel.

FIG. 6C is a diagram illustrating an example embodiment of the apparatus 100. As shown in FIG. 6C, the apparatus 100 may comprise a roller 102a on one side of a wheel 101 and a roller 102b on an opposite side of the wheel 101. The rollers 102a, 102b can be configured to be rotatably couplable to a sidewall portion of the wheel 101 and rotate in response to a rotation of the wheel 101 as described herein. The apparatus 100 may exist in one of (1) an engaged state or (2) a disengaged state and transition between the two states as discussed herein, for example by changing a physical location of the rollers 102a, 102b to physically contact or not physically contact the wheel 101.

The example embodiment of FIG. 6C can be implemented in a vehicle, for example, in conjunction with a braking system of the vehicle. For example, a braking system of a vehicle may comprise a brake pad on one side of wheel and a brake pad on an opposite side of the wheel. The brake pads may normally exist in a state wherein the brake pads are not in physical contact with the wheel. An operator of the vehicle may cause each brake pad to physically contact their respective sides of the wheel to cause friction on the sidewall of the wheel to decelerate the rotation of the wheel. As an example, the apparatus may be implemented with a brake system such that the apparatus may normally exist in a disengaged state wherein the rollers 102a, 102b are not in physical contact with the wheel 101 and the brake pads are not in physical contact with the wheel 101. When braking is desired, and the brake pads are caused to contact the wheel 101, the rollers 102a, 102b may also contact the wheel 101 in an engaged state and thereby rotate in response to a rotation of the wheel 101.

In some implementations, in the engaged state, the rollers 102a, 102b may apply a friction force to the wheel 101 to decelerate the wheel 101. In some implementations, the apparatus 100 may replace a braking system otherwise employed by the vehicle, such that when braking is desired, the rollers 102a, 102b of the apparatus transition to an engaged state thereby applying friction to the wheel 101 to decelerate the rotation of wheel 101 while simultaneously rotating in response to a rotation of the wheel 101 to generate energy at the generator 106 until the wheel 101 stops rotating.

The rotational inertia of the rollers 102 in the example embodiment of FIG. 6C and other examples herein can be changed for example increased or decreased. Increasing the rotational inertia of the rollers can cause more or less friction to be applied to the wheel 101 and also cause more or less energy to be generated at the generator 106. For example, more energy would be required to rotate a roller 102 with a high rotational inertia than would be required to rotate a roller 102 with less rotational inertia. Thus, a roller 102 with high rotational inertia could more quickly decelerate the rotation of the wheel 101 while simultaneously causing more energy to be generated at the generator 106 than a roller with lower rotational inertia. For example, when acceleration or a constant speed of the vehicle is desired, the rotational inertia of the roller(s) 102 may be low to apply less friction to the wheel 101 (which may thereby cause less energy to be generated at the generator 106) and when deceleration of the vehicle is desired (for example, stopping), the rotational inertia of the roller(s) 102 may be high to apply more friction to the wheel 101 (which may thereby cause more energy to be generated at the generator 106). Thus, for any given desired mode of operation of the vehicle (for example, acceleration, deceleration) a maximum energy may be generated at the generator 106 by changing a rotational inertia of the rollers 102.

In some implementations, the rotational inertia of the rollers 102 can change automatically for example in response to an energy demand of the motor of the vehicle, a rotational velocity of the wheel, and/or desired braking etc. In some implementations, the rotational inertia of the rollers can change in response to a manual user input. The rotational inertia of the roller 102 can be changed by changing a state of the roller 102, the shaft 104 (or other coupling device), and/or changing a state of the generator 106.

Figure 7A:
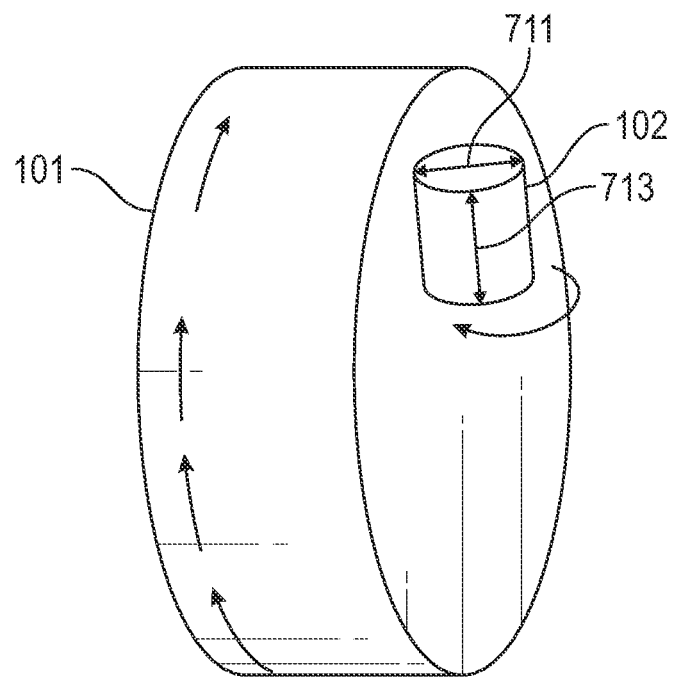
FIG. 7A-7B is a schematic diagram illustrating various sizes of a roller of the apparatus implemented on a sidewall of a wheel.

FIG. 7A is a diagram illustrating an example embodiment of a roller. As shown in FIG. 2, the roller 102 may comprise a length 713 and a diameter 711. The roller 102 may have any length 713 such as is required or desired. The roller 102 may have any diameter 711 such as is required or desired. The diameter 711 of the roller 102 may be less than the diameter of the wheel 101 such that the roller 102 rotates at a greater rotational velocity than the wheel 101 in response to a rotation of the wheel 101. In some embodiments comprising multiple rollers, one, some or each of the multiple rollers may have a length and/or diameter that is different than the lengths and/or diameters of the other rollers.

Figure 7B:
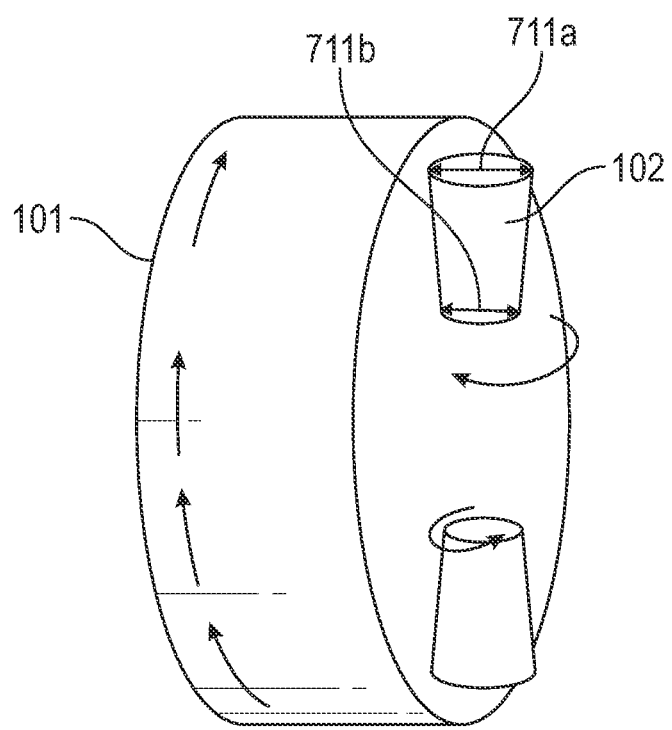

FIG. 7B is a diagram illustrating an example embodiment of a roller. As shown in FIG. 7B, the roller 102 may comprise a diameter that varies in size along a length of the roller 102. For example, one end of the roller 102 may comprise a diameter 711a of a first size and the other end of the roller 102 may comprise a diameter 711b of a second size that is different than the diameter 711a. A roller 102 having a diameter that varies in size along a length of the roller 102 may facilitate the rotation of the roller 102 in response to a rotation of the wheel 101.

Figure 7C:
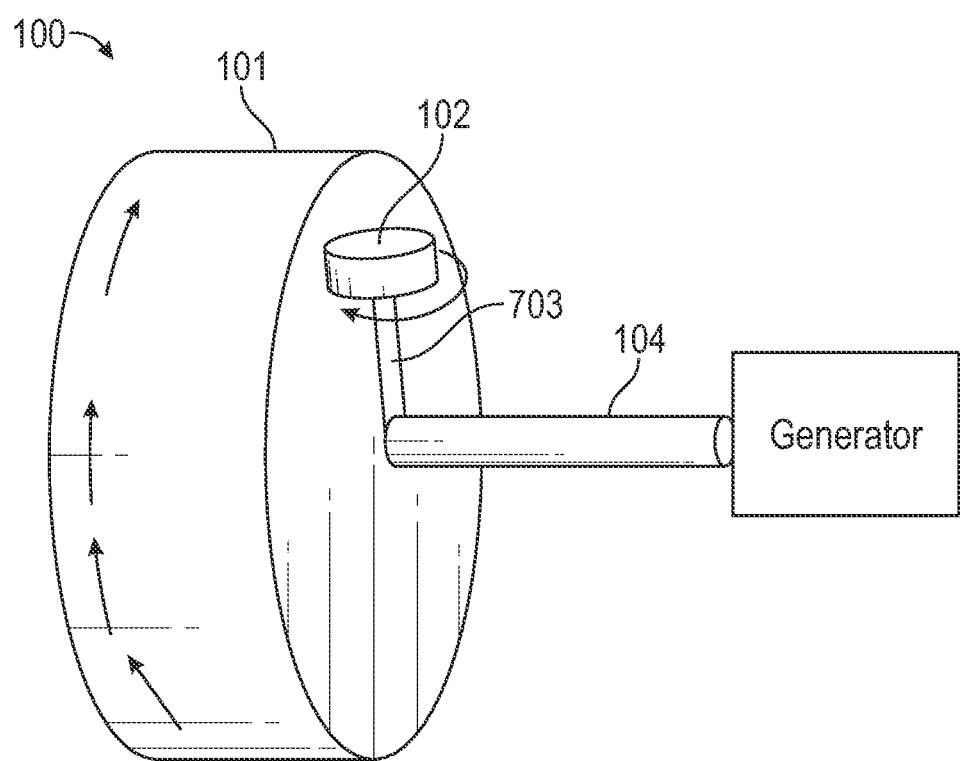
FIG. 7C is a schematic diagram illustrating an example embodiment of a roller of the apparatus coupled to a shaft of the apparatus.

FIG. 7C is a diagram illustrating an example embodiment of the apparatus 100. As shown in FIG. 7C, the apparatus 100 may comprise a roller shaft 703 rotatably coupled to the roller 102 and the shaft 104. The roller shaft 703 may not be in physical contact with the wheel 103. The roller shaft 703 may be any length to allow the roller 102 to be in contact with a sidewall of the wheel 101 at any distance away from a center axis of the wheel 101.

Figure 8A:
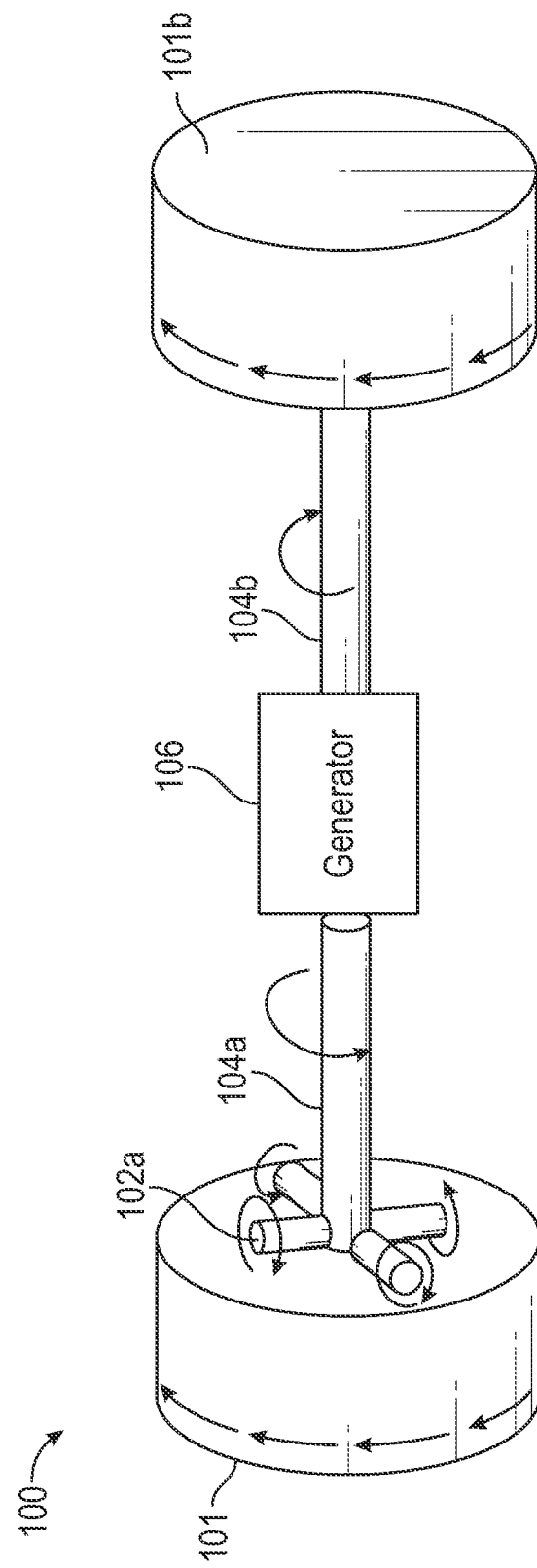
FIGS. 8A-8B are schematic diagrams illustrating example embodiments of the apparatus implemented on sidewalls of multiple wheels of a vehicle.

FIG. 8A is a diagram illustrating an example embodiment of the apparatus 100 implemented with multiple wheels of a vehicle. As shown in FIG. 8A, the apparatus 100 may comprise one or more first rollers 102a rotatably couplable to a first wheel 101a of a vehicle and one or more second rollers (not shown) rotatably couplable to a second wheel 101b of the vehicle. The components of the example embodiment shown in FIG. 4A may comprise similar structural and/or operational features as described with reference to other embodiments described herein, for example, the example embodiment of FIG. 5A. For example, rotation of the one or more first rollers 102a and/or rotation of the one or more second rollers (not shown) may cause the generator 106 to generate energy.

FIG. 8A is not meant to be limiting of the present disclosure. The apparatus 100 may comprise any number of rollers, shafts and/or generators as required and/or desired and may be implemented on any number of wheels of a vehicle as required or desired, for example on one, two, three or four wheels (for example with reference to implementation with a car) or 18 wheels (for example with reference to implementation with a semi-truck).

Figure 8B:
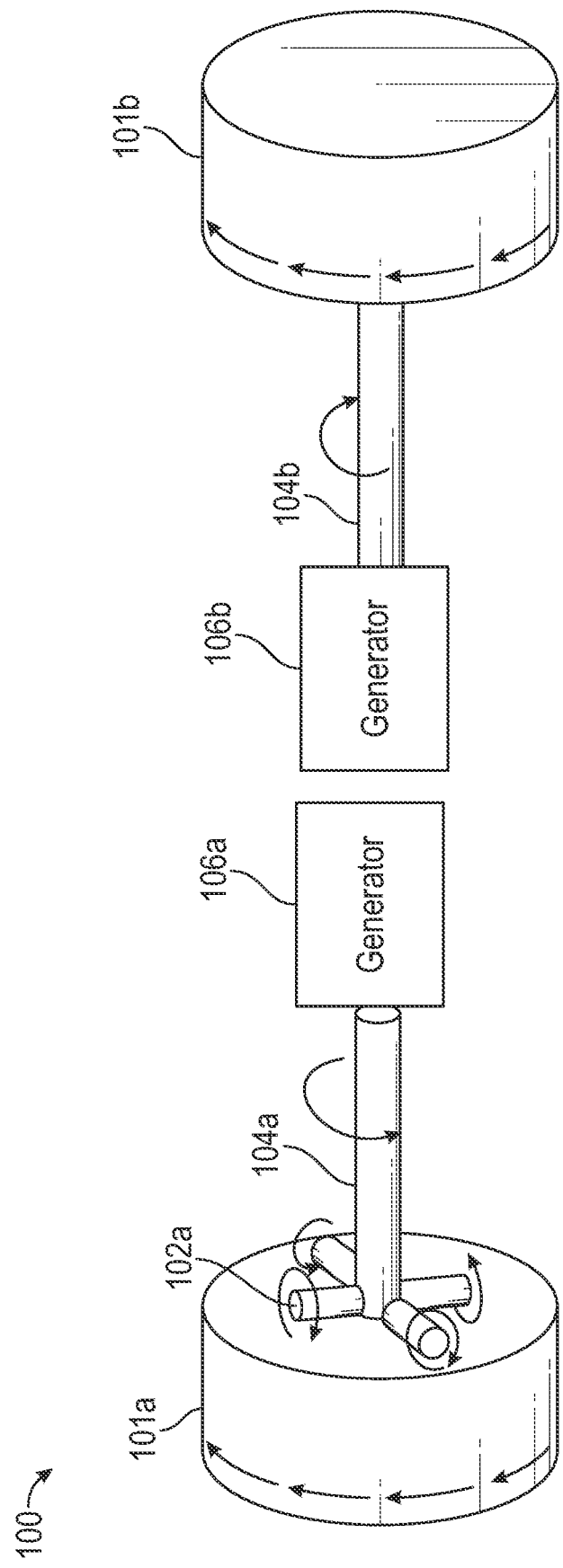

FIG. 8B is a diagram illustrating an example embodiment of the apparatus 100 implemented with multiple wheels of a vehicle and comprising multiple generators. As shown in FIG. 8B, the apparatus 100 may comprise a first and second generator 106a/106b. The components of the example embodiment shown in FIG. 8B may comprise similar structural and/or operational features as described with reference to other embodiments described herein, for example, the example embodiment of FIG. 5A. For example, rotation of the one or more first rollers 102a may cause the first generator 106a to generate energy and rotation of the one or more second rollers (not shown) may cause the generator 106b to generate energy. The generators 106a/106b may be in electrical communication with the vehicle and/or each other.

Figure 9:
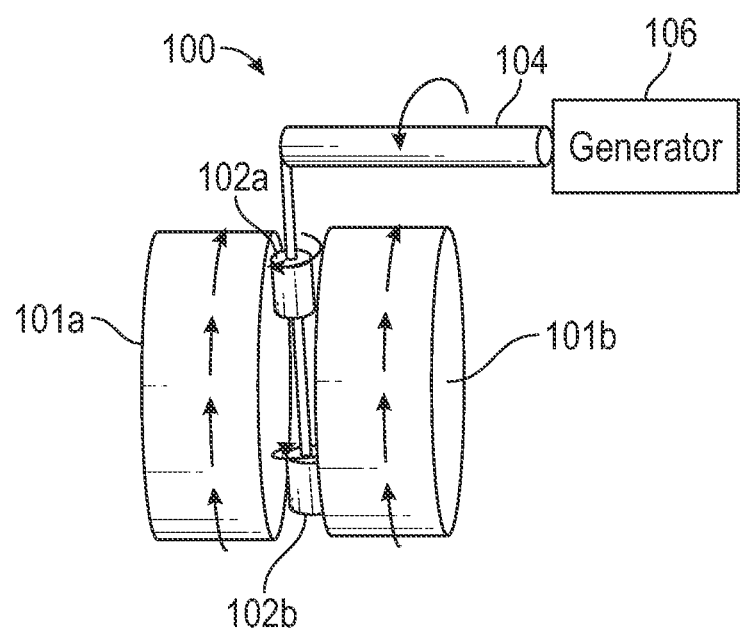
FIG. 9 is a schematic diagram illustrating an example embodiment of the apparatus comprising rollers between two adjacent wheels of a vehicle.

FIG. 9 is a diagram illustrating an example embodiment of the apparatus 100 implemented between two wheels. As shown in FIG. 9, the apparatus 100 may comprise a first roller 102a and a second roller 102b located between two wheels 101a/101b such as two adjacent wheels on a truck, van, semi-truck, tractor-trailer and the like. The first roller 102a may be in physical contact with a sidewall surface of the first wheel 101a and configured to rotate in response to a rotation of the first wheel 101a. The second roller 102b may be in physical contact with a sidewall surface of the second wheel 101b and configured to rotate in response to a rotation of the second wheel 101b. The first and second rollers 102a/102b may be coupled to each other (for example, rotatably coupled) via one or more coupling devices such as a shaft as shown in FIG. 9 and/or any other coupling device as required or desired such as gears, sprockets, chains, belts, pulleys and the like.

The first roller 102a and/or second roller 102b may be coupled (for example, rotatably coupled) to a shaft 104 for example via one or more coupling device such as a shaft as shown in FIG. 9 and/or any other coupling device as required or desired such as gears, sprockets, chains, belts, pulleys and the like. The shaft 104 may be configured to rotate in response to a rotation of the first roller 102a and/or second roller 102b. The shaft 104 may be operably coupled to a generator 106 and the generator 106 may be configured to generate energy (for example, electrical output) in response to a rotation of the shaft 104 as described elsewhere herein.

FIG. 9 is given as an example and is not meant to be limiting. In some embodiments, the apparatus 100 may comprise any number of rollers, for example one roller or more than two rollers. Furthermore, the rollers 102a/102b shown in example FIG. 9 may be arranged with any orientation between their respective axes of rotation, as required or desired. For example, the respective axes of rotation of rollers 102a/102b may be substantially parallel, as shown in FIG. 9, or may be substantially orthogonal or may be oriented in any other was as required or desired. Additionally, the rollers 102a/102b may be configured to rotate independently of each other such that one roller may rotate while the other does not or may be configured to be fixedly rotatably coupled to each other such that one roller may not rotate without the other roller also rotating.

Figure 10A:
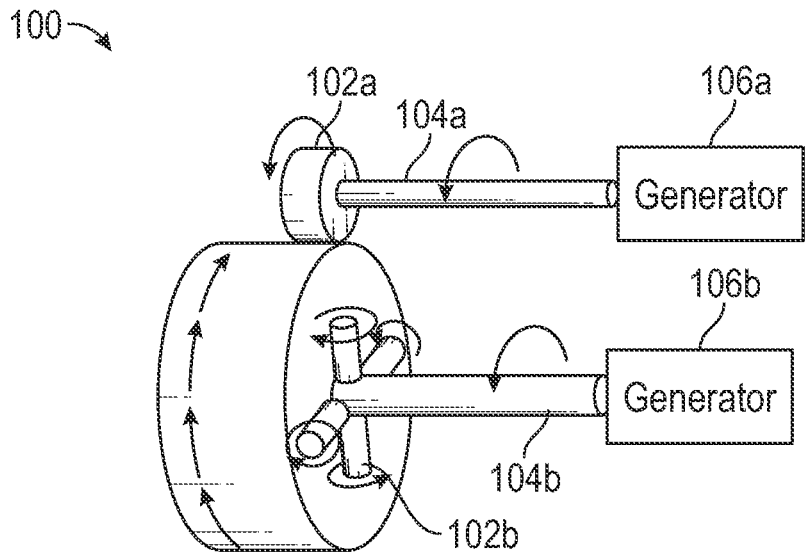
FIGS. 10A-10B are schematic diagrams illustrating example embodiments of the apparatus comprising rollers implemented on a sidewall surface and curved surface of a wheel of a vehicle.

FIG. 10A is a diagram of an example embodiment of the apparatus 100 comprising various configurations of rollers and multiple generators. As shown in FIG. 10A, the apparatus 100 may comprise one or more first rollers 102a, a first shaft 104a, a first generator 106a and one or more second rollers 102b, a second shaft 104b and a second generator 106b. The example apparatus 100 of FIG. 10A and its various components may operate in a manner similar to that described in other example embodiments herein such as with reference to FIG. 1A and/or FIG. 5A, for example.

Figure 10B:
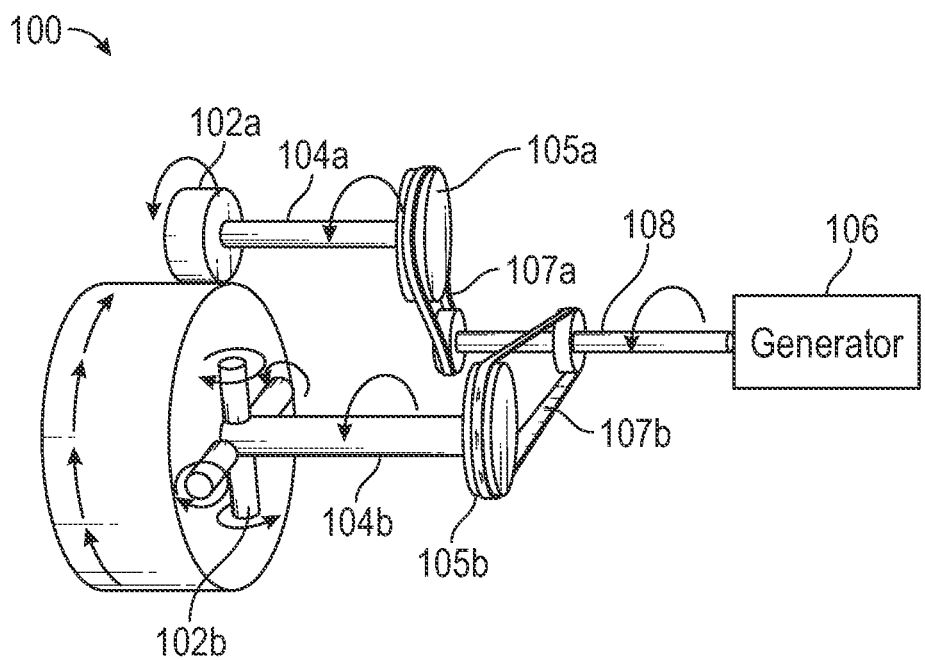

FIG. 10B is a diagram of an example embodiment of the apparatus 100 comprising various configurations of rollers and a single generator. As shown in FIG. 10B, the apparatus 100 may comprise one or more first rollers 102a, a first shaft 104a, a first sprocket 105a, a first coupling device 107a, a third shaft 108 and a generator 106. The apparatus 100 may further comprise one or more second rollers 102b, a second shaft 104b, a second sprocket 105b, and a second coupling device 107b. The example apparatus 100 of FIG. 10B and its various components may operate in a manner similar to that described in other example embodiments herein such as with reference to FIG. 1A, FIG. 5A, and/or FIG. 3B, for example.

Example Energy Generation and Storage Systems

Figure 11A:
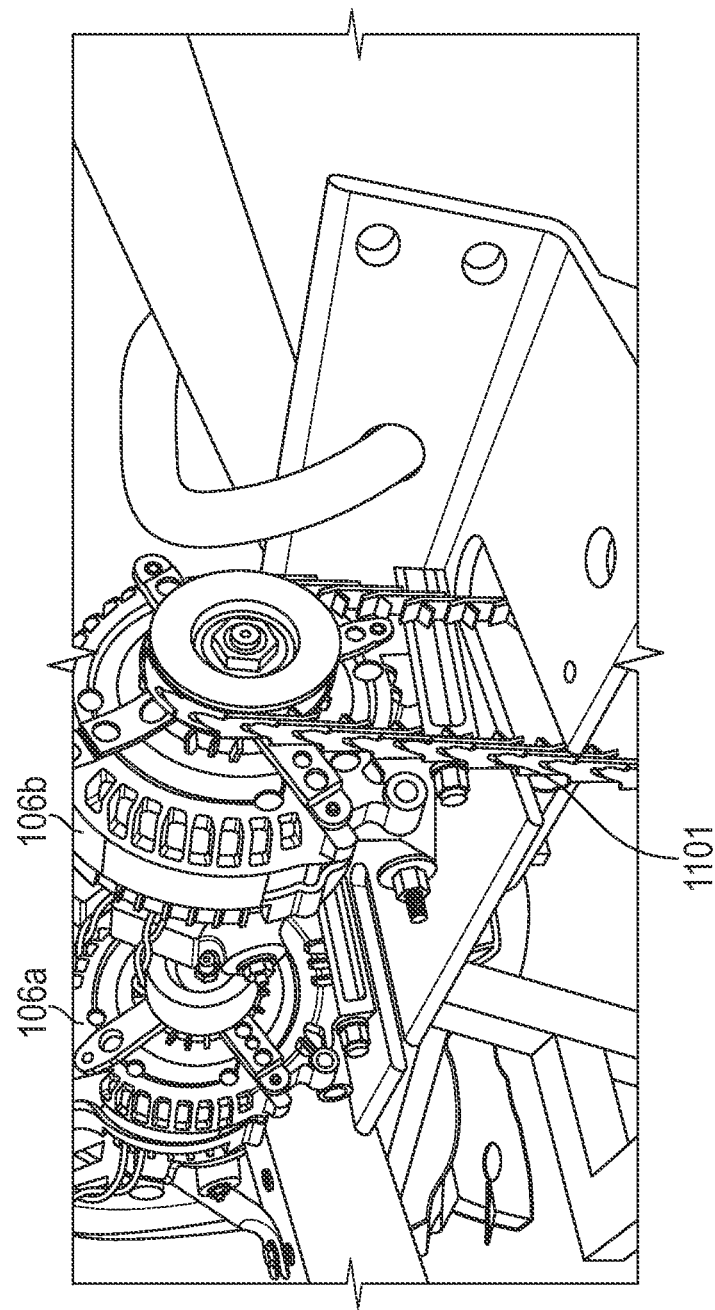
FIGS. 11A-11B is a diagram illustrating examples embodiments of generators coupled to roller(s) of the apparatus.

FIG. 11A is a diagram of two generators 106a and 106b configured to be mechanically coupled to roller(s) and that convert mechanical rotation of roller(s) 102 into electrical energy outputs, in accordance with an exemplary embodiment. In some embodiments, the generators 106a and 106b may be replaced with alternators or similar electricity generating devices. The generators 106a and 106b can be mechanically coupled to roller(s) via one or more of a shaft, linkage, gear, pulley, chain, belt, sprocket or other similar mechanism or device. The example embodiment of FIG. 11A illustrates the generator 106b as mechanically coupled to roller(s) 102 via at least a chain 1101. The chain 1101 may rotate, in response to rotation of the roller(s) 102, causing a corresponding rotor of the generator 106b to rotate and causing the generator 106b to generate an electrical energy output via a cable (not shown in this figure). In some embodiments, the two generators 106a and 106b may be replaced by any number of generators 106, from a single generator to many generators. In some embodiments, the generators 106 may generate AC electricity or DC electricity, depending on the application. When the generators 106 generate AC power, an AC-to-DC converter may be used to condition and convert the generated electricity for storage. When the generators 106 generate DC power, a DC-to-DC converter may be used to condition the generated electricity for storage.

Figure 11B:
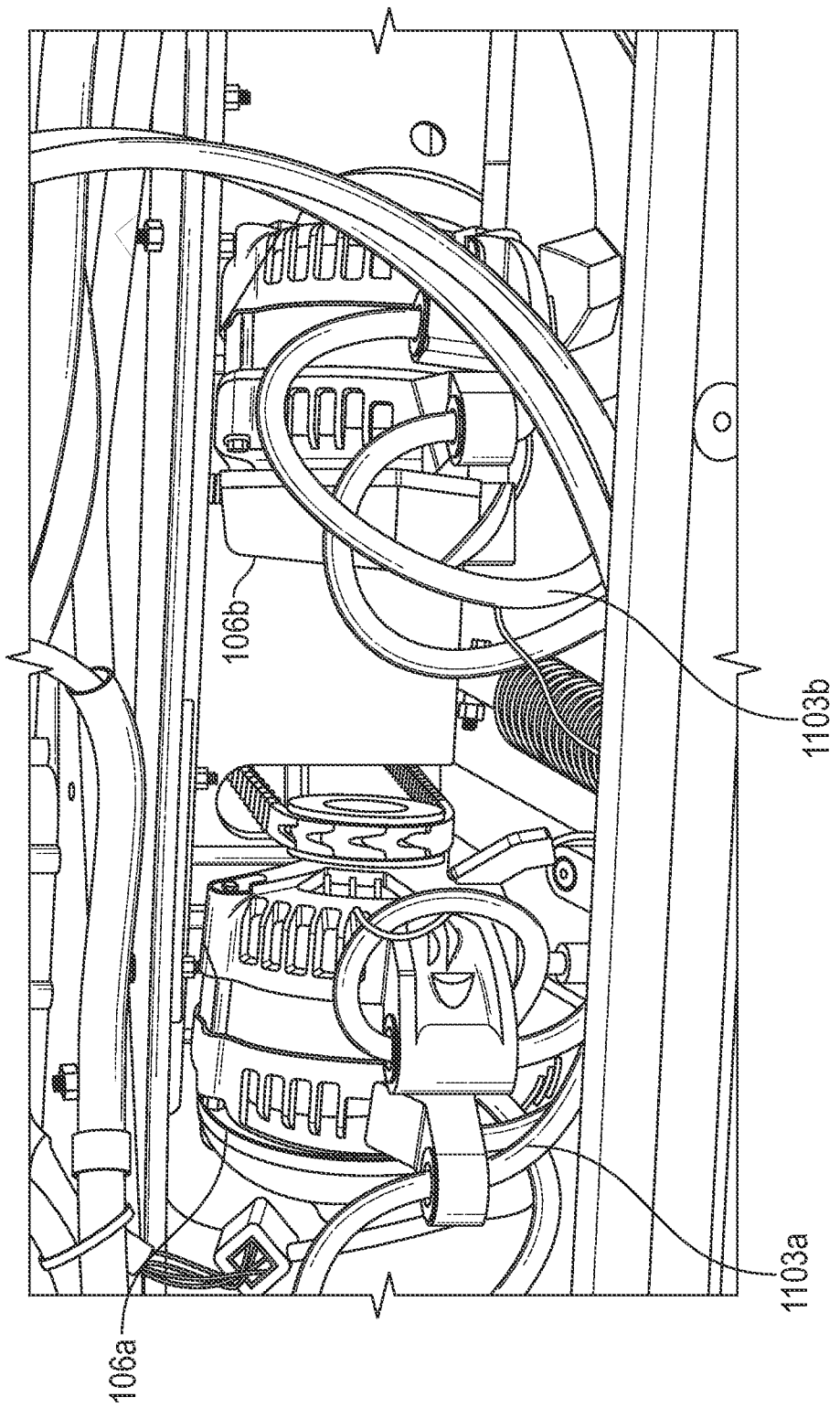

FIG. 11B is an alternate view of the two generators 106a and 106b of FIG. 11A and cabling 1103a and 1103b that couples the generators 106a and 106b to a charger (for example, a battery and/or capacitor charger) and/or to an energy storage device such as a battery and/or capacitor. The charger may comprise one or more other components or circuits used to rectify or otherwise condition the electricity generated by the generators 106a and 106b. For example, the one or more other components or circuits may comprise one or more of a matching circuit, an inverter circuit, a conditioning circuit, a rectifying circuit, a conversion circuit, and so forth. The matching circuit may match conditions of a load to the source (for example, impedance matching, and so forth). The conversion circuit may comprise a circuit that converts an alternating current (AC) signal to a direct current (DC) signal, a DC/DC conversion circuit, a DC/AC conversion circuit and so forth. The conditioning circuit may condition a signal input into the conditioning circuit, and the rectifying circuit may rectify signals.

Additional details regarding FIGS. 11A-11B can be found in at least paragraphs [0080]-[0099] of U.S. patent application Ser. No. 17/332,824, which is hereby incorporated by reference.

Figure 12:
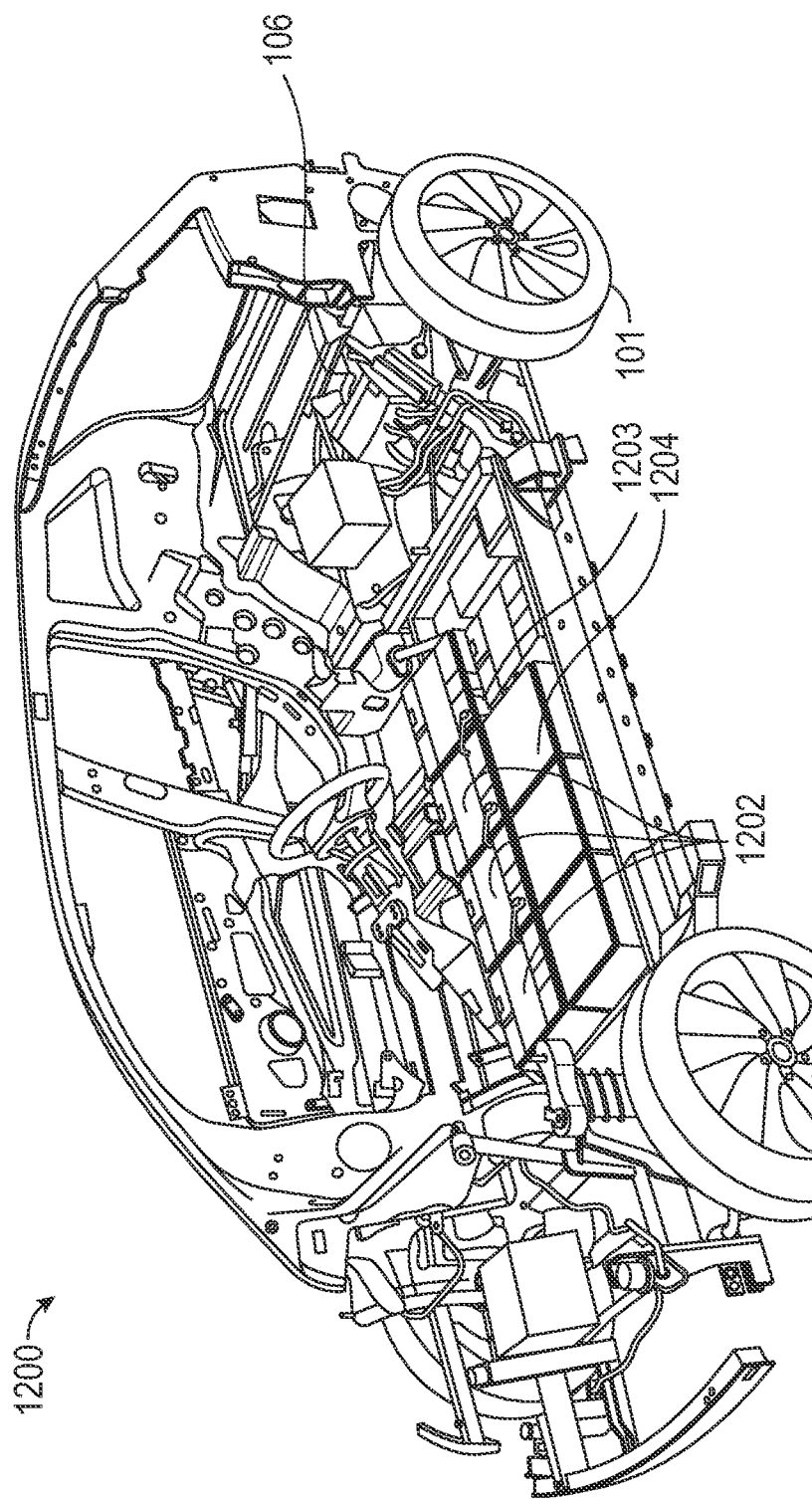
FIG. 12 is a diagram illustrating an example vehicle incorporating the apparatus, a generator and an energy storage device.

FIG. 12 is a diagram of an example vehicle 1200 incorporating an apparatus 100 comprising roller(s) 102, a generator 106, as well as an energy storage device 1203 electrically coupled with the generator 106. Energy generated at the generator 106, in response to a rotation of the roller(s) 102 can be provided to the energy storage device 1203. The energy storage device 1203 can comprise one or more batteries 1202 and/or one or more capacitor modules 1204. The energy storage device 1203 may comprise the one or more capacitor modules 1204 as a supplemental and/or intermediate energy storage device. In some embodiments, the capacitor modules 1204 are disposed alongside the one or more batteries 1202. The capacitor modules 1204 and the battery 1202 can be electrically coupled to at least a motor of the vehicle, such as an electric motor.

In some embodiments, the capacitor modules 1204 may be used in combination with the battery 1202. For example, as shown in FIG. 12, the vehicle 1200 may include one or more the capacitor modules 1204 installed alongside the battery 1202. In some embodiments, the vehicle 1200 includes a plurality of capacitor modules 1204. In some embodiments, one or more batteries 1202 are replaced with one or more capacitor modules 1204. As shown, the capacitor modules 1204 may be connected in series or in parallel with the battery 1202, dependent on the use case. For example, the capacitor modules 1204 may be connected in series or parallel with the battery 1202 when supplementing the voltage in the battery 1202 or when charging the battery 1202 and/or the capacitor modules 1204. Therefore, the battery 1202 and the capacitor modules 1204 may provide voltage support to each other. As such, the capacitor modules 1204 may provide supplemental energy when the battery 1202 are discharged or be used in place of the battery 1202 altogether.

Figure 13:
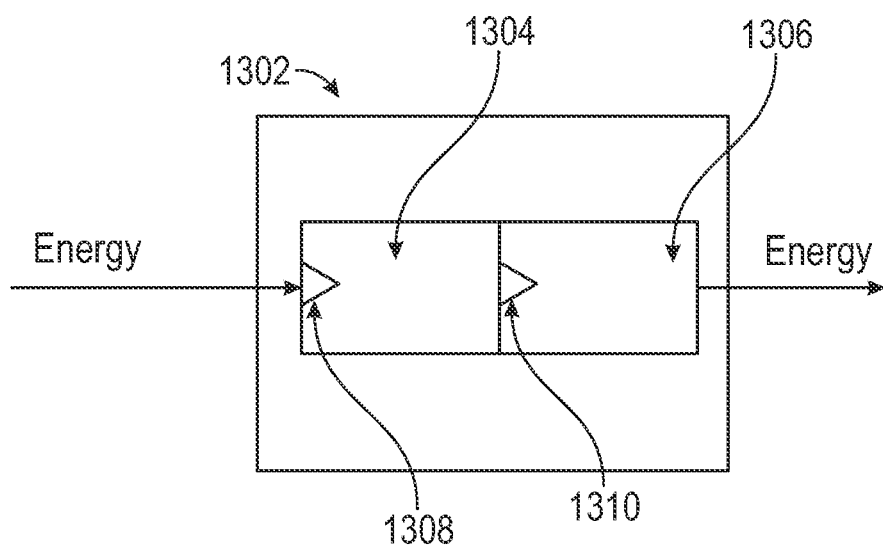
FIG. 13 is a diagram illustrating an example embodiment of a hypercapacitor as an energy storage device.

In some embodiments, the energy storage device 1203 may comprise one or more hypercapacitors. FIG. 13 schematically illustrates a diagram of an example embodiment of a hypercapacitor 1302 for storing energy (for example, such as may be used in an electric vehicle), which may also be referred to as a hypercapacitor energy storage system or device. As shown, the hypercapacitor 1302 may comprise or consist essentially of an ultracapacitor portion 1304, an energy retainer portion 1306, one or more inbound diodes 1308, and one or more outbound diodes 1310. In some embodiments, the hypercapacitor 1302 may not comprise the inbound diode 1308 and/or the outbound diode 1310.

The ultracapacitor portion 1304 may be electrically coupled to the energy retainer portion 1306 and in some embodiments, together may comprise a single integrated unit or package (for example, the hypercapacitor 1302). The ultracapacitor portion 1304 may provide energy to the energy retainer portion 1306 as the energy in the energy retainer portion 1306 is depleted (for example resulting from an energy demand at a load).

The electrical connection between the ultracapacitor portion 1304 and the energy retainer portion 1306 may stabilize the voltage levels of the ultracapacitor portion 1304 and prevent self-discharge as the energy retainer portion 1306 retains energy provided from the ultracapacitor portion 1304 via their electrical connection. Advantageously, stabilizing the voltage levels in the ultracapacitor portion 1304 by reducing and/or substantially eliminating self-discharge provides a superior energy device capable of storing energy (for example, maintaining high voltage levels) for much longer than existing energy devices in widespread use today.

The ultracapacitor portion 1304 of the hypercapacitor 1302 may comprise one or more ultracapacitors and/or supercapacitors. The ultracapacitor portion 1304 may incorporate structural and operational features described in connection with any of the embodiments of the capacitor module 1204 described herein.

The energy retainer portion 1306 may comprise a device or multiple devices capable of storing energy such as a battery, a battery field and/or a capacitor. For example, in some embodiments the energy retainer portion 1306 may include a battery such as the battery 1202 described herein and may incorporate structural and operational features of the battery 1202. In some embodiments, the energy retainer portion 1306 may include a battery field such as a battery field comprising batteries 1202 such as shown in FIG. 12. In some embodiments, the energy retainer portion 1306 may comprise one or more capacitors, such as the capacitor module 1204 described herein.

Additional details regarding FIG. 13 can be found in at least paragraphs [0211]-[0246] of U.S. patent application Ser. No. 17/332,824, which is hereby incorporated by reference.

Figure 14A:
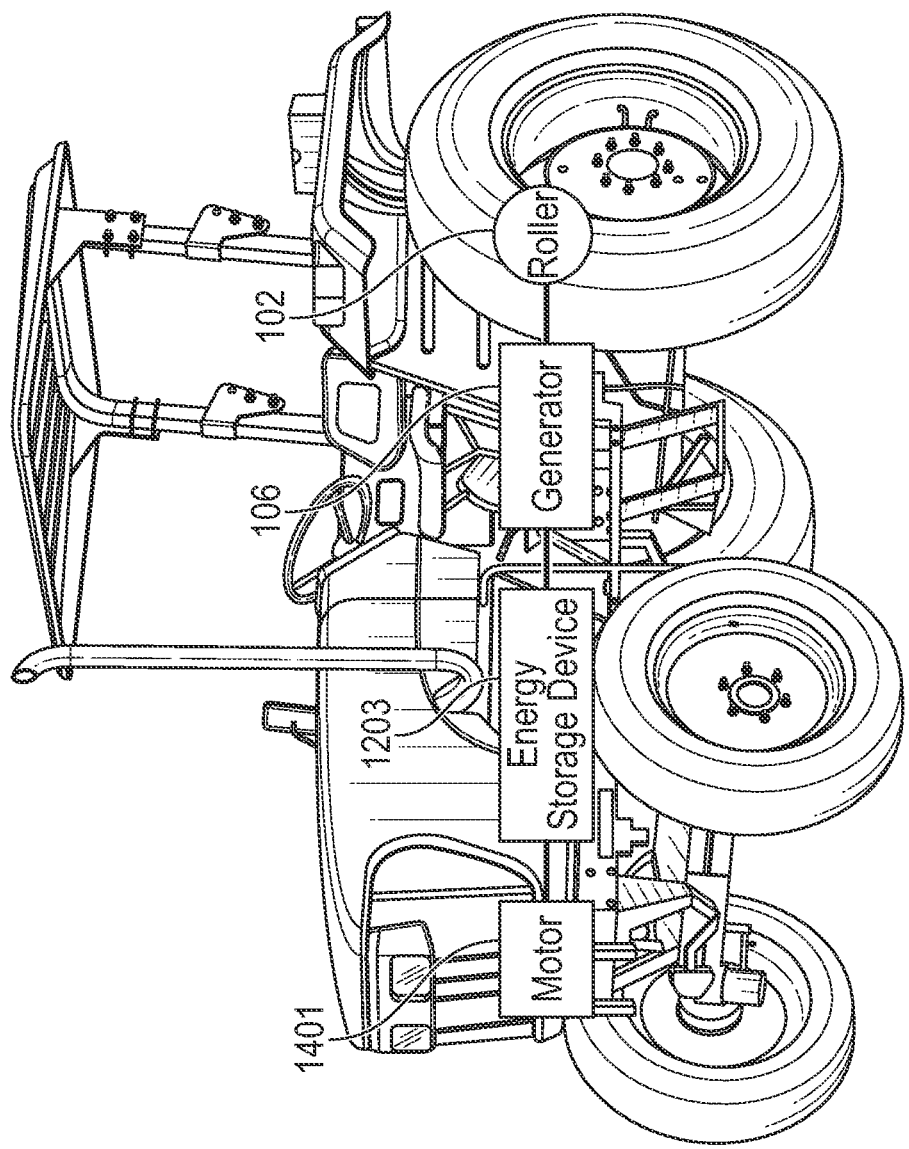
FIGS. 14A-14J illustrate example vehicles incorporating the apparatus, a generator, an energy storage device and a motor.

FIG. 14A illustrates an example farm equipment such as a tractor that may incorporate the various components and systems discussed herein such as the apparatus 100, which may comprise a generator 106 and one or more rollers 102 rotatably couplable to a wheel of the vehicle, as well as a motor 1401, such as an electric motor, and an energy storage device 1203 which may comprise a capacitor 1204, a battery 1202 and/or a hypercapacitor 1302, as discussed herein. The generator 106 may be electrically coupled to the energy storage device 1203 and may be capable of providing energy to the energy storage device 1203, as discussed herein. The energy storage device 1203 may be electrically coupled to the motor 1401 and may be capable of providing energy to the motor 1401.

Figure 14B:
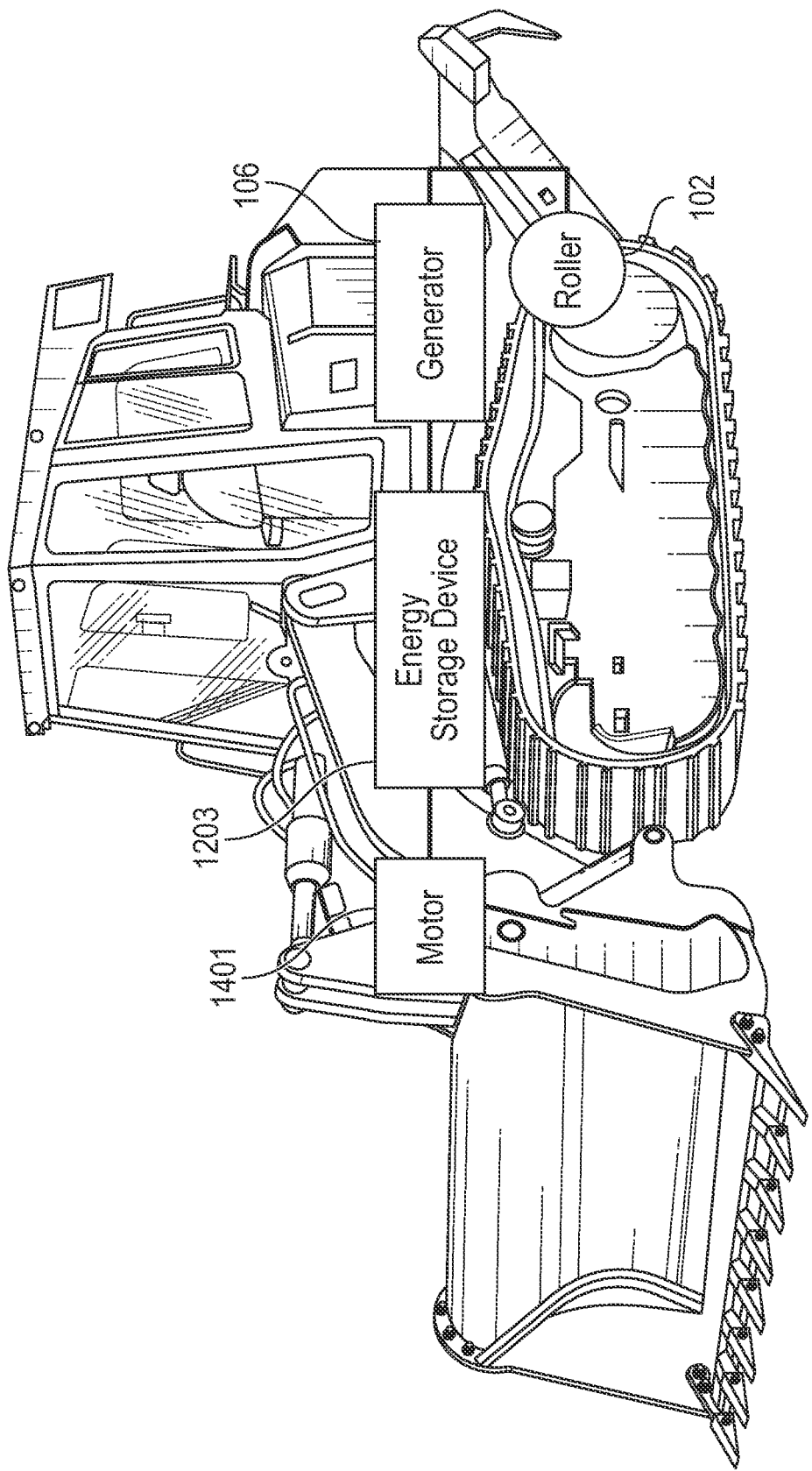

FIG. 14B illustrates an example construction equipment that may incorporate the various components and systems discussed herein such as the apparatus 100, which may comprise a generator 106 and one or more rollers 102 rotatably couplable to a wheel of the vehicle, as well as a motor 1401, such as an electric motor, and an energy storage device 1203 which may comprise a capacitor 1204, a battery 1202 and/or a hypercapacitor 1302, as discussed herein. The generator 106 may be electrically coupled to the energy storage device 1203 and may be capable of providing energy to the energy storage device 1203, as discussed herein. The energy storage device 1203 may be electrically coupled to the motor 1401 and may be capable of providing energy to the motor 1401.

Figure 14C:
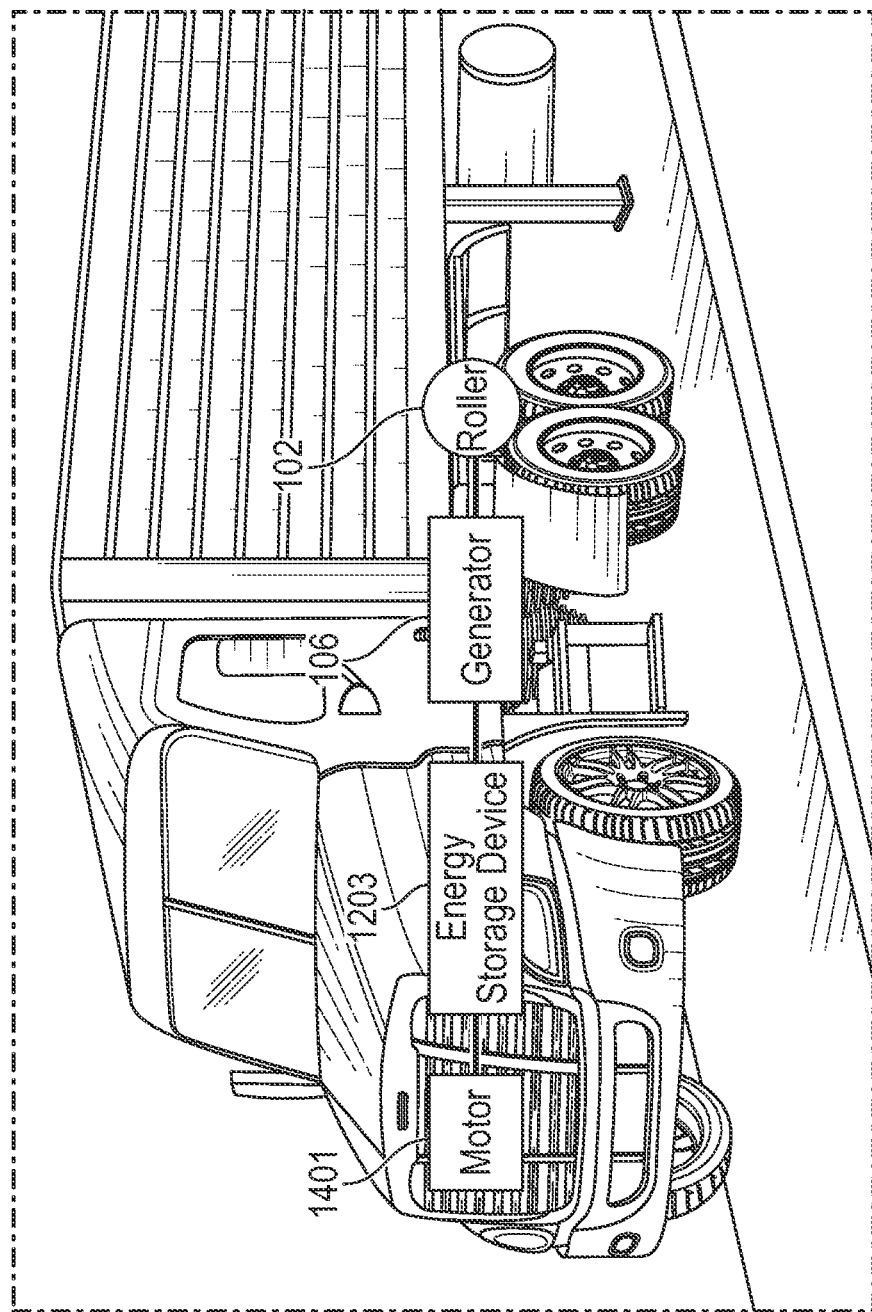

FIG. 14C illustrates an example commercial vehicle such as a tractor-trailer or semi-truck that may incorporate the various components and systems discussed herein such as the apparatus 100, which may comprise a generator 106 and one or more rollers 102 rotatably couplable to a wheel of the vehicle, as well as a motor 1401, such as an electric motor, and an energy storage device 1203 which may comprise a capacitor 1204, a battery 1202 and/or a hypercapacitor 1302, as discussed herein. The generator 106 may be electrically coupled to the energy storage device 1203 and may be capable of providing energy to the energy storage device 1203, as discussed herein. The energy storage device 1203 may be electrically coupled to the motor 1401 and may be capable of providing energy to the motor 1401.

Figure 14D:
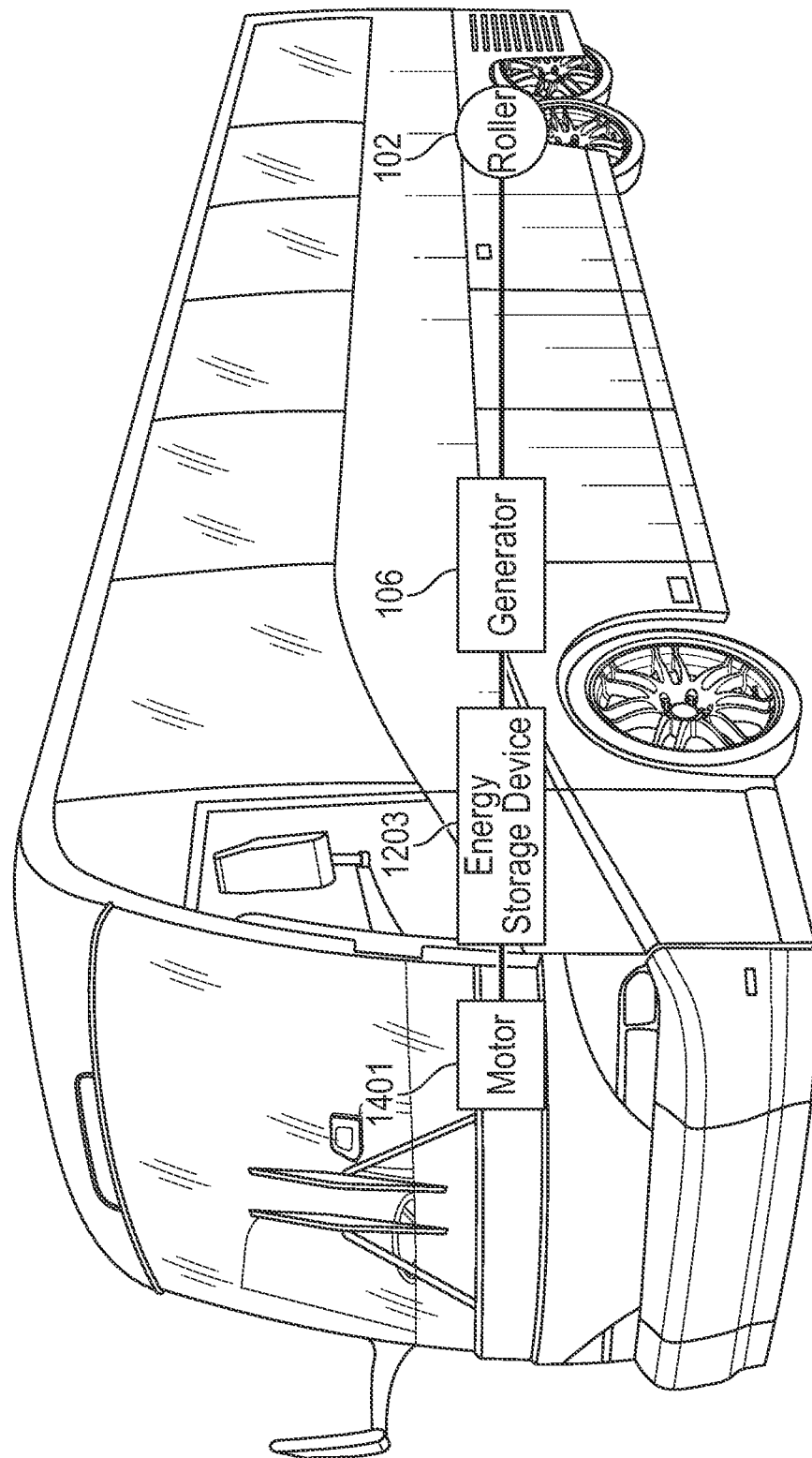

FIG. 14D illustrates an example bus that may incorporate the various components and systems discussed herein such as the apparatus 100, which may comprise a generator 106 and one or more rollers 102 rotatably couplable to a wheel of the vehicle, as well as a motor 1401, such as an electric motor, and an energy storage device 1203 which may comprise a capacitor 1204, a battery 1202 and/or a hypercapacitor 1302, as discussed herein. The generator 106 may be electrically coupled to the energy storage device 1203 and may be capable of providing energy to the energy storage device 1203, as discussed herein. The energy storage device 1203 may be electrically coupled to the motor 1401 and may be capable of providing energy to the motor 1401.

Figure 14E:
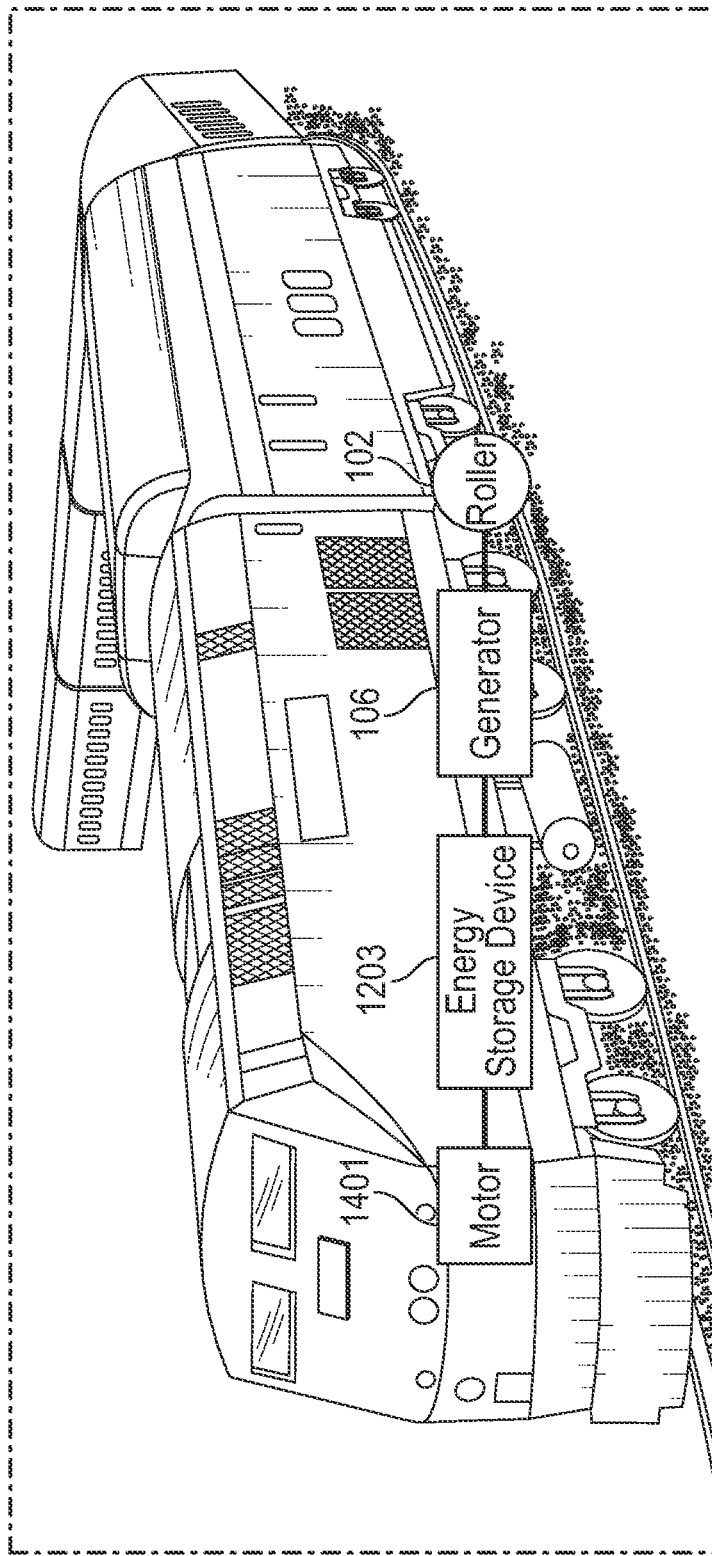

FIG. 14E illustrates an example train that may incorporate the various components and systems discussed herein such as the apparatus 100, which may comprise a generator 106 and one or more rollers 102 rotatably couplable to a wheel of the vehicle, as well as a motor 1401, such as an electric motor, and an energy storage device 1203 which may comprise a capacitor 1204, a battery 1202 and/or a hypercapacitor 1302, as discussed herein. The generator 106 may be electrically coupled to the energy storage device 1203 and may be capable of providing energy to the energy storage device 1203, as discussed herein. The energy storage device 1203 may be electrically coupled to the motor 1401 and may be capable of providing energy to the motor 1401.

Figure 14F:
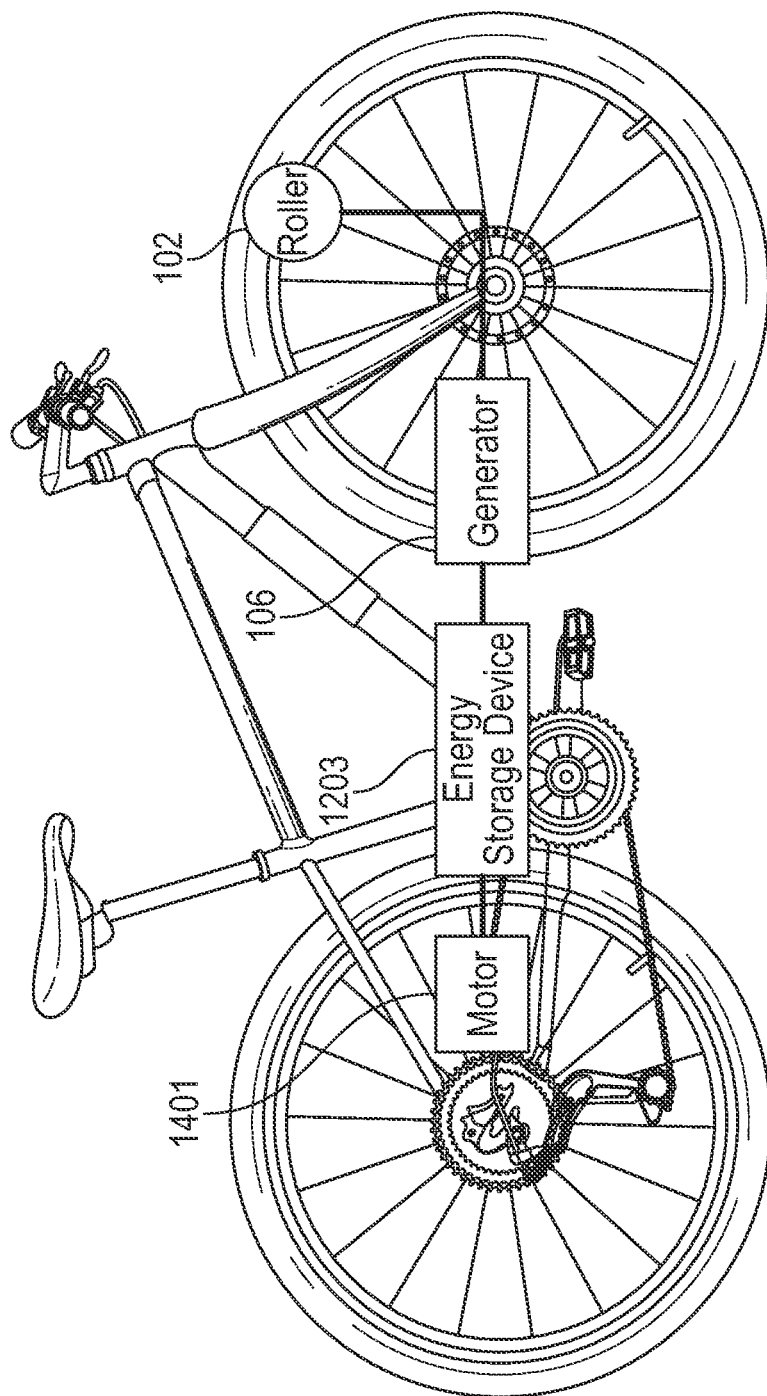

FIG. 14F illustrates an example bicycle that may incorporate the various components and systems discussed herein such as the apparatus 100, which may comprise a generator 106 and one or more rollers 102 rotatably couplable to a wheel of the vehicle, as well as a motor 1401, such as an electric motor, and an energy storage device 1203 which may comprise a capacitor 1204, a battery 1202 and/or a hypercapacitor 1302, as discussed herein. The generator 106 may be electrically coupled to the energy storage device 1203 and may be capable of providing energy to the energy storage device 1203, as discussed herein. The energy storage device 1203 may be electrically coupled to the motor 1401 and may be capable of providing energy to the motor 1401.

Figure 14G:
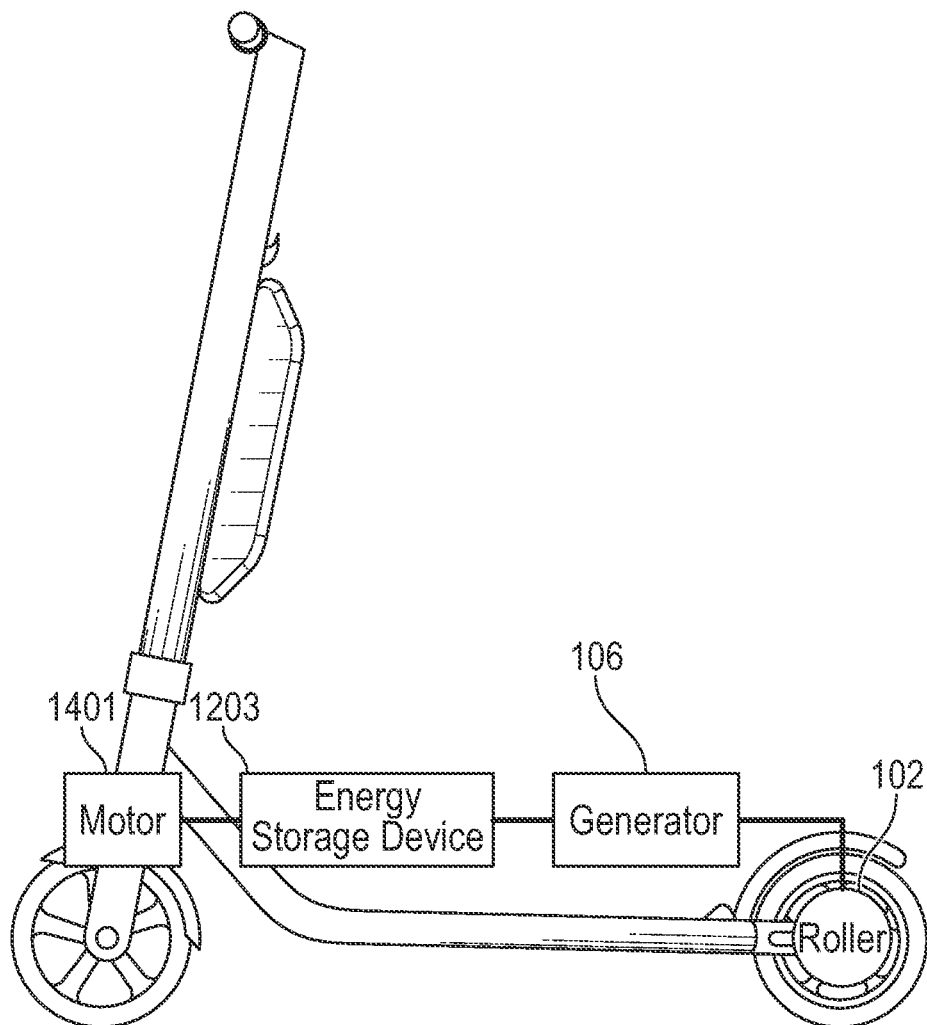

FIG. 14G illustrates an example scooter that may incorporate the various components and systems discussed herein such as the apparatus 100, which may comprise a generator 106 and one or more rollers 102 rotatably couplable to a wheel of the vehicle, as well as a motor 1401, such as an electric motor, and an energy storage device 1203 which may comprise a capacitor 1204, a battery 1202 and/or a hypercapacitor 1302, as discussed herein. The generator 106 may be electrically coupled to the energy storage device 1203 and may be capable of providing energy to the energy storage device 1203, as discussed herein. The energy storage device 1203 may be electrically coupled to the motor 1401 and may be capable of providing energy to the motor 1401.

Figure 14H:
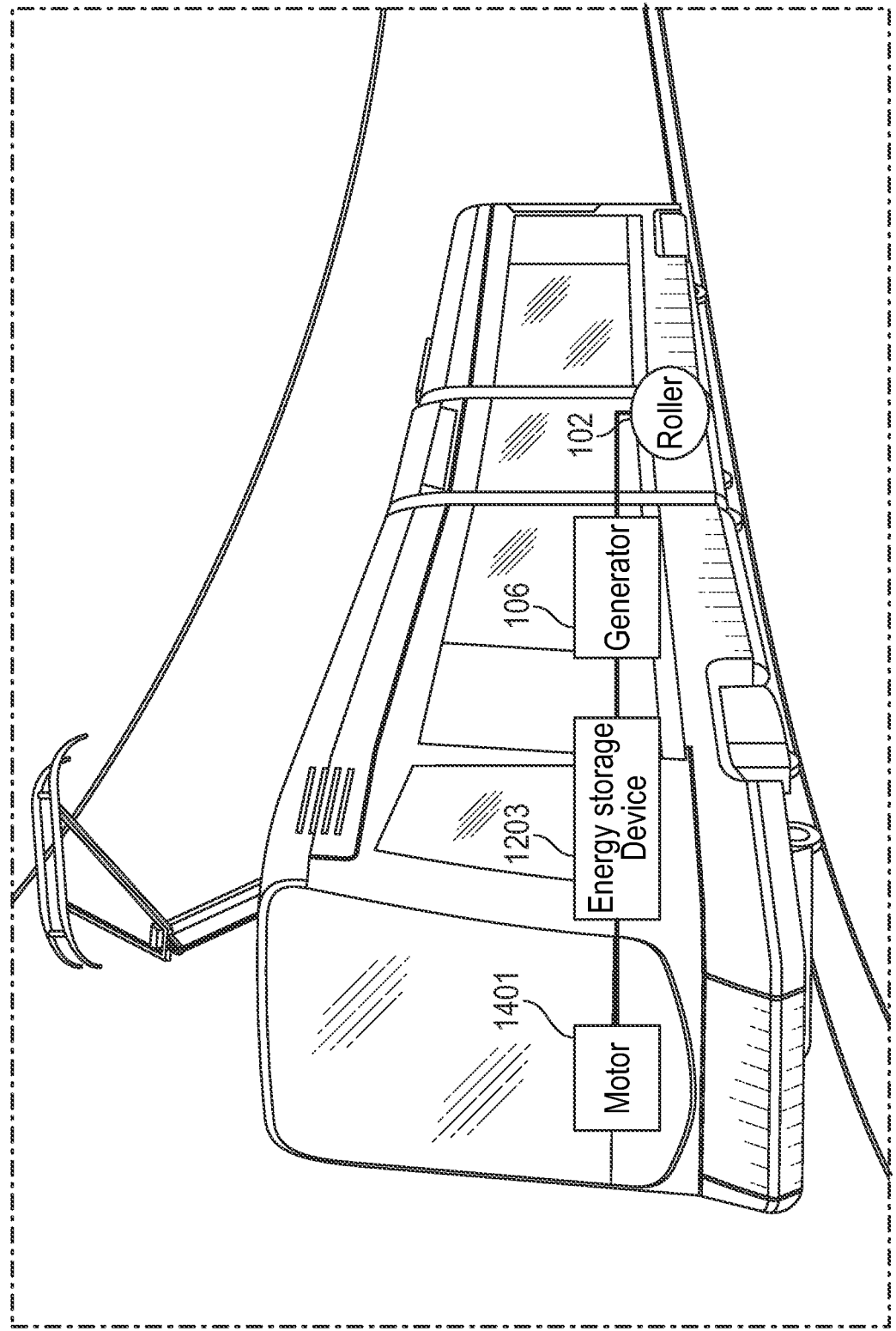
Figure 14:
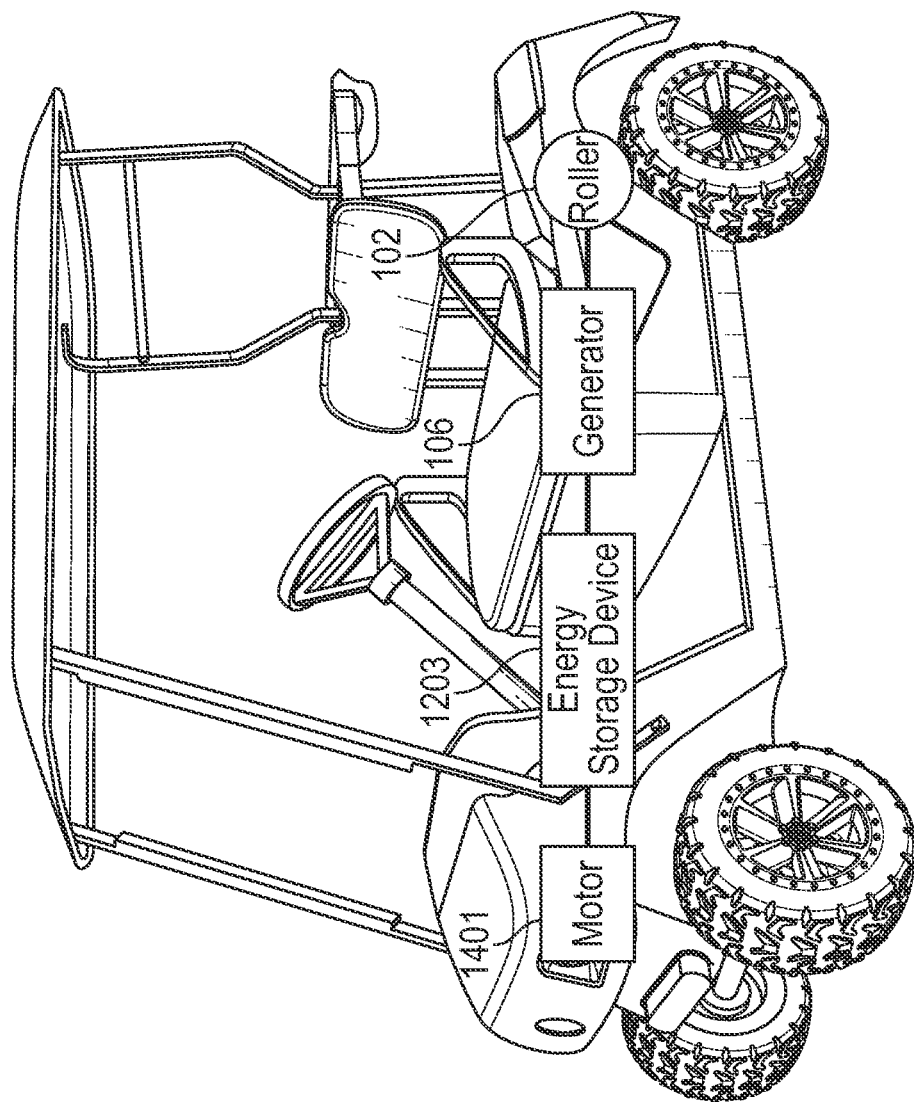

FIG. 14H illustrates an example tram that may incorporate the various components and systems discussed herein such as the apparatus 100, which may comprise a generator 106 and one or more rollers 102 rotatably couplable to a wheel of the vehicle, as well as a motor 1401, such as an electric motor, and an energy storage device 1203 which may comprise a capacitor 1204, a battery 1202 and/or a hypercapacitor 1302, as discussed herein. The generator 106 may be electrically coupled to the energy storage device 1203 and may be capable of providing energy to the energy storage device 1203, as discussed herein. The energy storage device 1203 may be electrically coupled to the motor 1401 and may be capable of providing energy to the motor 1401.

FIG. 14I illustrates an example cart such as a golf cart that may incorporate the various components and systems discussed herein such as the apparatus 100, which may comprise a generator 106 and one or more rollers 102 rotatably couplable to a wheel of the vehicle, as well as a motor 1401, such as an electric motor, and an energy storage device 1203 which may comprise a capacitor 1204, a battery 1202 and/or a hypercapacitor 1302, as discussed herein. The generator 106 may be electrically coupled to the energy storage device 1203 and may be capable of providing energy to the energy storage device 1203, as discussed herein. The energy storage device 1203 may be electrically coupled to the motor 1401 and may be capable of providing energy to the motor 1401.

Figure 14J:
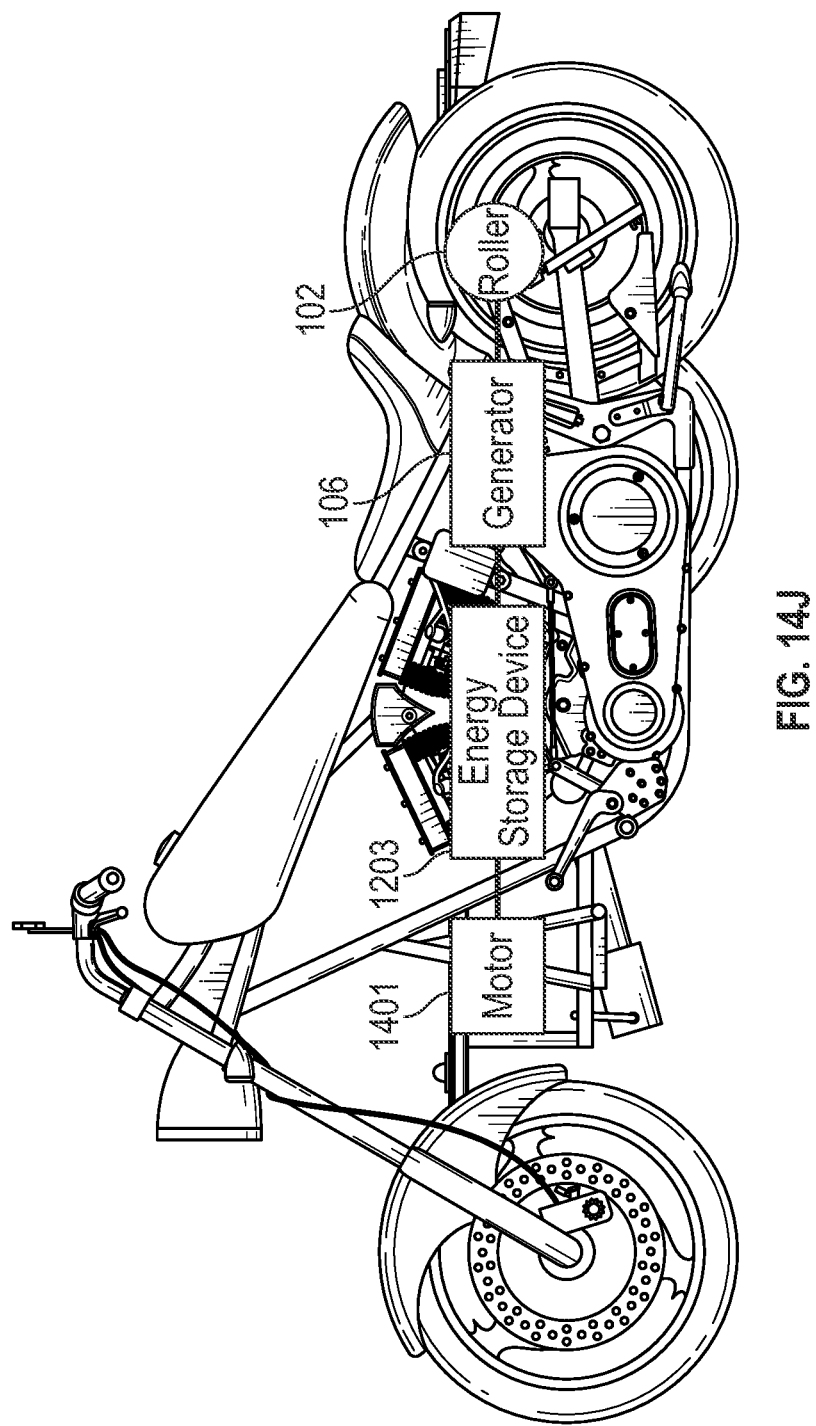

FIG. 14J illustrates an example motorcycle that may incorporate the various components and systems discussed herein such as the apparatus 100, which may comprise a generator 106 and one or more rollers 102 rotatably couplable to a wheel of the vehicle, as well as a motor 1401, such as an electric motor, and an energy storage device 1203 which may comprise a capacitor 1204, a battery 1202 and/or a hypercapacitor 1302, as discussed herein. The generator 106 may be electrically coupled to the energy storage device 1203 and may be capable of providing energy to the energy storage device 1203, as discussed herein. The energy storage device 1203 may be electrically coupled to the motor 1401 and may be capable of providing energy to the motor 1401.

Figure 15A:
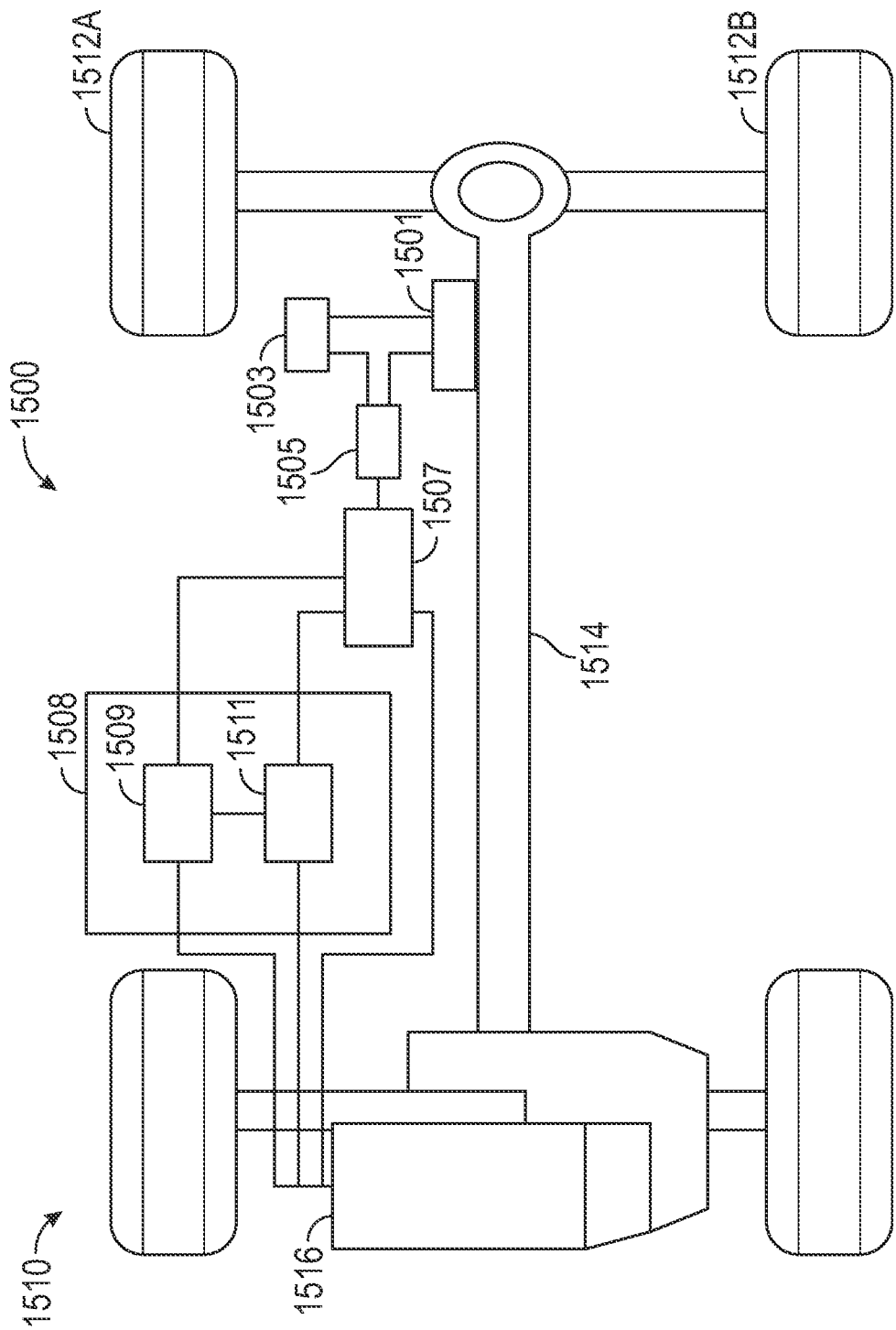
FIG. 15A is a schematic diagram illustrating an example implementation of an energy generation system, according to some embodiments.
Figure 15B:
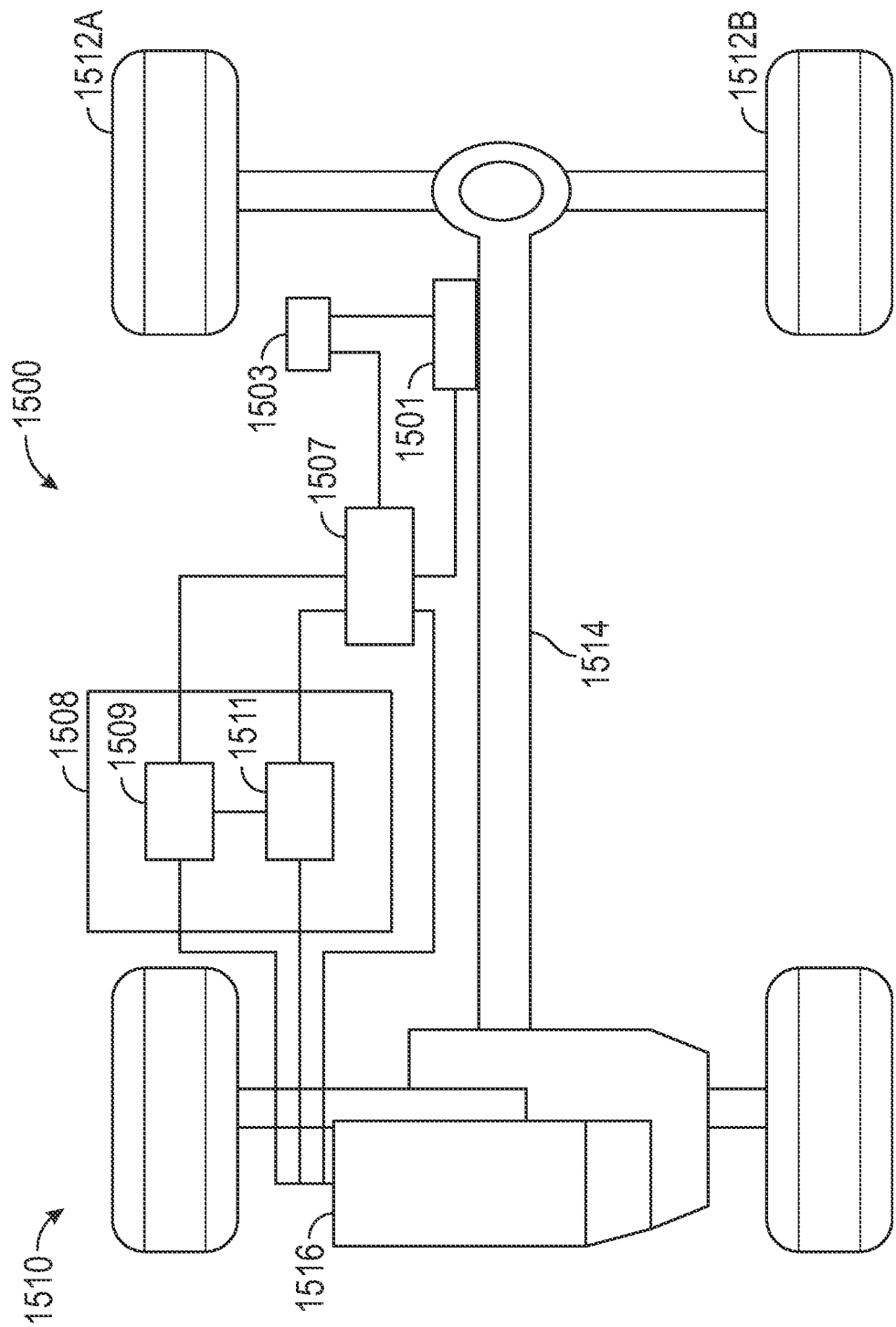
FIG. 15B is another schematic diagram illustrating an example implementation of an energy generation system, according to some embodiments.
Figure 15C:
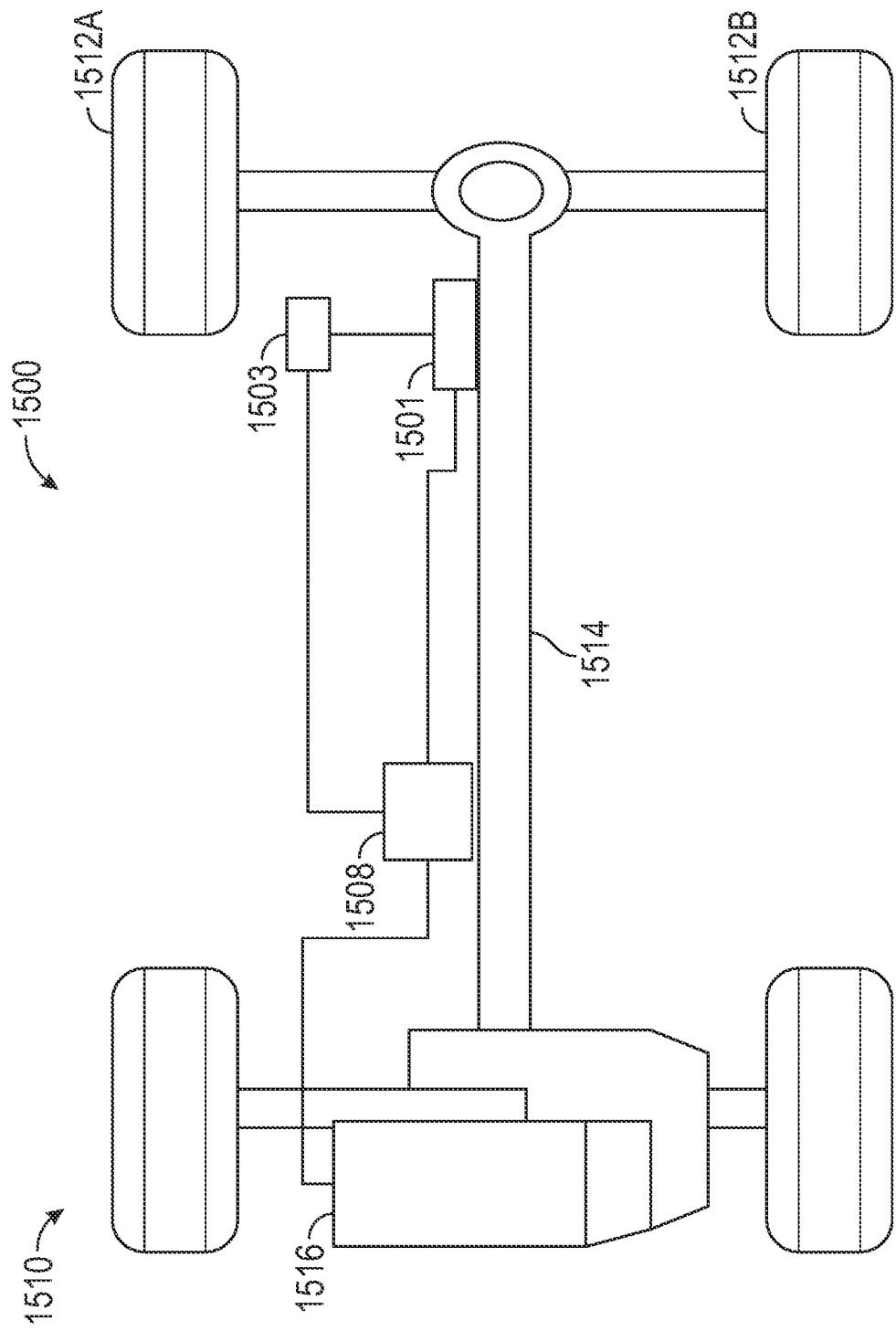
FIG. 15C is another schematic diagram illustrating an example implementation of an energy generation system, according to some embodiments.

FIG. 15A is a schematic diagram illustrating an example implementation of an energy generation system 1500, also referred to herein as "system". The system 1500 can include one or more of an energy recovery mechanism 1501, a controller 1503, a gearbox 1505, a generator 1507, and a energy storage 1508 such as a capacitor 1509 and/or a battery 1511. Figure FIGS. 15A-C are provided as an examples and are not intended to be limiting. In some implementations, the system 1500 may include less than each of the components shown and/or described in FIG. 15A. For example, FIG. 15B shows an energy generation system 1500 including one or more of a energy recovery mechanism 1501, a controller 1503, a generator 1507, and an energy storage 1508. Further, FIG. 15C shows an energy regeneration system 1500 including one or more or of the energy recovery mechanism 1501, the controller 1503, and the energy storage 1508. In some implementations, the system 1500 may include a plurality of energy recovery mechanisms 1501, a plurality of generators 1507, a plurality of capacitors 1509, and/or a plurality of batteries 1511.

The system 1500 may be disposed within a vehicle 1510. The system 1500 may be mobile with the vehicle 1510. The system 1500 may generate energy in response to a movement or motion of the vehicle 1510 and/or a movement or motion of components of the vehicle 1510 (for example, a drive shaft, axel, rotor). The system 1500 may generate energy when the vehicle 1510 is stationary. The system 1500 may generate energy to provide to the vehicle 1510. The system 1500 may provide energy to the vehicle 1510 to cause the vehicle 1510 to move. The vehicle 1510 may be configured to travel on a ground surface. The vehicle 1510 may be configured to travel on a water surface. The vehicle 1510 may be configured to travel through air. The vehicle 1510 may be, and/or incorporate features of, any of the example vehicle shown and/or discussed herein, such as with references to FIGS. 14A-15J.

The vehicle 1510 can include one or more wheels 1512 (for example, wheel 1512A, wheel 1512B). The vehicle 1510 can include a drive shaft 1514. The vehicle can include a motor 1516. The motor 1516 may be a traction motor. The motor 1516 may provide locomotive power to the vehicle 1510 to cause the vehicle 1510 to move. The motor 1516 may be an electric motor. The motor 1516 may generate mechanical energy in response to electrical energy. The motor 1516 may be coupled with the drive shaft 1514. The motor 1516 may cause the drive shaft 1514 to rotate. The drive shaft 1514 may be coupled with the wheels 1512. The drive shaft 1514 may cause the wheels 1512 to rotate.

The energy recovery mechanism 1501 may be rotatably coupled with the drive shaft 1514 or another rotating component of the vehicle. The energy recovery mechanism 1501 may include one or more rollers that rotates in response to a rotation of the drive shaft 1514. The generator 1507 may be rotatably coupled to the energy recovery mechanism 1501. The generator 1507 may generate an electrical output in response to a rotation of the one or more rollers of the energy recovery mechanism 1501. The generator 1507 may be coupled to the energy recovery mechanism 1501 via one or more of a flexible arm, shaft, rod, axle, gear, pulley, chain, or the like. The one or more rollers of the energy recovery mechanism 1501 may include similar structural and/or operational features as any of the other example rollers shown and/or discussed herein (for example, FIGS. 1-10B).

The energy recovery mechanism 1501 may be positioned adjacent to, but not in contact with, the drive shaft 1514. In some embodiments, the drive shaft 1514 may be magnetic such that it includes a magnetic field. In some embodiments, the drive shaft 1514 may induce a current to flow in the energy recovery mechanism 1501. In some embodiments, the current may be converted to voltage and stored in the energy storage 1508.

The energy recovery mechanism 1501 may be optionally coupled with the generator 1507 via a gearbox 1505 (for example, FIG. 15C). The gearbox 1505 may include one or more gears which may be one or more sizes. The gearbox 1505 can be coupled to the energy recovery mechanism 1501 and to generator 1507. The gearbox 1505 can adjust a rotational velocity of a rotatable component of the generator 1507 relative to a rotational velocity of a rotatable component of the one or more rollers. For example, the one or more rollers may be rotatably coupled to a first gear of the gearbox 1505 and the generator 1507 may be rotatably coupled to a second gear of the gearbox 1505. The first and second gears of the gearbox 1505 may be rotatably coupled. The first and second gears may be different sizes, including having different diameters, such that rotation of the first gear at a first angular velocity causes rotation of the second gear at a second angular velocity. The gearbox 1505 can change a ratio of angular velocity between the one or more rollers and a rotational component of the generator 1507 by changing a gear to which the one or more rollers and/or generator 1507 is rotatably coupled. Changing a ratio of angular velocity between the one or more rollers and a rotatable component of the generator 1507 may change a rate at which the generator 1507 generates an electrical output such as for a given angular velocity of the one or more rollers. The gearbox 1505 can adjust the ratio of rotation, such as by changing the gear to which the one or more rollers and the generator 1507 is rotatably coupled, according to user input and/or according to operational settings, according to any of the examples discussed herein.

In some implementations, the gearbox 1505 may rotatably decouple the one or more rollers from the generator 1507 such that rotation of the one or more rollers does not cause the generator 1507 to generate energy. For example, the gearbox 1505 may transition the one or more rollers between an engaged state and a disengaged state by rotatably decoupling the one or more rollers form the generator 1507. The generator 1507 may not generate energy in response to a rotation of the one or more rollers in the disengaged state. In some implementations, the term "engaged state" and the term "extended state" may be used interchangeably. In some implementations, the term "disengaged state" and the term "retracted state" may be used interchangeably.

The generator 1507 may be electrically coupled with the capacitor 1509. The generator 1507 may be electrically coupled with the capacitor 1509 via one or more switches or relays. The generator 1507 may be electrically coupled with the battery 1511 via one or more diodes biased toward the capacitor 1509. The generator 1507 may disperse energy to the capacitor 1509. The capacitor 1509 may include one or more capacitors. The capacitor 1509 may include one or more ultracapacitors, supercapacitors, or the like. The capacitor 1509 may be configured to store up to 10V, 50V, 100V, 200V, 300V, 400V, or the like.

The generator 1507 may be electrically coupled with the battery 1511. The generator 1507 may be electrically coupled with the battery 1511 via one or more switches or relays. The generator 1507 may be electrically coupled with the battery 1511 via one or more diodes biased toward the battery 1511. The generator 1507 may disperse energy to the battery 1511. The battery 1511 may include one or more batteries. The battery 1511 may include one or more lithium based batteries. The battery 1511 may not include lithium. The battery 1511 may be configured to store up to 10V, 50V, 100V, 200V, 300V, 400V, or the like.

The generator 1507 may be electrically coupled with the motor 1516. The generator 1507 may be electrically coupled with the motor 1516 via one or more switches or relays. The generator 1507 may be electrically coupled with the motor 1516 via one or more diodes biased toward the motor 1516. The generator 1507 may disperse energy to the motor 1516.

The capacitor 1509 may be electrically coupled with the battery 1511. The capacitor 1509 may be electrically coupled with the battery 1511 via one or more diodes. The diodes may be biased toward the battery 1511 and may prevent a flow of energy from the battery 1511 to the capacitor 1509. The one or more diodes may allow energy to flow from the capacitor 1509 to the battery 1511. The capacitor 1509 may be electrically coupled with the battery 1511 via one or more switches or relays. The capacitor 1509 may disperse energy to the battery 1511. The battery 1511 may receive energy from the capacitor 1509. In some implementations, the capacitor 1509 and/or the battery 1511 may include similar structural and/or operational features as the hypercapacitor 1302 shown and/or discussed herein.

The capacitor 1509 may be electrically coupled with the motor 1516. The capacitor 1509 may be electrically coupled with the motor 1516 via one or more switches or relays. The capacitor 1509 may be electrically coupled with the motor 1516 via one or more diodes biased toward the motor 1516. The capacitor 1509 may disperse energy to the motor 1516. The motor 1516 may receive energy from the capacitor 1509.

The battery 1511 may be electrically coupled with the motor 1516. The battery 1511 may be electrically coupled with the motor 1516 via one or more switches or relays. The battery 1511 may be electrically coupled with the motor 1516 via one or more diodes biased toward the motor 1516. The battery 1511 may disperse energy to the motor 1516. The motor 1516 may receive energy from the battery 1511.

The controller 1503 may include one or more hardware processors configured to execute program instructions to cause the controller 1503 or other components of the system 1500 and/or vehicle 1510 to perform one or more operations. The controller 1503 may be in electrical communication with one or more components. The controller 1503 may receive data from one or more components. The controller 1503 may transmit instructions to one or more components. The controller 1503 may be in electrical communication with the energy recovery mechanism 1501. The controller 1503 may receive data relating to an operation of the energy recovery mechanism 1501. Such data may include a rotational velocity and/or acceleration of the roller or a magnitude of a voltage or current induced in the energy recovery mechanism 1501. The controller 1503 may issue instructions, such as to an actuator, to cause the energy recovery mechanism 1501 to transition between the engaged state and the disengaged state. The controller 1503 may be in communication with the gearbox 1505. The controller 1503 may receive data relating to an operation of the gearbox 1505. The controller 1503 may issue instructions to cause the gearbox 1505 to perform one or more operations such as changing a gear to which the roller and/or the generator 1507 is coupled to change a ratio of rotational velocity between the roller and the generator 1507. The controller 1503 may be in communication with the generator 1507. The controller 1503 may receive data relating to an operation of the generator 1507 such as an amount of energy generated by the generator 1507 and/or a rate of energy generated by the generator 1507. The controller 1503 may issue instructions to cause the generator 1507 to perform one or more operations. The controller 1503 may be in communication with the capacitor 1509. The controller 1503 may receive data relating to an operation of the capacitor 1509 such as an amount of energy stored in the capacitor 1509, a voltage of the capacitor 1509, a rate of charge or discharge of the capacitor 1509, or the like. The controller 1503 may be in communication with the battery 1511. The controller 1503 may receive data relating to an operation of the battery 1511 such as an amount of energy stored in the battery 1511, a voltage of the battery 1511, a rate of charge or discharge of the battery 1511, or the like. The controller 1503 may be in communication with the motor 1516. The controller 1503 may receive data relating to an operation of the motor 1516 such as an energy consumed by the motor 1516 or the like. The controller 1503 may be in communication with the wheels 1512. The controller 1503 may receive data relating to one or more operations of the wheels 1512 such as an angular velocity or acceleration of the wheels 1512.

The controller 1503 may control whether the energy recovery mechanism 1501 is the engaged state or in the disengaged state. According to some embodiments, in the engaged state, the energy recovery mechanism 1501 may be in physical contact with the drive shaft 1514. According to some embodiments, in the engaged state, the energy recovery mechanism 1501 is not in physical contact with the drive shaft 1514. According to some embodiments, in the engaged state, the roller of the energy recovery mechanism 1501 may be rotatably coupled to the drive shaft 1514 and may rotate in response to a rotation of the drive shaft 1514. In some implementations, in the disengaged state, the roller of the energy recovery mechanism 1501 may not be in physical contact with the drive shaft 1514 such that rotation of the drive shaft 1514 does not cause the roller to rotate. In some implementations, in the disengaged state, the roller may be in physical contact with the drive shaft 1514 such that rotation of the drive shaft 1514 causes the roller to rotate but the energy recovery mechanism 1501 may not be rotatably coupled to the generator 1507 such that rotation of the roller does not cause the generator 1507 to generate an electrical output. In some embodiments, the energy recovery mechanism 1501 may switch from an engaged state to a disengaged state rapidly by moving the energy recovery mechanism 1501 to and from contact with the drive shaft 1514. The controller 1503 may cause the energy recovery mechanism 1501 to transition between the engaged and disengaged states in response to one or more of a velocity or acceleration of the vehicle 1510, angular velocity or acceleration of the wheels 1512, an amount of energy or rate of energy generated by the generator 1507, an energy demand required by the motor 1516, an amount of energy stored in the capacitor 1509, an amount of energy stored in the battery 1511, a rate of discharge of the capacitor 1509, a rate of discharge of the battery 1511, a user input, or the like.

The controller 1503 may control the ratio of angular velocity between the energy recovery mechanism 1501 and a rotational member of the generator 1507. The controller 1503 may adjust the ratio of angular velocity between the energy recovery mechanism 1501 and the generator 1507 to change a rate at which the generator 1507 generates energy. The controller 1503 may adjust the ratio of angular velocity between the energy recovery mechanism 1501 and the generator 1507 to change a torque applied by the roller of the energy recovery mechanism 1501 on the drive shaft 1514. As an example, increasing a torque applied by the roller on the drive shaft 1514 may cause the drive shaft 1514 to decrease angular velocity which may be desirable such as when decelerating the vehicle. The controller 1503 may control the ratio of angular velocity between the roller and the generator 1507 in response to one or more of a velocity or acceleration of the vehicle 1510, angular velocity or acceleration of the wheels 1512, an amount of energy or rate of energy generated by the generator 1507, an energy demand required by the motor 1516, an amount of energy stored in the capacitor 1509, an amount of energy stored in the battery 1511, a rate of discharge of the capacitor 1509, a rate of discharge of the battery 1511, a user input, or the like.

The controller 1503 may control the force exerted by the energy recovery mechanism 1501 on the drive shaft 1514. The controller 1503 may adjust the force exerted by the energy recovery mechanism 1501 on the drive shaft 1514 to change a rate at which the generator 1507 generates energy. The controller 1503 may adjust the force exerted by the energy recovery mechanism 1501 on the drive shaft 1514 to change a torque applied by the roller on the drive shaft 1514. As an example, increasing a torque applied by the roller on the drive shaft 1514 may cause the drive shaft 1514 to decrease angular velocity which may be desirable such as when decelerating the vehicle. The controller 1503 may control the force exerted by the energy recovery mechanism 1501 on the drive shaft 1514 in response to one or more of a velocity or acceleration of the vehicle 1510, angular velocity or acceleration of the wheels 1512, an amount of energy or rate of energy generated by the generator 1507, an energy demand required by the motor 1516, an amount of energy stored in the capacitor 1509, an amount of energy stored in the battery 1511, a rate of discharge of the capacitor 1509, a rate of discharge of the battery 1511, a user input, or the like.

The controller 1503 may control a flow of energy in the system 1500. The controller 1503 can control whether energy generated at the generator 1507 or the energy recovery mechanism 1501 is dispersed to the capacitor 1509, to the battery 1511, and/or to motor 1516. As an example, the controller 1503 may electrically couple and/or decouple the generator 1507 or energy recovery mechanism 1501 from any of the capacitor 1509, the battery 1511, and/or the motor 1516. As another example, the controller 1503 may electrically couple and/or decouple the capacitor 1509 from the motor 1516, may electrically couple and/or decouple the capacitor 1509 from the battery 1511, and/or may electrically couple and/or decouple the battery 1511 from the motor 1516. In some implementations, the controller 1503 may electrically couple and decouple various electrical components by controlling whether switches, relays, or the like that are disposed between electrical components are in an open or a closed state to control whether energy may from between the electrical components. As an example, the controller 1503 may control whether one or more switches electrically coupled with the generator 1507 conducts energy or prevents energy from passing from the generator 1507 to the capacitor 1509, the battery 1511, and/or the motor 1516.

In an example embodiment, a driver of a vehicle may receive a signal from the controller 1503 when at least a portion of the energy storage 1508 is full. The driver may send a signal to the controller 1503 to transfer the energy within the energy storage 1508 to the motor 1516. As the energy is transferred to the motor 1516, the energy recovery mechanism 1501 is in a disengaged state. The driver may send a signal to the controller 1503 to stop the transfer of energy within the energy storage 1508 to the motor 1516. When the energy transfer is stopped, the energy recovery mechanism 1501 may automatically switch to an engaged state.

In some embodiments, a flexible arm attaches the energy recovery mechanism 1501 to a feature of the vehicle. In some embodiments, a shaft, rod, actuator or other connecting mechanical feature may be used instead of the flexible arm as described herein. The feature of the vehicle may include the vehicle housing, a structural component located within the vehicle, the gearbox 1505, generator 1507, or the energy storage 1508 (for example, one or both of the capacitor 1509 or battery 1511). In some embodiments, the flexible arm may be rotatably coupled with the energy recovery mechanism 1501 and any of the above-mentioned features. In some embodiments, the flexible arm is attached to the 1501 via a joint. In some embodiments the joint may be rigidly fixed. In other embodiments, the joint may be a rotatable coupling. In other embodiments, the joint may be a ball and socket joint that allows for 360-degree rotation of the roller housing relative to the flexible arm. In other embodiments, the joint may be a universal joint that transmits motion and power from the roller of the energy recovery mechanism 1501.

In some embodiments, the flexible arm exerts a downward force on the energy recovery mechanism 1501. In some embodiments, the flexible arm exerts a downward force only in an engaged state. In some embodiments, the flexible arm exerts a downward force in both the engaged state and the disengaged state. In some embodiments, the downward force ensures that the energy recovery mechanism 1501 maintains constant contact with the drive shaft 1514. Further, the flexible arm may be configured to accommodate any oscillation of the drive shaft 1514 including vertical or horizontal movement. This allows the flexible arm to flex, bend, or move while maintaining the downward force. In some embodiments, the flexible arm is configured to pivot about one or more joints.

The term "downward force," is be used to signify a force vector, comprising both magnitude and direction, that is normal to, or tangentially adjacent to, a plane of contact between the roller and the drive shaft 1514. Further, the magnitude of the force vector may be adjustable while the system or apparatus 1500 is in the engaged state. For example, the controller 1503 may control the amount of force exerted on the drive shaft 1514 by the flexible arm. This may be done automatically, or via user command. The controller 1503 may control the magnitude of the force in response to one or more of a velocity or acceleration of the vehicle 1510, angular velocity or acceleration of the wheels 1512, an amount of energy or rate of energy generated by the generator 1507, an energy demand required by the motor 1516, an amount of energy stored in the capacitor 1509, an amount of energy stored in the battery 1511, a rate of discharge of the capacitor 1509, a rate of discharge of the battery 1511, a user input, or the like.

Frictional force is a function of the normal force between two objects. Thus, an increase in the downward force on the roller results in an increase in the amount of friction between the roller and the drive shaft 1514. An increase in friction between the roller and the drive shaft 1514 results in greater contact and a decrease in slippage which in turn results in a greater conversion of rotational movement from the drive shaft 1514 to the energy recovery mechanism 1501 via the roller. Thus, the downward force serves to increase the overall energy efficiency of the system.

The flexible arm may be made from a variety of materials, such as but not limited to, metals, polymers, or fiber-based materials. The flexible arm may be comprised of a single component or a combination thereof. These components may bend or flex to exert a downward force and accommodate any movement between the feature of the vehicle and the drive shaft 1514. Additionally, the flexible arm may be made up of a combination of components made of rigid material that are coupled together via joints or hinges such that the arm, as a whole, flexes. In some embodiments, the flexible arm is positioned parallel to the rotational axis of the drive shaft 1514. In some embodiments, the shape of the flexible arm changes as the force exerted on the drive shaft 1514 increases. In some embodiments, a spring or actuator is coupled to the flexible arm and applies to cause or increase the downward force.

In some embodiments, a surface of the one or more rollers and/or a surface of the drive shaft 1514 which contacts the one or more rollers, may include a material and/or texture designed to increase friction. In some embodiments, the material may include silicon, rubber, polymer or other composite with a high coefficient of friction. In some embodiments, this material may have a coefficient of friction that is higher than the surface of the drive shaft 1514 which does not contact the one or more rollers. Frictional force is a function of the coefficient of friction of the surface of an object. Thus, an increased coefficient of friction of either the surface of the one or more rollers or the drive shaft 1514 results in an increase in the amount of friction between those surfaces, minimize the amount of slippage that occurs between those surfaces and results in an increase to the overall energy efficiency of the system. Further, the material may be high in hardness or resistant to erosion and thus prolong the life of the drive shaft and/or rollers. In some embodiments, the texture includes bumps, ridges, and other irregularities to increase the roughness and friction. In some embodiments, the surface of the one or more rollers and drive shaft include interlocking teeth similar to a gear. In some embodiments, the flexible arm, energy recovery mechanism 1501, or parts of the energy recovery mechanism 1501 are configured to be rapidly replaceable such as during a pit stop of a racing event.

Figure 16:
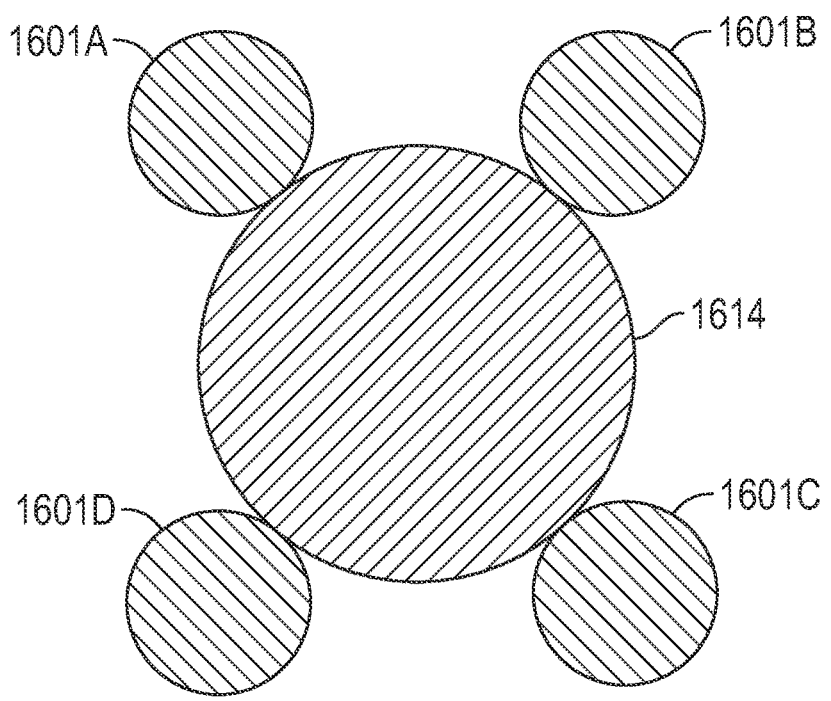
FIG. 16 is a cross section view of an example drive shaft and rollers, according to some embodiments.

FIG. 16 illustrates a cross section view of an example drive shaft 1614 and rollers 1601 (for example, rollers 1601A, 1601B, 1601C, 1601D). The rollers 1601 may have a smaller diameter than the drive shaft 1614. In some implementations, rollers 1601 may have a larger diameter than the drive shaft 1614. In some implementations, one or more of the rollers 1601 may have a different diameter than one or more of the other rollers 1601. In some implementations, each of the rollers 1601 may have the same diameter. The drive shaft 1614 may be encompassed by a plurality of rollers 1601. In the example shown, four rollers 1601 contact the drive shaft 1614 at various locations around a circumference of the drive shaft 1614. In some implementations, less than four rollers 1601 may encompass the drive shaft 1614. In some implementations, more than four rollers 1601 may encompass the drive shaft 1614. In some implementations, the rollers 1601 may encompass the drive shaft 1614 at non-symmetrical locations around the drive shaft 1614. In some implementations, the rollers 1601 may encompass the drive shaft 1614 at symmetrical locations around the drive shaft 1614. The rollers 1601 may rotate at a different angular velocity than the drive shaft 1614. The rollers 1601 may rotate as a same angular velocity as the drive shaft 1614.

As shown in FIG. 16, the rollers 1601 can include a smooth outer surface. In some implementations, a surface of the rollers 1601 may include texture such as gears, notches, grooves, or the like which may increase a friction between the drive shaft 1614 and the rollers 1601 to facilitate a rotational response of the rollers 1601 due to rotation of the drive shaft 1614.

Figure 17:
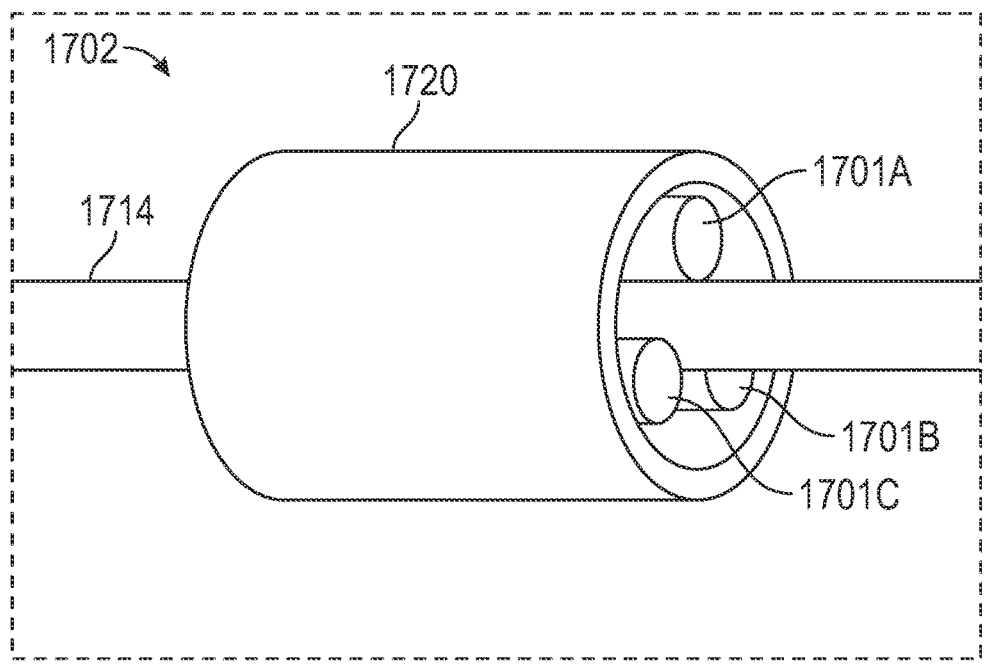
FIG. 17 is a perspective view of an example energy recovery mechanism with a partial housing, according to some embodiments.

FIG. 17 is a perspective view of an example drive shaft 1714 and energy recovery mechanism 1702. The energy recovery mechanism 1702 includes one or more rollers 1701 (for example, roller 1701A, 1701B, 1701C) disposed within a housing 1720. The one or more rollers 1701 may each resemble a cylinder with a length that is substantially a length of the housing 1720. In some embodiments, the length of the one or more rollers 1701 may be less than the length of the housing 1720. The housing 1720 may encompass the drive shaft 1714. In some implementations, the housing 1720 may encompass an entire circumference of the drive shaft 1714. In some implementations, the housing 1720 may encompass less than an entire circumference of the drive shaft 1714. The housing 1720 may house three rollers 1701. The housing 1720 may house less than three rollers 1701. The housing 1720 may house more than three rollers 1701. A portion of the rollers 1701 may be exposed to an exterior surface of the housing 1720 to be coupled with a generator. The rollers 1701 may rotate relative to the housing 1720. The drive shaft 1714 may rotate relative to the housing 1720. The one or more rollers 1701 may be rotatable coupled to the housing 1720.

In some implementations, the housing 1720 may house a generator rotatably coupled to one or more of the rollers 1701 and configured to generate energy in response to a rotation of the roller(s) 1701. In some implementations, a cable may electrically connect the energy recovery mechanism 1702 to an energy storage of the system. In some implementations, a shaft or flexible arm may connect the energy recovery mechanism 1702 to a feature of the vehicle.

Figure 18:
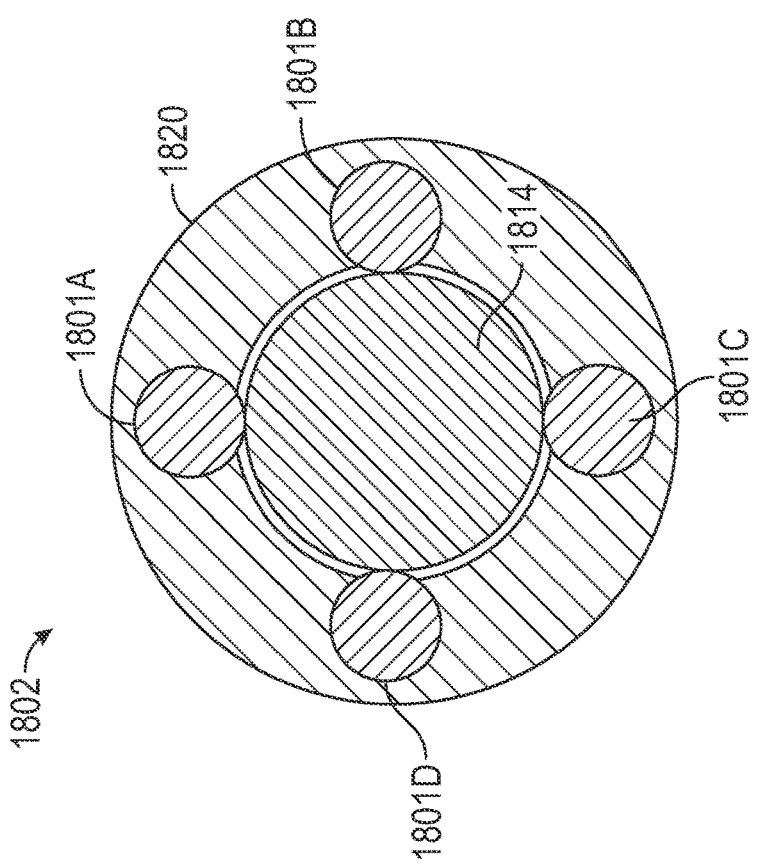
FIG. 18 is a cross sectional view of an example energy recovery mechanism with a full housing, according to some embodiments.

FIG. 18 illustrates a cross section view of an example drive shaft 1814 and energy recovery mechanism 1802. The energy recovery mechanism 1802 includes a housing 1820 and one or more rollers 1801 (for example, roller 1801A, 1801B, 1801C, 1801D). The housing 1820 may ensure that the rollers 1801 remain in contact with the drive shaft 1814 as desired. The housing 1820 may apply a force to the rollers 1801 to ensure that the rollers 1801 remain in contact with the drive shaft 1814. The housing 1820 may not contact the drive shaft 1814. The housing 1820 may not rotate. In some implementations, the housing 1820 may change diameter to change a force applied to the rollers 1801 on the drive shaft 1814. In some implementations, the housing 1820 may change a diameter to remove the rollers 1801 from contacting the drive shaft 1814, such as in a disengaged state. In some implementations, the rollers 1801 may remain in contact with the drive shaft 1814 in a disengaged state.

Figure 19:
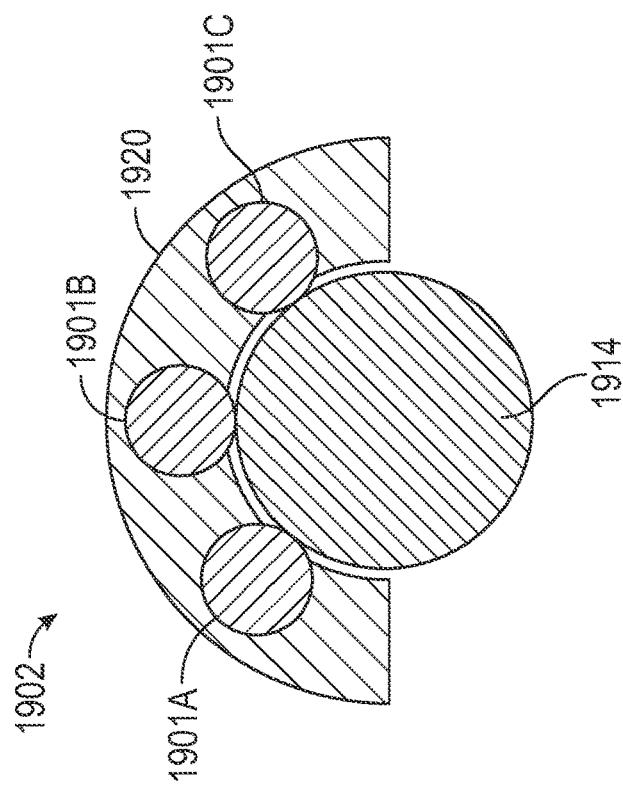
FIG. 19 is a cross sectional view of an example energy recovery mechanism, according to some embodiments.

FIG. 19 illustrates a cross section view of an example drive shaft 1914 and energy recover mechanism 1902. The energy recovery mechanism 1902 includes an housing 1920 and one or more rollers 1901 (for example, roller 1901A, 1901B, 1901C, 1901D). The housing 1920 may cover a portion of the drive shaft 1914. The housing 1920 may encompass less than an entire circumference of the drive shaft 1914. In some implementations, multiple energy recover mechanisms 1902 may encompass the drive shaft 1914. For example, multiple energy recover mechanism 1902 may encompass various portions around a circumference of the drive shaft 1914 at a same length of the drive shaft 1914.

The housing 1920 may cause the rollers 1901 to contact the drive shaft 1914. The housing 1920 may cause the rollers 1901 to remove from contacting the drive shaft 1914. The housing 1920 may transition between causing the rollers 1901 to contact the drive shaft 1914 and causing the rollers 1901 to not contact the drive shaft 1914. For example, a flexible arm, lever, or other actuator may physically move the energy recover mechanism 1902 such that the rollers 1901 contact the drive shaft 1914 or do not contact the drive shaft 1914. In some implementations, a flexible arm, lever, or other actuator may apply a force to the energy recover mechanism 1902 to change a force applied by the rollers 1901 on the drive shaft 1914.

Figure 20A:
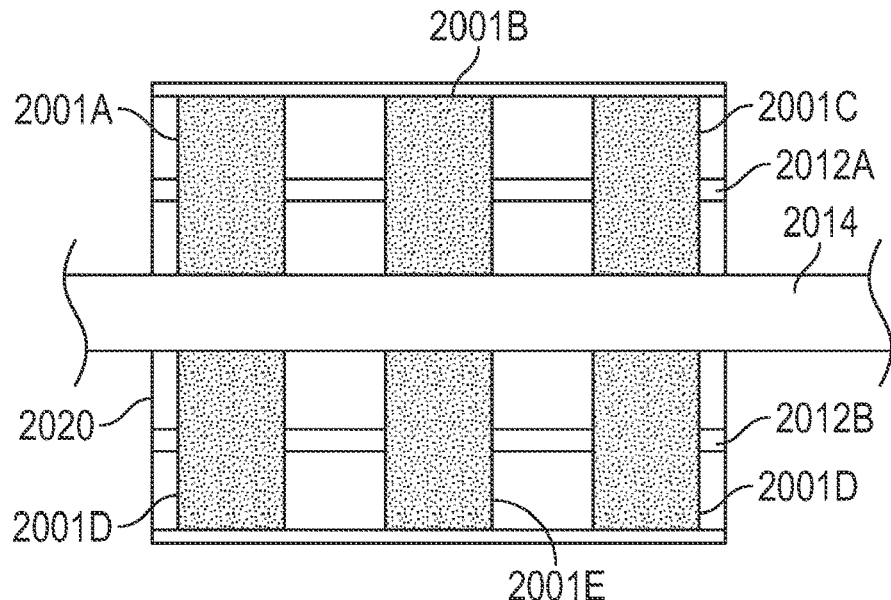
FIG. 20A is a side view of an example energy recovery mechanism and drive shaft, according to some embodiments.
Figure 20B:
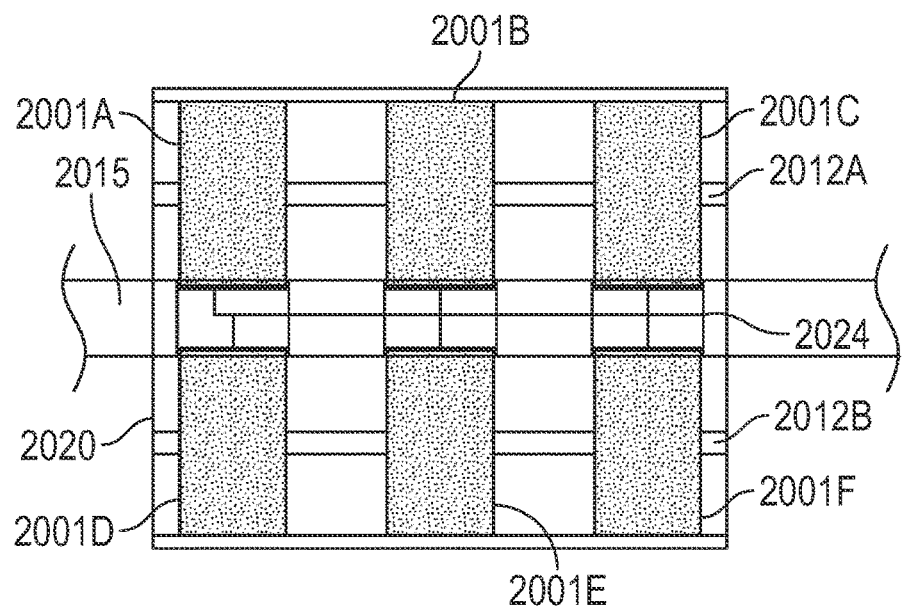
FIG. 20B is a side view of an example energy recovery mechanism and drive shaft with grooves, according to some embodiments.

FIG. 20A illustrates a sideview of an energy recovery mechanism 2002 and a drive shaft 2014. FIG. 20B illustrates a sideview of the energy recovery mechanism 2002 and a drive shaft 2015 with a groove.

The energy recovery mechanism 2002 includes a housing 2020 and one or more rollers 2001 (for example 2001A, 2001B, 2001C, 2001D, 2001E, 2001F). The one or more rollers 2001 are rotationally aligned and positioned tangentially adjacent to the drive shaft 2014. The one or more rollers 2001A-C are coupled to a roller axel 2012A. The one or more rollers 2001D-F are coupled to a roller axel 2012B. Each roller axel 2012A, B is attached to the housing 2020. The roller axels 2012A, B help to keep the one or more rollers aligned. In some embodiments, the roller axels 2012A, B are rotationally coupled to a flexible arm, shaft, gear, pulley etc. to transmit the rotational energy received from the drive shaft 2014 to a generator, gear box, or energy storage.

Drive shaft 2015 of FIG. 20B includes one or more grooves 2024 positioned circumferentially along the shaft. The one or more grooves 2024 are spaced apart to match a spacing of the one or more rollers 2001. The one or more grooves 2024 are positioned to accommodate each of the one or more rollers 2001. The point of contact between each one or more rollers 2001 may be at the one or more grooves 2024. Each of the one or more grooves 2024 may have a width that is substantially the same as the width of the one or more rollers 2001. The cross-sectional shape of the one or more grooves 2024 may mirror that of the one or more rollers 2001 to maximize contact. The depth of the one or more grooves 2024 may vary depending on the diameter of the one or more rollers 2001 and the thickness of the drive shaft 2015. The one or more grooves 2024 may operate to guide the one or more rollers 2001 as the drive shaft 2015 rotates. Further, the one or more grooves 2024 provides an increase in contact area between the one or more rollers 2001 and the drive shaft 2015.

Figure 21A:
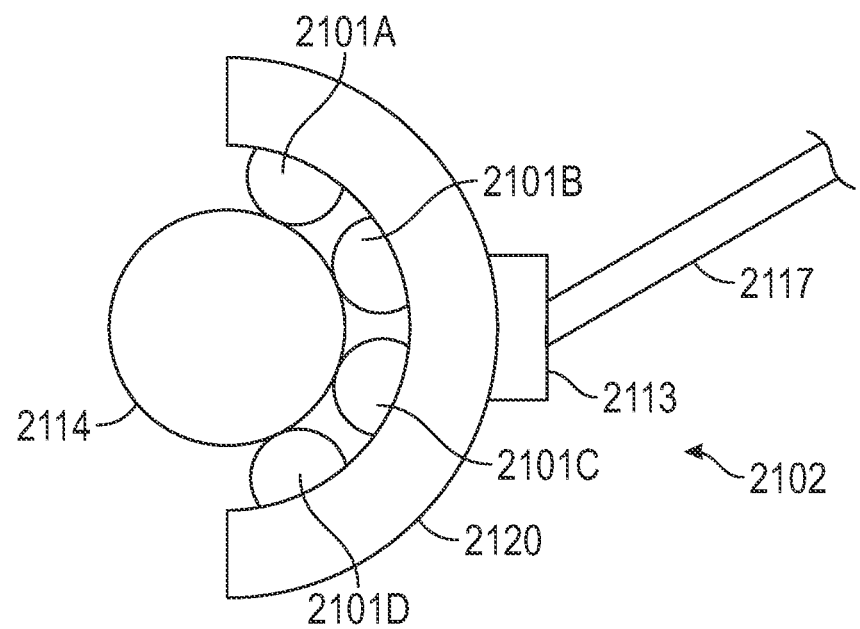
FIG. 21A is a side view of an example energy recovery mechanism in an engaged position.
Figure 21B:
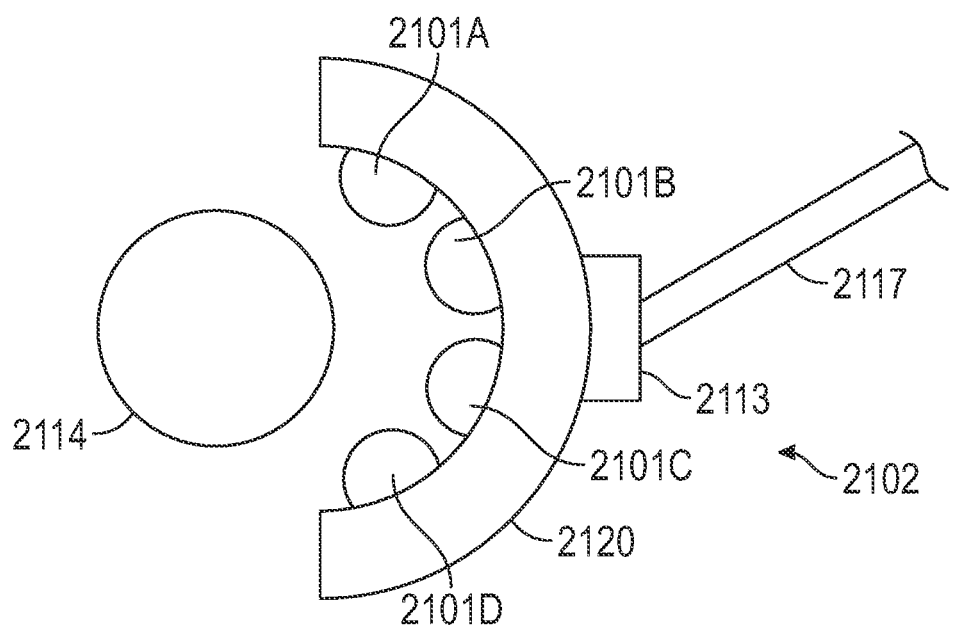
FIG. 21B is a side view of an example energy recovery mechanism in a disengaged position.

FIG. 21A illustrates a sideview of an energy recovery mechanism 2102 in contact with a drive shaft 2114. FIG. 21B illustrates a sideview of the energy recovery mechanism 2102 not in contact with the drive shaft 2114. The energy recovery mechanism 2102 includes one or more rollers 2101 (for example 2101A, 2101B, 2101C, 2101D) and a housing 2120. A joint 2113 is attached to a backside of the housing 2120 and couples the energy recovery mechanism 2102 to a flexible arm 2117. The flexible arm 2117 moves the energy recovery mechanism 2102 between the contact and noncontact positions. In some embodiments, the contact position is an engaged state. In some embodiments, the noncontact position is the disengaged state. In some embodiments, the flexible arm 2117 is rotatably and/or pivotally coupled to the joint 2113 which is rotatably coupled to the one or more rollers 2101.

Figure 22:
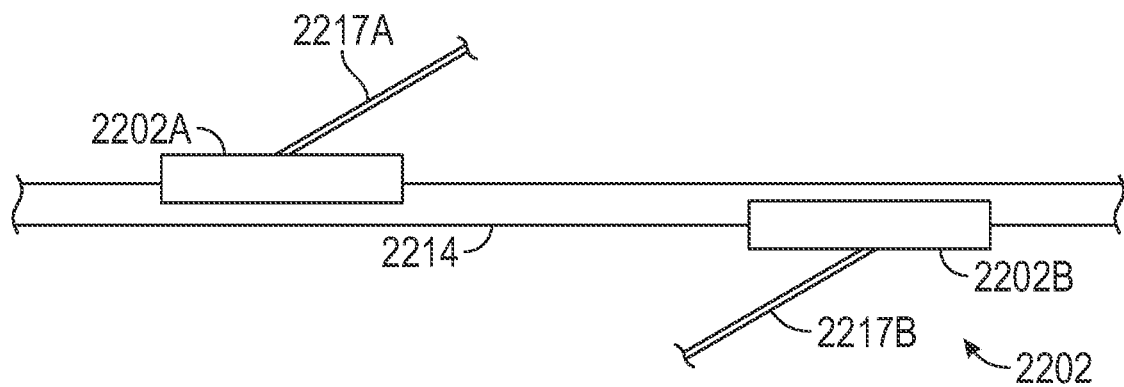
FIG. 22 is a top down view of a drive shaft and several energy recovery mechanisms.

FIG. 22 is a top-down illustration of a system 2202 with multiple energy recovery mechanisms positioned adjacent a drive shaft 2214. A first energy recovery mechanism 2202A is positioned on one side of the drive shaft 2214 and attached to a first flexible arm 2217. A second energy recovery mechanism 2202B is positioned on another side of the drive shaft 2214 and attached to a second flexible arm 2217B. The first energy recovery mechanism 2202A is laterally spaced apart from the second energy recovery mechanism 2202B. Both energy recovery mechanisms are in an engaged state with the drive shaft 2214. In some embodiments, the energy recovery mechanisms may be positioned such that they are not laterally spaced apart. In some embodiments, more than two energy recovery mechanisms may engage the drive shaft 2214.

Figure 23A:
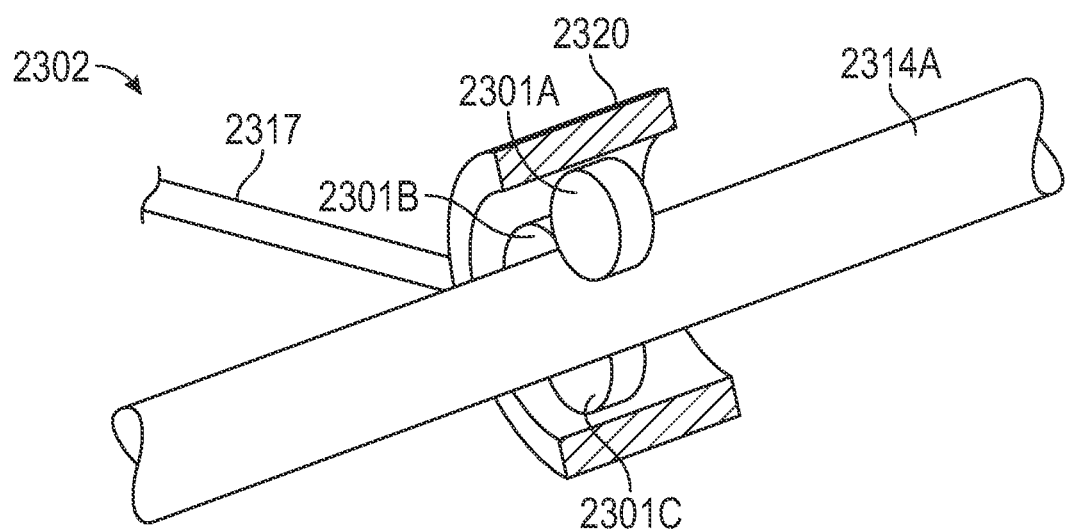
FIG. 23A is a perspective view of an example energy recovery mechanism and drive shaft, according to some embodiments.

FIG. 23A illustrates an embodiment with a cut-away view of an energy recovery mechanism 2302 engaged with a drive shaft 2314A. The energy recovery mechanism 2302 includes one or more rollers 2301 (for example 2301A, 2301B, 2301C) and a housing 2320. A flexible arm 2317 is attached to the energy recovery mechanism 2302 and a feature of the vehicle.

Figure 23B:
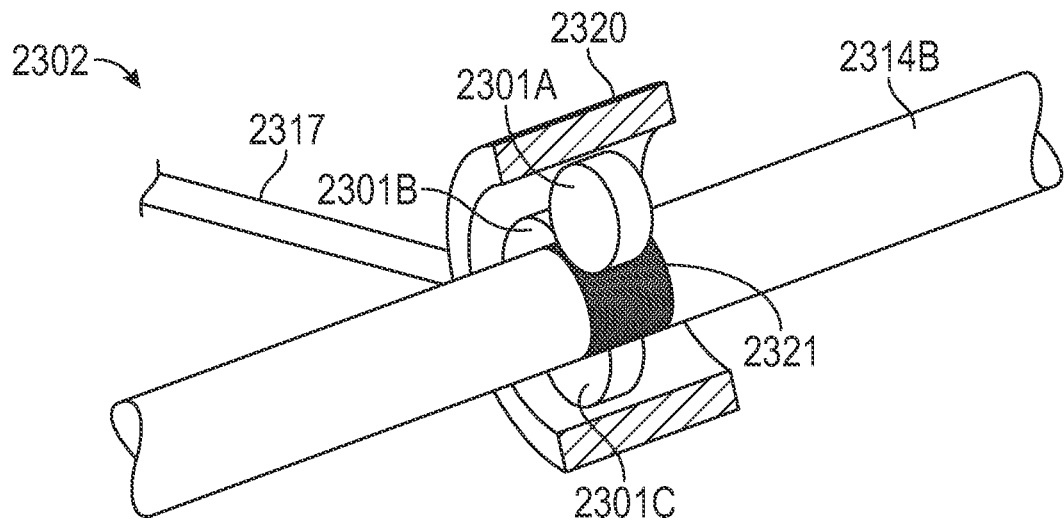
FIG. 23B is a perspective view of an example energy recovery mechanism and drive shaft with a textured surface, according to some embodiments.

FIG. 23B illustrates another embodiment of the energy recovery mechanism 2302 engaged with the drive shaft 2314B. The drive shaft 2314B includes an outer surface 2321 which contacts the one or more rollers 2301. The outer surface 2321 includes a material and/or texture with a high coefficient of friction.

Figure 23C:
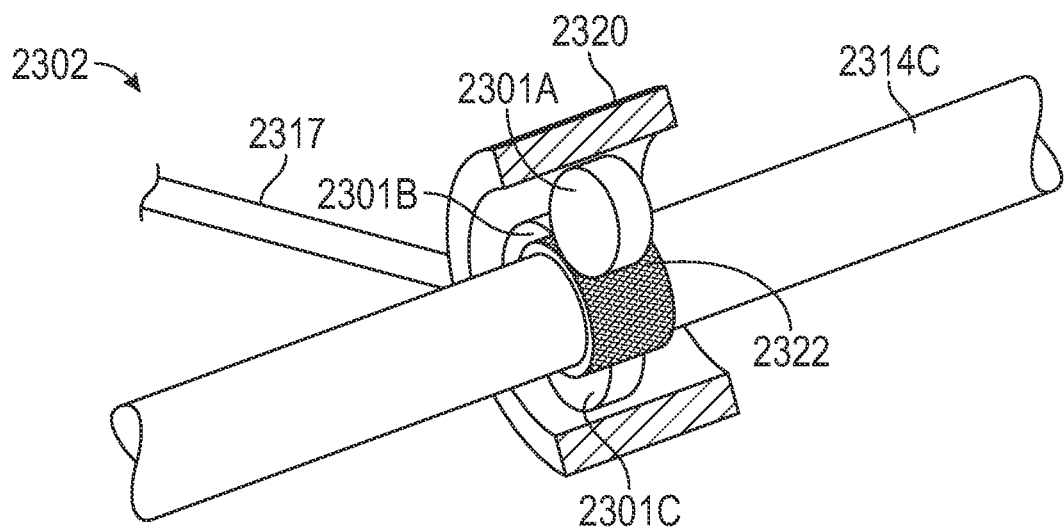
FIG. 23C is a perspective view of an example energy recovery mechanism and drive shaft with a raised shoulder, according to some embodiments.

FIG. 23C illustrates another embodiment of the energy recovery mechanism 2302 engaged with a drive shaft 2314C. The drive shaft 2314C includes a shoulder 2322 which has a larger diameter than the rest of the shaft. The shoulder 2322 contacts the one or more rollers 2301. The shoulder 2322 optionally includes an outer surface having a material and/or texture with a high coefficient of friction.

Figure 23D:
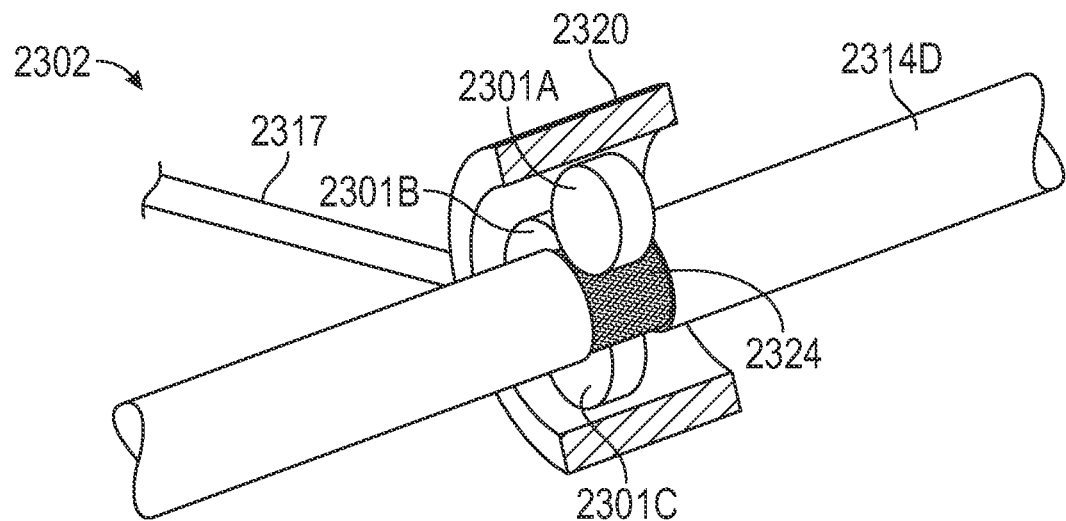
FIG. 23D is a perspective view of an example energy recovery mechanism and drive shaft with a groove, according to some embodiments.

FIG. 23D illustrates another embodiment of the energy recovery mechanism 2302 engaged with a drive shaft 2314D. The drive shaft 2314D includes a groove 2324 which has a smaller diameter than the rest of the shaft. The groove 2324 contacts the one or more rollers 2301. The groove 2324 optionally may include an outer surface having a material and/or texture with a high coefficient of friction.

Figure 23E:
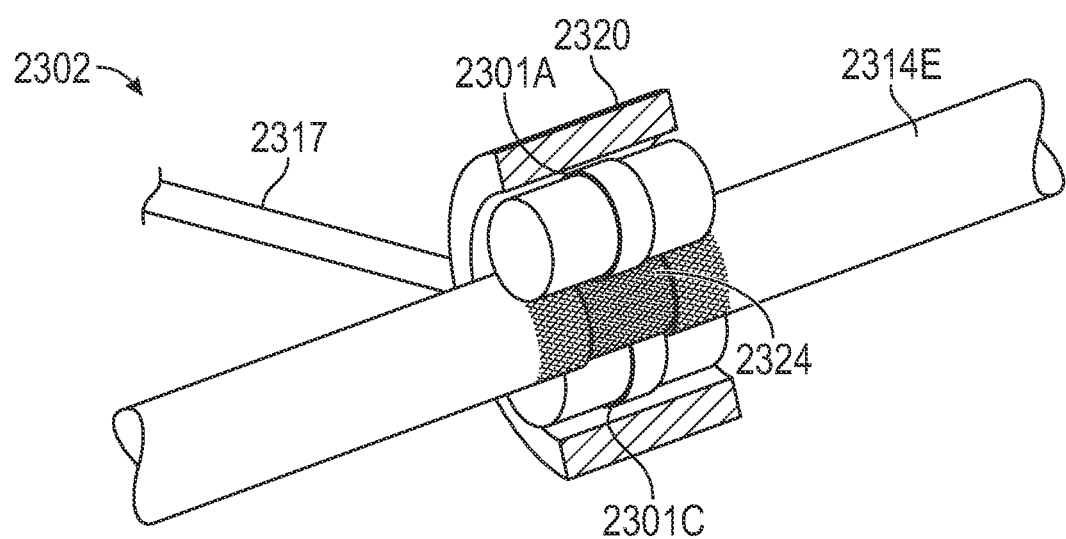
FIG. 23E is a perspective view of an example energy recovery mechanism and drive shaft with a groove, according to some embodiments.

FIG. 23E illustrates another embodiment of the energy recovery mechanism 2302 engaged with a drive shaft 2314E. The drive shaft 2314E includes the groove 2324 which has a smaller diameter than the rest of the shaft. The groove 2324 contacts the one or more rollers 2301. The groove 2324 may include an outer surface having a material and/or texture with a high coefficient of friction. Additionally, portions of the shaft immediately surrounding the groove 2324 may include this material. Here, the one or more rollers 2301 may take a cylindrical form that contacts the outer surface of the drive shaft 2314E not including the groove 2324. The one or more rollers 2301 may have a raised portion that extends radially and forms a roller bump. The roller bump will have a diameter that is larger than the roller diameter. The difference between the roller diameter and the diameter of the roller bump shall be substantially equal to the depth of the groove 2324 multiplied by a factor of two. The depth of the groove is substantially equal to the distance between the surface of the drive shaft 2314E and the surface of the groove 2324. The width of the roller bump may be less than or in some embodiments substantially equal to, but not in excess of, the groove 2324 width.

Figure 24:
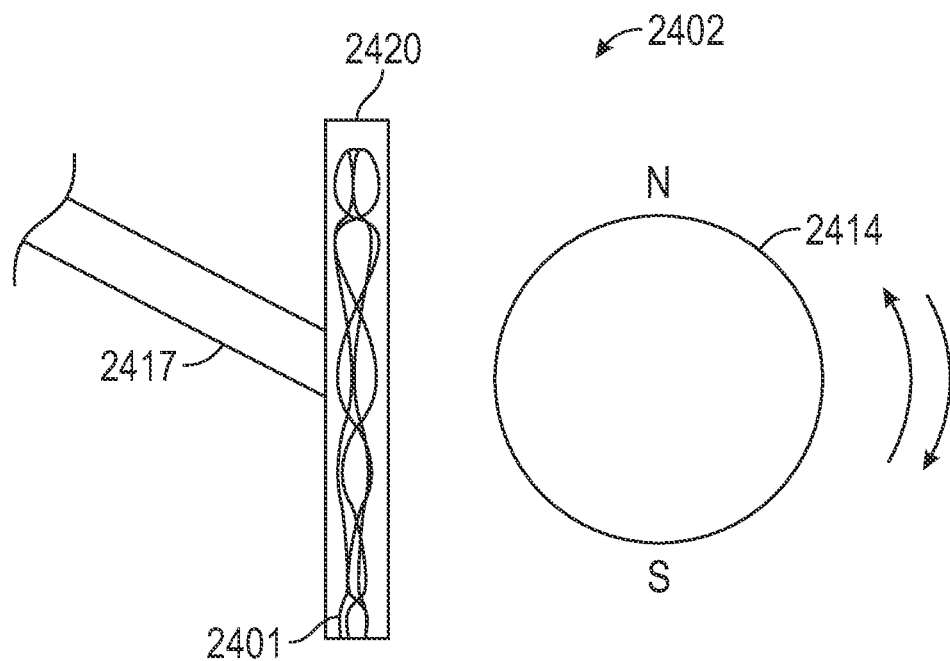
FIG. 24 is a sectional view of an example energy recovery mechanism and magnetic drive shaft, according to some embodiments.

FIG. 24 illustrates a sideview of an example embodiment of an energy recovery mechanism 2402 and where the energy is recovered without physical contact with a drive shaft 2414. The energy recovery mechanism 2402 includes a housing 2420 and one or more wires 2401 positioned within. A flexible arm 2417 connects the housing 2420 to a feature of the vehicle.

The drive shaft 2414 is magnetic and includes a magnetic north and magnetic south which creates a magnetic field. In some embodiments, the whole drive shaft 2414 is magnetic. In some embodiments, only a portion of the drive shaft 2414 is magnetic. In some embodiments, one or more magnets are fastened to the drive shaft. In some embodiments, one or more magnets are placed within the drive shaft. The magnets and/or drive shaft include permanent magnets. In some embodiments, the magnets and/or drive shaft include electromagnets.

A flexible arm 2417 is attached to the energy recovery mechanism 2402. The flexible arm 2417 is configured to move the energy recovery mechanism 2402 to adjust the distance between the energy recovery mechanism 2402 and the drive shaft 2414 based on a signal received from a controller. The flexible arm 2417 may also electrically coupled the 2420 to a feature of the vehicle such as an energy storage (capacitor and/or battery), generator, or motor.

The housing 2420 may be rectangular in shape. In some embodiments, the shape of the housing 2420 may be curved toward the drive shaft 2414. In some embodiments, the housing 2420 may encompass the drive shaft 2414.

In use, the magnetic drive shaft 2414 rotates in a clockwise or counterclockwise direction. This rotation causes the magnetic field of the shaft to rotate/alternate, thus inducing an electromagnetic force (EMF) in the one or more wires of the energy recovery mechanism 2402 and a current to flow in the wires. According to Faraday's law, the resulting EMF is proportional to the rate of change of the magnetic field and the number of turns in the coil of wire.

The one or more wires 2401 may be oriented to optimize the magnitude of the induced current. This may include one or more hoops, coils etc. The one or more wires may be connected to a resistor to convert the current to voltage. In some embodiments, the resistor may be located within the energy recovery mechanism 2402. In some embodiments, the current is transferred out of the energy recovery mechanism 2402 before the current is converted to voltage.

A benefit of the energy recovery mechanism 2402 is that it does not require direct contact with the drive shaft 2414. This increases the longevity of the energy recovery mechanism 2402 and drive shaft 2414 by eliminates friction and the associated wear from mechanical contact.

Figure 25:
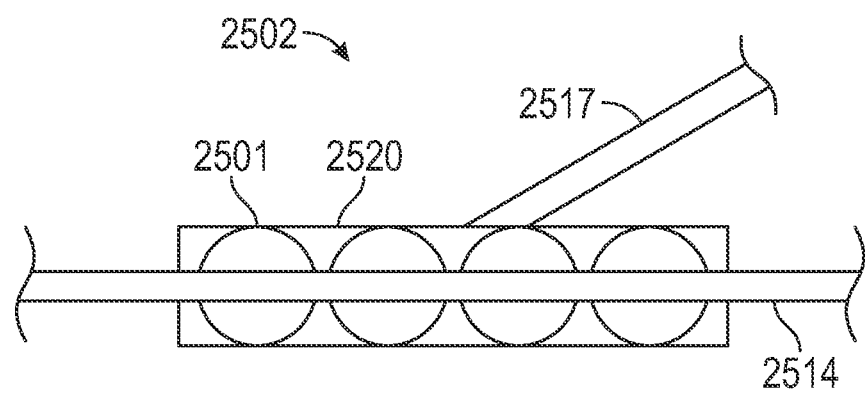
FIG. 25 is a side view of an example energy recovery mechanism and magnetic drive shaft, according to some embodiments.

FIG. 25 illustrates a sideview of an example embodiment of an energy recovery mechanism 2502 positioned adjacent a magnetic drive shaft 2514. The energy recovery mechanism 2502 includes a housing 2520 and one or more wires 2501 positioned within. A flexible arm 2517 connects the energy recovery mechanism 2502 to a feature of the vehicle. The one or more wires 2501 within the housing 2520 are oriented to form hoops positioned parallel to the drive shaft 2514. In some embodiments, one or more of the energy recovery mechanisms may be positioned adjacent to the drive shaft 2514.

Additional Embodiments

As used herein, "system," "instrument," "apparatus," and "device" generally encompass both the hardware (for example, mechanical and electronic) and, in some implementations, associated software (for example, specialized computer programs for graphics control) components.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

Each of the processes, methods, and algorithms described in the preceding sections may be embodied in, and fully or partially automated by, code modules executed by one or more computer systems or computer processors including computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described herein generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various features and processes described herein may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The various illustrative logical blocks and modules described in connection with the embodiments disclosed herein can be implemented or performed by a machine, such as a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable devices that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some, or all, of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, and so forth, may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

All of the methods and processes described herein may be embodied in, and partially or fully automated via, software code modules executed by one or more general purpose computers. For example, the methods described herein may be performed by the computing system and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the herein-described embodiments, the elements of which are to be understood as being among other acceptable examples. All such modifications and variations are intended to be included herein within the scope of this disclosure. The section headings used herein are merely provided to enhance readability and are not intended to limit the scope of the embodiments disclosed in a particular section to the features or elements disclosed in that section. The foregoing description details certain embodiments. It will be appreciated, however, that no matter how detailed the foregoing appears in text, the systems and methods can be practiced in many ways. As is also stated herein, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Those of skill in the art would understand that information, messages, and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

What is claimed is:

1. A system for generating energy in response to a movement of a vehicle, the system comprising:
   an energy recovery mechanism configured to receive rotational energy from a drive shaft of the vehicle, wherein the energy recovery mechanism comprises a housing at least partially enclosing one or more rollers positioned in contact with and tangentially adjacent the drive shaft and configured to rotate in response to a rotation of the drive shaft of the vehicle;
   a generator rotatably coupled to the energy recovery mechanism and configured to generate an electrical output in response to the rotation of the roller;
   a capacitor electrically coupled to the generator and configured to receive a portion of the electrical output to store as capacitor energy; and
   a motor electrically coupled to the capacitor and configured to receive a portion of the capacitor energy.

2. The system of claim 1, further comprising a flexible arm mechanically connected to the housing and a feature of the vehicle, wherein the flexible arm is configured to apply a force to the one or more rollers to cause the one or more rollers to contact the drive shaft.

3. The system of claim 2, wherein the flexible arm is configured to bend.

4. The system of claim 2, wherein the flexible arm is further configured to pivot about one or more joints.

5. The system of claim 2, wherein the flexible arm is further configured to adjust a magnitude of the force.

6. The system of claim 2, wherein the flexible arm is further configured to adjust a magnitude of the force based on at least a braking of the vehicle.

7. The system of claim 2, wherein the flexible arm is further configured to adjust a magnitude of the force based on at least an acceleration of the vehicle.

8. The system of claim 1, further comprising a battery electrically coupled with the capacitor and configured to receive a portion of the capacitor energy to store as a battery energy.

9. The system of claim 8, wherein the motor is configured to receive a portion of the battery energy.

10. The system of claim 1, wherein the housing partially encompasses the drive shaft.

11. The system of claim 1, wherein the housing fully encompasses the drive shaft.

12. A system for generating energy in response to a movement of a vehicle, the system comprising:
   an energy recovery mechanism configured to receive rotational energy from a drive shaft of the vehicle, the energy recovery mechanism comprising one or more wires positioned axially adjacent the drive shaft of the vehicle, wherein the drive shaft is configured to rotate a magnetic field, and wherein a current is induced in the one or more wires as the drive shaft rotates;
a capacitor electrically coupled to the energy recovery mechanism and configured to receive a portion of an electrical output to store as capacitor energy; and
a motor electrically coupled to the capacitor and configured to receive a portion of the capacitor energy.

13. The system of claim 12, further comprising a battery electrically coupled with the capacitor and configured to receive a portion of the capacitor energy to store as battery energy, and wherein the motor is configured to receive a portion of the battery energy.

14. The system of claim 12, wherein the energy recovery mechanism is coupled to a feature of the vehicle via a flexible arm, and wherein the flexible arm is configured to move from an engaged to a disengaged position.

15. A method for generating energy in response to rotational movement of a moving vehicle, the method comprising:
rotating a shaft, the shaft including a groove spanning an outer circumference;
rotating a roller in response to the rotation of the shaft, wherein the roller contacts the groove of the shaft,
applying a force to the roller to cause the roller to maintain contact with the groove;
generating, via a generator, an electrical output based on the rotation of the roller; and
conveying the electrical output to an energy storage device or motor.

16. The method of claim 15, further comprising notifying a driver that the energy storage device is fully charged.

17. The method of claim 15, further comprising transferring the energy from the energy storage device to the motor based on a signal from the driver.

18. The system of claim 2, wherein the feature of the vehicle is one or more of a vehicle frame, capacitor, generator, gearbox, or battery.

19. The system of claim 1, wherein the energy recovery mechanism is immovably fixed to the drive shaft.

20. The system of claim 1, further comprising a second energy recovery mechanism in contact with the drive shaft.

\* \* \* \* \*